(12) United States Patent
Subhash et al.

(10) Patent No.: US 12,121,139 B2
(45) Date of Patent: Oct. 22, 2024

(54) ORAL CARE SYSTEM AND METHOD FOR PROMOTING ORAL HYGIENE

(71) Applicant: Colgate-Palmolive Company, New York, NY (US)

(72) Inventors: Hrebesh Molly Subhash, Somerset, NJ (US); Benny E. Urban, Jr., Westfield, NJ (US)

(73) Assignee: Colgate-Palmolive Company, New York, NY (US)

( * ) Notice: Subject to any disclaimer, the term of this patent is extended or adjusted under 35 U.S.C. 154(b) by 535 days.

(21) Appl. No.: 17/350,719

(22) Filed: Jun. 17, 2021

(65) Prior Publication Data

US 2021/0393026 A1 Dec. 23, 2021

Related U.S. Application Data

(60) Provisional application No. 63/085,426, filed on Sep. 30, 2020, provisional application No. 63/042,099, (Continued)

(51) Int. Cl.
*A46B 15/00* (2006.01)
*A46B 9/04* (2006.01)
(Continued)

(52) U.S. Cl.
CPC .......... *A46B 15/0006* (2013.01); *A46B 9/04* (2013.01); *G06T 7/0014* (2013.01); *G06T 7/248* (2017.01);
(Continued)

(58) Field of Classification Search
CPC ..... A46B 15/0006; A46B 9/04; A46B 13/023; A61C 17/221; G06T 7/248; G06T 7/0014
See application file for complete search history.

(56) References Cited

U.S. PATENT DOCUMENTS 6,536,068 B1 3/2003 Yang et al.
8,393,037 B2 3/2013 Iwahori et al.
(Continued)

FOREIGN PATENT DOCUMENTS

CA 12409908 11/2002
CN 105411165 3/2016
(Continued)

OTHER PUBLICATIONS

International Search Report and the Written Opinion of the International Searching Authority issued in International Application PCT/US2021/037914 mailed Oct. 13, 2021, pp. 1-17.
(Continued)

*Primary Examiner* — Nicholas D Lucchesi

(57) ABSTRACT

An oral care system includes: an oral care device including a head having a reference face; and a plurality of sensors configured to generate sensor data, the sensor data including: motion data and orientation data corresponding, respectively, to motion measurements and orientation measurements of the reference face during a freeform oral care routine; and image data generated from external images of the oral cavity during the freeform oral care routine; and at least one programmable processor communicably coupled to the plurality of sensors, the at least one programmable processor configured to: generate transformed sensor data from the sensor data, the transformed sensor data comprising the orientation data transformed to be expressed in terms of an angular orientation system, the motion data, and enhanced image data, the enhanced image data representing each external image of the oral cavity combined with a representation of corresponding transformed orientation data.

20 Claims, 35 Drawing Sheets

Related U.S. Application Data filed on Jun. 22, 2020, provisional application No. 63/042,093, filed on Jun. 22, 2020, provisional application No. 63/042,083, filed on Jun. 22, 2020, provisional application No. 63/042,074, filed on Jun. 22, 2020.

(51) Int. Cl.

| | | |
|---|---|---|
| *G06T 7/00* | (2017.01) | |
| *G06T 7/246* | (2017.01) | |
| *A46B 13/02* | (2006.01) | |
| *A61C 17/22* | (2006.01) | |

(52) U.S. Cl.
CPC .......... *A46B 13/023* (2013.01); *A61C 17/221* (2013.01); *G06T 2207/30036* (2013.01); *G06T 2207/30201* (2013.01)

(56) References Cited

U.S. PATENT DOCUMENTS

| | | | |
|---|---|---|---|
| 8,744,192 B2 * | 6/2014 | Ortins | A61C 17/221 |
| | | | 15/106 |
| 8,839,476 B2 | 9/2014 | Adachi | |
| 9,144,476 B2 | 9/2015 | Iwahori et al. | |
| 9,642,684 B2 | 5/2017 | Yoshida et al. | |
| 10,172,443 B2 | 1/2019 | Wang et al. | |
| 10,646,029 B2 | 5/2020 | Serval et al. | |
| 10,702,191 B2 | 7/2020 | Vetter et al. | |
| 2008/0109973 A1 * | 5/2008 | Farrell | A61C 17/224 |
| | | | 15/4 |
| 2009/0092955 A1 * | 4/2009 | Hwang | G16H 20/40 |
| | | | 434/263 |
| 2010/0170052 A1 * | 7/2010 | Ortins | A63F 13/213 |
| | | | 15/106 |
| 2010/0281636 A1 * | 11/2010 | Ortins | A46B 9/04 |
| | | | 15/4 |
| 2010/0323337 A1 * | 12/2010 | Ikkink | A46B 15/0038 |
| | | | 434/263 |
| 2011/0010875 A1 * | 1/2011 | Iwahori | A46B 13/02 |
| | | | 15/22.1 |
| 2012/0310593 A1 * | 12/2012 | Bates | A46B 15/0006 |
| | | | 702/150 |
| 2014/0065588 A1 * | 3/2014 | Jacobson | A61C 17/225 |
| | | | 15/22.1 |
| 2015/0044629 A1 * | 2/2015 | Wang | A46B 15/0006 |
| | | | 15/167.1 |
| 2017/0069083 A1 * | 3/2017 | Vetter | G06F 18/256 |
| 2017/0238692 A1 * | 8/2017 | Sarubbo | G06Q 10/06398 |
| 2018/0192765 A1 * | 7/2018 | Jeanne | A46B 15/0006 |
| 2020/0359777 A1 | 11/2020 | Pesach et al. | |

FOREIGN PATENT DOCUMENTS

| | | |
|---|---|---|
| CN | 105466422 | 4/2016 |
| CN | 107167133 | 9/2017 |
| CN | 108594640 | 9/2018 |
| CN | 109115224 | 1/2019 |
| WO | 2008/072871 | 6/2008 |

OTHER PUBLICATIONS

Forbes.com, "Oral-B Genius X Review: Does A Toothbrush Really Need Artificial Intelligence?" https://www.forbes.com/sites/leebelltech/2019/06/30/oral-b-genius-x-review-does-a-toothbrush-really-need-artificial-intelligence/#3dbfe21cab76, retrieved Jun. 15, 2020, pp. 1-7.

* cited by examiner

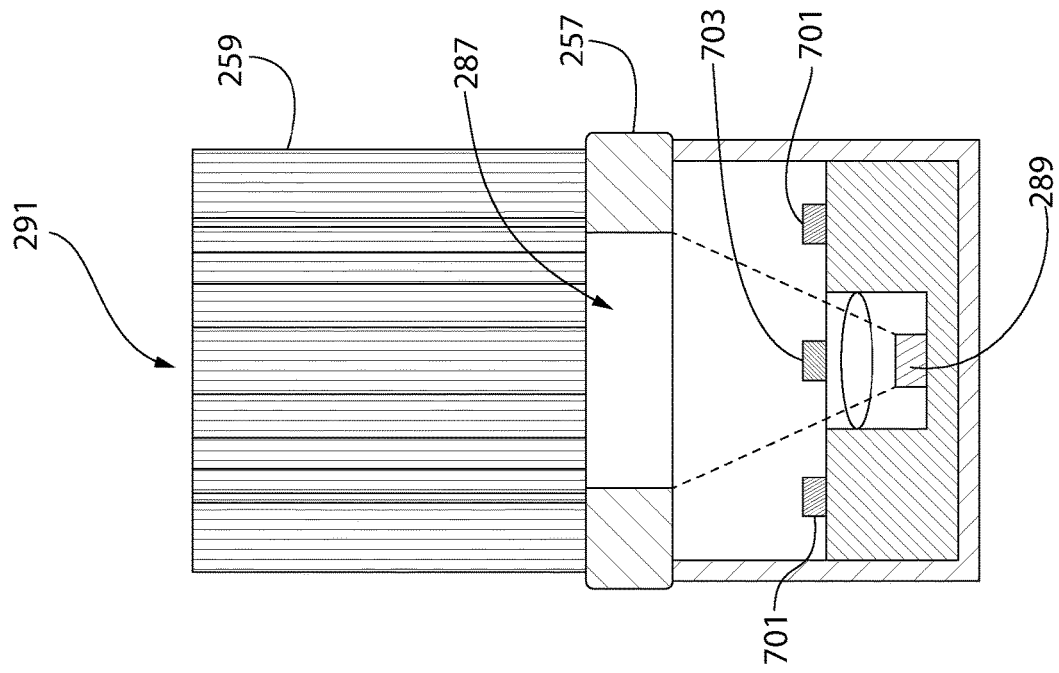
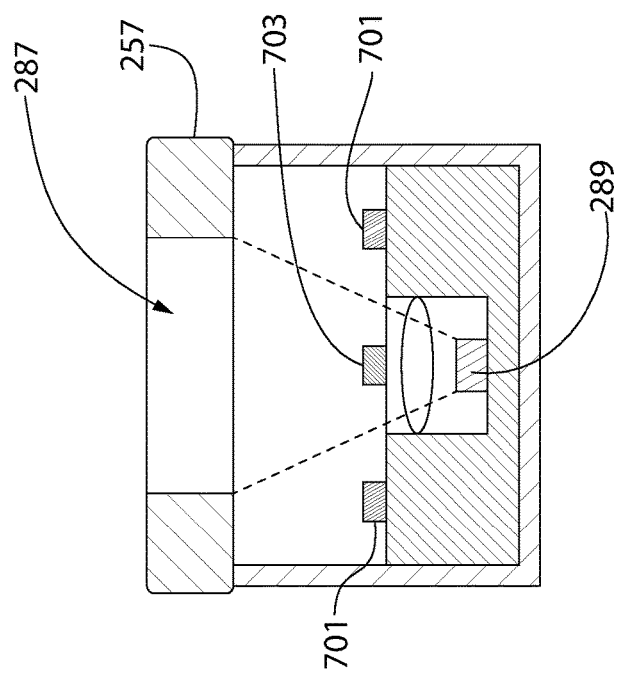
FIG. 24B
FIG. 24A

ORAL CARE SYSTEM AND METHOD FOR PROMOTING ORAL HYGIENE

CROSS REFERENCE TO RELATED APPLICATIONS

The present application claims the benefit of U.S. Provisional Patent Application No. 63/042,074, filed Jun. 22, 2020, U.S. Provisional Patent Application No. 63/042,083, filed Jun. 22, 2020, U.S. Provisional Patent Application No. 63/042,093, filed Jun. 22, 2020, U.S. Provisional Patent Application No. 63/042,099, filed Jun. 22, 2020, and U.S. Provisional Patent Application No. 63/085,426 filed Sep. 30, 2020, each of which is incorporated herein by reference in its entirety.

BACKGROUND

Toothbrushes have been turned into high tech gear through the incorporation of motion sensors and internal cameras, and through the integration with external cameras, smart phones, and apps, all with the goal of improving the oral care routines of users. The motion sensors can help track the brushing routine, the cameras can acquire images or video of the oral cavity during the routine, and the smart phones can help provide feedback to the user to improve the routine. More recently, technology has been incorporated into toothbrushes in order to identify areas of plaque buildup on the teeth of users and early signs of gum decay, all to either help the user better focus their oral care routine or to enable the user to share the information with their dental professional.

While these advances are incredibly useful, they also have been shown to have limitations. One particular limitation is that tracking the location and free movement of a toothbrush within the oral cavity is a very complex problem. The solution often includes guiding the user through a predetermined routine, thereby reducing the complexity of tracking the location and motion of the toothbrush within the oral cavity. Even though artificial intelligence and deep machine learning have been applied to this complex problem, the location and motion tracking capabilities in existence today still leave plenty of room for improvement.

Another limitation is with the image and video capture. For cameras embedded into a toothbrush, the captured images and video is largely hindered by toothpaste foam, saliva, fogging of the aperture, and defocusing of the objective lens. Where the targets of the images and video are the teeth and gums, these hinderances only serve to introduce noise into the collected image and video data. In addition, since the recommended brushing period is two minutes long, the resulting image set or video tends to be a large data set, on the order 5 GB, and the noisy data is unwieldly for an inexperienced user to review on their own, and even more so for the dental professional whose time can be critically valuable. Traditional image or video analysis of noisy image and video data also represents a very complex problem, and as such, new techniques are needed to help simplify this problem. Moreover, a solution to this problem naturally lends itself to other advances in the area of oral care.

BRIEF SUMMARY

Exemplary embodiments according to the present disclosure are directed to oral care systems and methods for promoting oral hygiene through the use of deep machine learning neural networks. Such machine learning techniques provide the advantage of being able to learn to recognize patterns through the analysis of training data. These machine learning techniques may be advantageously employed by an oral care system and method for promoting oral hygiene through analysis of one or more of the location of the oral care device in the mouth, external images of the user's mouth, and data relating to the oral health and/or brushing effectiveness of the user. Such analysis may be advantageously used to more accurately determine the location and orientation of a reference face of the oral care device within the oral cavity, control a powered oral care device to increase the effectiveness of a brushing routine, provide feedback to the user concerning oral care, and provide feedback to the user concerning the wear state of teeth cleaning elements included as part of the oral care device.

In a first aspect, the invention can be an oral care system which includes: a head having a reference face; a plurality of sensors configured to generate sensor data, the sensor data including motion data and orientation data corresponding, respectively, to motion measurements and orientation measurements of the reference face during a freeform oral care routine; and at least one programmable processor communicably coupled to the plurality of sensors, the at least one programmable processor configured to: generate transformed sensor data from the sensor data, the transformed sensor data including the orientation data transformed to be expressed in terms of an angular orientation system and the motion data; and determine, during the freeform oral care routine, a location and an orientation of the reference face with respect to the oral cavity using the transformed sensor data.

In a second aspect, the invention can be a method for promoting oral hygiene, the method including: generating sensor data from an oral care device during a freeform oral care routine, the oral care device including a head having a reference face and a plurality of sensors configured to generate the sensor data, wherein the sensor data includes motion data and orientation data corresponding, respectively, to motion measurements and orientation measurements of the reference face during the freeform oral care routine; generating, using at least one programmable processor, transformed sensor data from the sensor data, the transformed sensor data including the orientation data transformed to be expressed in terms of an angular orientation system and the motion data; and determining, using the at least one programmable processor during the freeform oral care routine, a location and an orientation of the head with respect to the oral cavity using the transformed sensor data.

In a third aspect, the invention can be an oral care system which includes: an oral care device including: a head; at least one teeth cleaning element extending from the head; a vibratory motor coupled to the head to induce vibrations in the head; and a plurality of sensors configured to generate sensor data during a freeform brushing routine; and at least one programmable processor communicably coupled to the plurality of sensors to receive the sensor data, the at least one programmable processor configured to control, during the freeform brushing routine, a stroke frequency of the vibratory motor in response to the received sensor data.

In a fourth aspect, the invention can be a method for promoting oral hygiene, the method including: generating sensor data from a plurality of sensors in an oral care device during a freeform brushing routine, the oral care device including a head, at least one teeth cleaning element extending from the head, a vibratory motor coupled to the head to induce vibrations in the head, and the plurality of sensors; and controlling, using at least one programmable processor during the freeform brushing routine, a stroke frequency of the vibratory motor in response to the sensor data.

In a fifth aspect, the invention can be an oral care system which includes: an oral care device including: a head; at least one teeth cleaning element extending from the head; and a plurality of sensors configured to generate sensor data during a freeform brushing routine; and at least one programmable processor communicably coupled to the plurality of sensors, the at least one programmable processor configured to: evaluate one or more oral care characteristics using the sensor data in combination with brushing routine data, the brushing routine data resulting from analysis of sensor data generated during training brushing routines; and assign an oral care score to the one or more oral care characteristics.

In a sixth aspect, the invention can be a method for promoting oral hygiene, the method including: generating sensor data from a plurality of sensors in an oral care device during a freeform brushing routine, the oral care device including a head, at least one teeth cleaning element extending from the head, and the plurality of sensors; evaluating, using at least one programmable processor, one or more oral care characteristic using the sensor data in combination with brushing routine data, the brushing routine data resulting from analysis of sensor data generated during training brushing routines; and assigning, using the at least one programmable processor, an oral care score to the one or more oral care characteristic.

In a seventh aspect, the invention can be an oral care system which includes: an oral care device including: a body; a head detachably coupled to the body; a plurality of teeth cleaning elements extending from the head; and an image sensor coupled to the body and positioned to generate image data from images of the plurality of teeth cleaning elements; and at least one programmable processor communicably coupled to the image sensor, the at least one programmable processor configured to: evaluate the image data in combination with cleaning element wear data to determine an amount of wear on the plurality of teeth cleaning elements, the cleaning element wear data resulting from analysis of training image data generated during data training routines; and assign a wear score to the plurality of teeth cleaning elements based on the evaluated image data.

In an eighth aspect, the invention can be a method for promoting oral hygiene, the method including: generating, using an image sensor, image data from images of a plurality of teeth cleaning elements extending from a head of an oral care device, the image sensor coupled to a body of the oral care device; evaluating, using at least one programmable processor, the image data in combination with cleaning element wear data to determine an amount of wear on the plurality of teeth cleaning elements, the cleaning element wear data resulting from analysis of training image data generated during data training routines; and assigning, using the at least one programmable processor, a wear score to the plurality of teeth cleaning elements based on the evaluated image data.

In a ninth aspect, the invention can be an oral care system including: an oral care device which includes a head having a reference face; and a plurality of sensors configured to generate sensor data, the sensor data including: motion data and orientation data corresponding, respectively, to motion measurements and orientation measurements of the reference face during a freeform oral care routine; and image data generated from external images of the oral cavity during the freeform oral care routine; and at least one programmable processor communicably coupled to the plurality of sensors, the at least one programmable processor configured to: generate transformed sensor data from the sensor data, the transformed sensor data including the orientation data transformed to be expressed in terms of an angular orientation system, the motion data, and enhanced image data, the enhanced image data representing each external image of the oral cavity combined with a representation of corresponding transformed orientation data.

In a tenth aspect, the invention can be a method for promoting oral hygiene, the method including: generating sensor data from an oral care device during a freeform oral care routine, the oral care device including a head having a reference face and a plurality of sensors configured to generate the sensor data, wherein the sensor data includes motion data, orientation data, and image data, the motion data and the orientation data corresponding, respectively, to motion measurements and orientation measurements of the reference face during the freeform oral care routine, and the image data generated from external images of the oral cavity during the freeform oral care routine; and generating, using at least one programmable processor, transformed sensor data from the sensor data, the transformed sensor data including the orientation data transformed to be expressed in terms of an angular orientation system, the motion data, and enhanced image data, the enhanced image data representing each external image of the oral cavity combined with a representation of corresponding transformed orientation data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 24A illustrates a cross sectional view of the head of the oral care device of FIG. 2.

FIG. 24B illustrates a cross sectional view of the head of the oral care device of FIG. 5.

DETAILED DESCRIPTION

Figure 1:
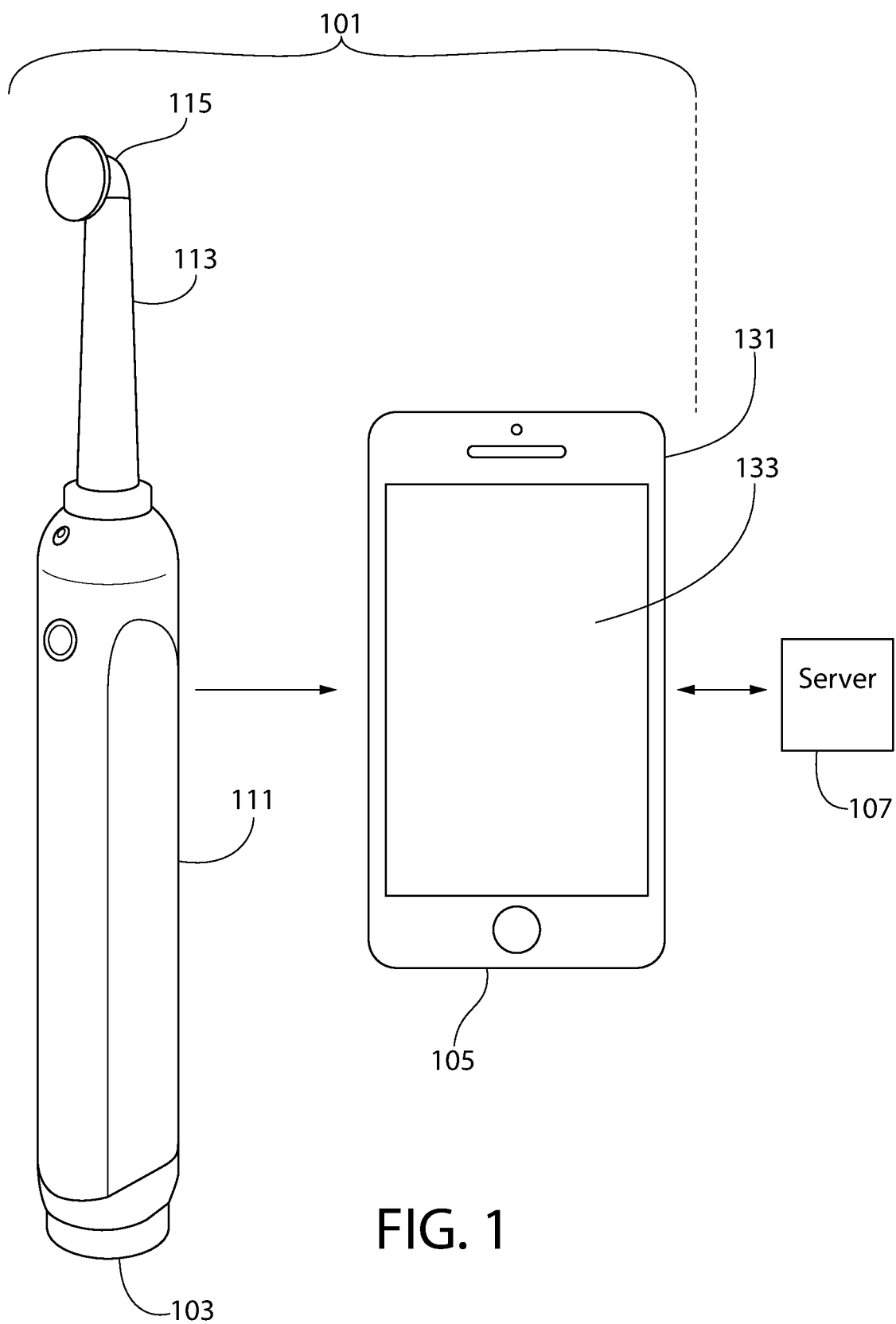
FIG. 1 is a schematic view of an oral care system in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The programmable processes described herein are not limited to any particular embodiment, and may be implemented in an operating system, application program, foreground or background processes, driver, or any combination thereof. The computer programmable processes may be executed on a single processor or on or across multiple processors.

Processors described herein may be any central processing unit (CPU), specialized processing unit (e.g., a graphics processing unit) microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), speakers, microphones, removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Where ranges are disclosed herein, such ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Turning in detail to the drawings, FIG. 1 illustrates an oral care system 101 in accordance with an embodiment of the present invention. The oral care system 101 includes an oral care device 103 and a programmable device 105. The programmable device 105 may communicate with a server 107 for purposes of storing larger amounts of data or to provide server-side processing functionality. The presence of the server 107 and communication between the programmable device 105 and the server 107, however, are not limiting of the present invention unless expressly stated in a claim. Each of the oral care device 103, the programmable device 105, and the server 107 includes a programmable processor, and each of the respective programmable processors may perform one or more of the processes described herein. Moreover, where a process is described as being performed by the programmable processor of the programmable device 105, that process may also be performed by the programmable processor of the server 107, or alternatively, part of the process may be performed by the programmable processor of the programmable device 105 and part of the process may be performed by the programmable processor of the server 107. Similarly, where a process is described as being performed by the programmable processor of the oral care device 103, that process may also be performed, in all or in part, by the programmable processor of the programmable device 105 and/or by the programmable processor of the server 107. In other words, allocation of which programmable processor performs which part of a process is entirely determined by the particular implementation of the oral care system 101 and is not to be limiting of the invention unless expressly stated in a claim.

The oral care device 103 generally includes a handle 111, a neck 113, and a head 115. The neck 113 extends between the handle 111 and the head 115 and connects the head 115 to the handle 111. The handle 111 provides the user with a mechanism by which the toothbrush 103 can be readily gripped and manipulated during a brushing routine. The handle 111 may be formed of many different shapes, sizes and materials and may be formed by a variety of manufacturing methods that are well-known to those skilled in the art. The handle 111 has a generally elongate shape, along a longitudinal axis and transitions into the neck 113 at one end thereof. While the neck 113 generally has a smaller transverse cross-sectional area than the handle 111, the invention is not so limited. Broadly speaking, the neck 113 forms a transition region between the handle 111 and the head 115. While the head 115 is normally widened relative to the neck 113, in some embodiments the head 115 can simply be a continuous extension or narrowing of the neck 113 and/or handle 111. In alternative embodiments, one or more of the handle 111, the head 115, and/or the neck 113 may have different shapes, sizes, orientations, and/or the like. The invention is not to be limited by the size and/or shape of any portion of the oral care device 103 unless otherwise indicated in a claim. Additional features may also be incorporated into the toothbrush or disposed on the toothbrush.

In an exemplary embodiment, the head 115, including at least part of the neck 113, of the oral care device 103 are detachable from the handle 111, such that the head 115 is replaceable with another head 115. Whether the handle 111, the neck 113, and the head 115 are of a unitary or multi-piece construction (including connection techniques) is not limiting of the present invention unless expressly stated in a claim.

The programmable device 105 includes a housing 131 and a display 133. The housing 131 encloses other various components of the programmable device 105, including a programmable processor. Other components of the programmable device 105 may include a power source, such as a battery, a memory, a communication subsystem (to enable wireless and/or wired communications with other programmable devices), an imaging subsystem (such as a camera), and the like. The memory may be any appropriate type of memory or storage which enables the programmable processor to perform the functions as described herein. By way of example, the memory may be volatile and/or non-volatile random access memory. Unless expressly stated in a claim, the components of the programmable device 105 are not to be limiting of the invention.

The display 133 may be any type of light emitting display, and as shown in the exemplary embodiment, the display 133 may be an LED panel. In certain other embodiments, the display 133 may be an LCD panel, an OLED panel, or any other type of display which is electronically controllable by the programmable processor of the programmable device 105. In certain embodiments, the display 133 may be a touch sensitive display which accepts input from the user directly on the display surface. Such a touch sensitive display 133 may therefore serve as a user interface for the programmable device 105. The type and configuration of the display 133 is not limiting of the invention unless expressly stated in a claim. Similarly, the type and configuration of the user interface is not limiting of the invention unless expressly stated in a claim.

Figure 2:
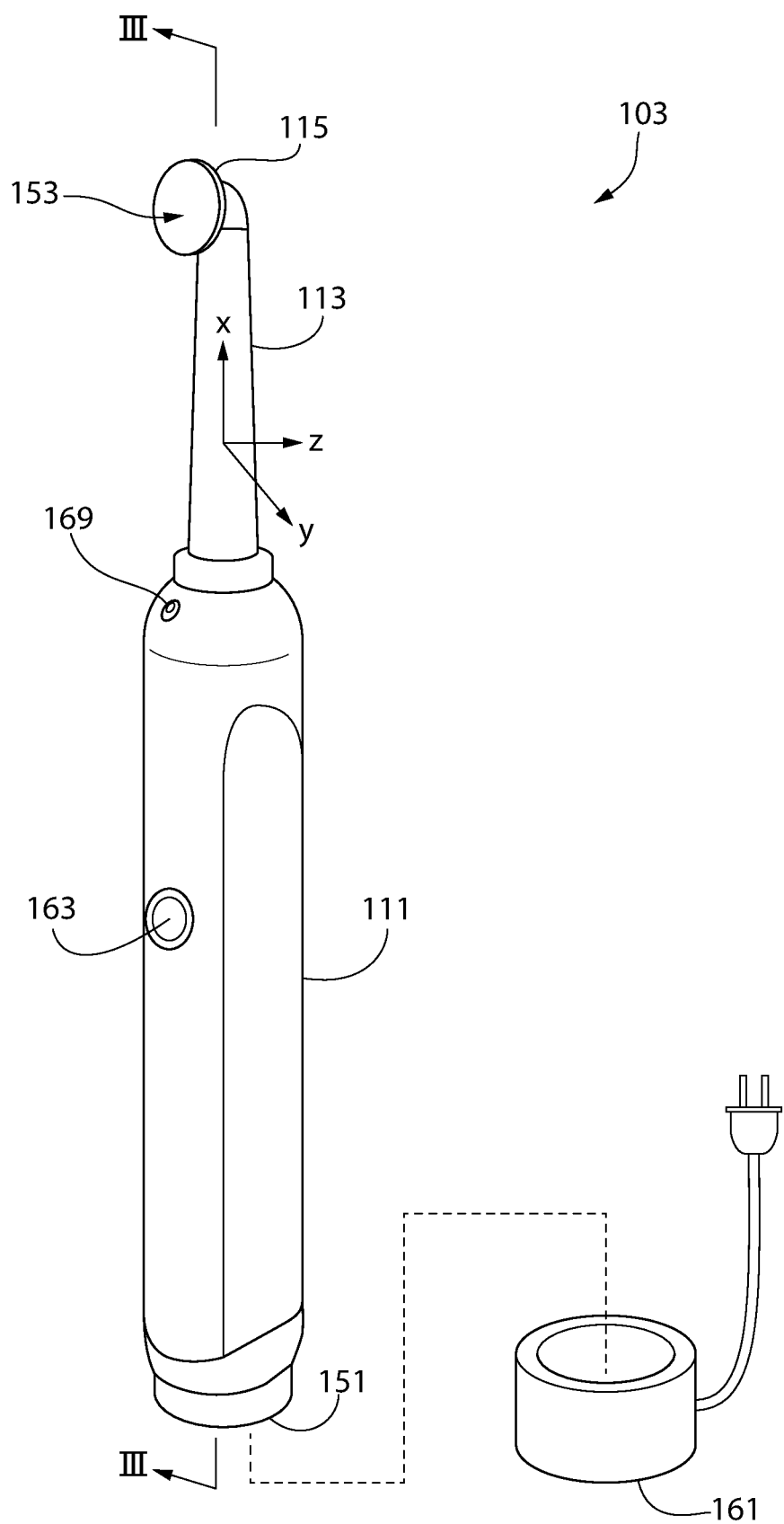
FIG. 2 is a perspective view of a first embodiment of an oral care device for use with the oral care system of FIG. 1.
Figure 3:
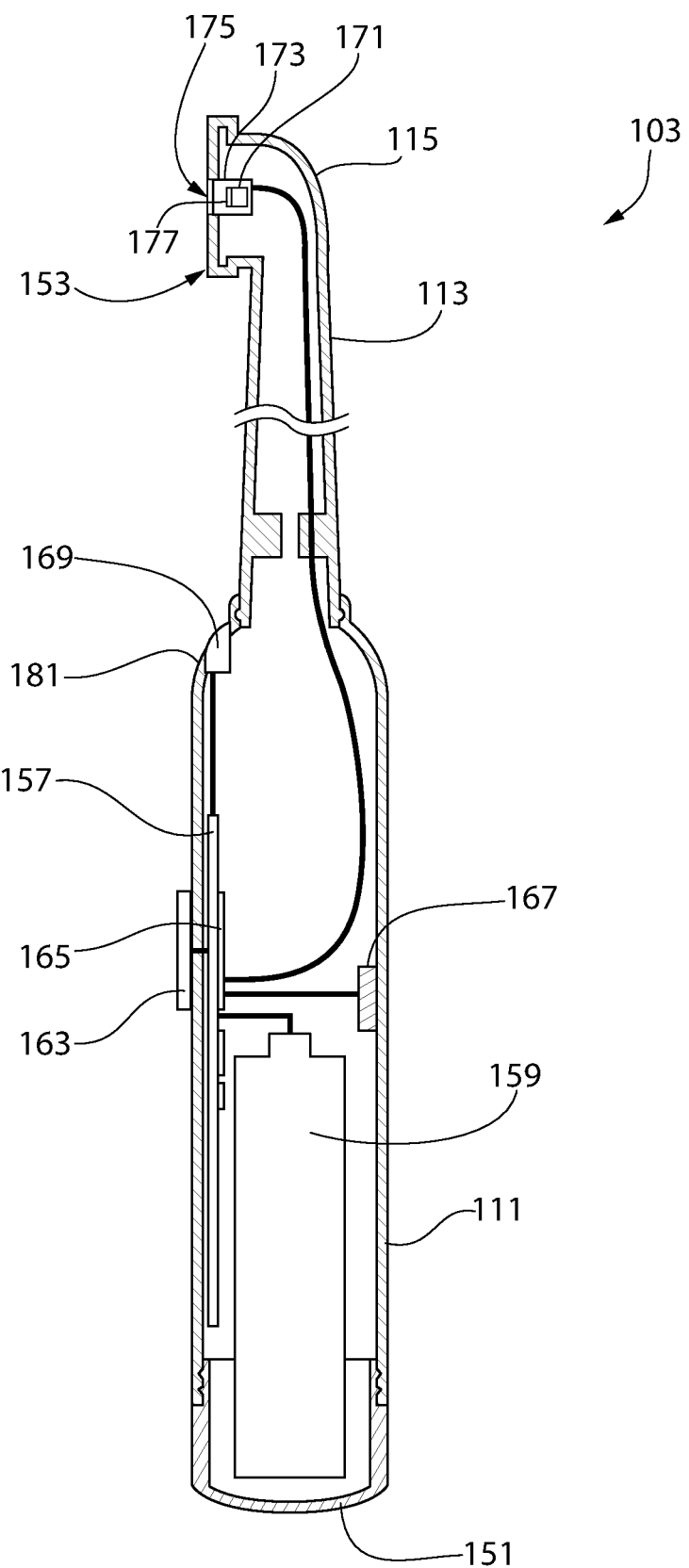
FIG. 3 is a cross-sectional view of the oral care device of FIG. 2 taken along the section line 3-3.

FIGS. 2-3 illustrate a first exemplary embodiment of an oral care device 103, shown as an examination device 151 for an oral cavity. The head 115 of the examination device 151 includes a reference face 153, and as is described in greater detail below, the oral care system 101 determines the location and orientation of the reference face 153 within the oral cavity of the user. In certain embodiments, teeth cleaning elements may extend from the reference face 153. The reference face 153 may be planar, curved, or have any other type of surface configuration. The configuration of the reference face 153, and whether any tool, implement, or other feature of the oral care device 103 extends from the reference face 153, is not to be limiting of the invention unless expressly stated in a claim.

The examination device 151 includes a circuit board 157 enclosed within the handle 111. The circuit board 157 and all other electronic components of the examination device 151 are powered by a rechargeable battery 159, which is also enclosed within the handle 111. The rechargeable battery 159 may be recharged by setting the end of the examination device 151 in the receptacle of the recharging base unit 161 in order to recharge the rechargeable battery 159 through inductive charging. Such inductive charging is well-known in the art, and thus the circuitry and functioning thereof are not discussed in detail herein. In certain embodiments, the examination device 151 may include a disposable battery instead of the rechargeable battery 159. The type of power source used to provide power to the electronic components of the examination device 151 is not to be limiting of the invention unless expressly stated in a claim.

A power button 163 is operatively coupled to the circuit board 157 so that a user may control power to the circuit board 157 and other electronic components of the examination device 151. The other electronic components of the examination device 151 include at least one programmable processor 165 and a plurality of sensors, and each of these other electronic components is operatively coupled to the circuit board 157. The circuit board 157 serves as an electronic junction, so that all electronic components may be controlled by the programmable processor 165 and thereby be utilized during operation of the oral care system 101. Each of the sensors included in the examination device 151 are configured to generate sensor data which is communicated to the programmable processor 165. The programmable processor 165 may be programmed to process the sensor data it receives in a variety of ways, a few of which are described in greater detail below.

The sensors included in the examination device 151 include an inertial measurement unit (IMU) 167, an image sensor 169, and an optical sensor 171. In the exemplary embodiment, the IMU 167 is a micro-electro-mechanical system (MEMS), which is a component that is readily available on the market and includes an accelerometer, a gyroscope, and a magnetometer. The functionality provided by the IMU 167 and other electronic components is described in further detail below. Also in the exemplary embodiment, the IMU 167 is shown included within and coupled to the handle 111 of the examination device 151. In certain embodiments, however, the IMU 167 may be included within and coupled to the neck 113 or the head 115, without losing functionality, even though the manner in which the sensor data from the IMU 167 is processed may need to be changed in order to maintain the same functionality. The manner in which the IMU 167 is coupled to the examination device 151, and the location at which it is coupled, is not to be limiting of the invention unless otherwise expressly stated in a claim.

The IMU 167 generates sensor data in the form of 3-axis linear acceleration data, 3-axis orientation data, and 3-axis magnetometer data. Certain embodiments of the IMU 167 may generate additional types of sensor data. The linear acceleration data, orientation data, and magnetometer data from the IMU 167 are further processed by the oral care system 101, as part of the sensor data, in a manner described in greater detail below to help provide enhanced oral care for a user of the oral care system 101.

Using the linear acceleration data, the orientation data, and the magnetometer data, the IMU 167 may be used to establish a device coordinate system for the examination device 151. In this device coordinate system, the x-axis is defined as the longitudinal axis of the examination device 151, the z-axis is defined by the downward pull of gravity, and the y-axis is defined as that axis that is orthogonal to both the x-axis and the z-axis. In certain embodiments, the x-axis may be defined as the longitudinal axis of the examination device 151, the z-axis may be defined as being normal to the reference face 153, which in a certain orientation of the examination device 151 coincides with the downward pull of gravity, and the y-axis may be defined as that axis that is orthogonal to both the x-axis and the z-axis. As is described in more detail below, the oral care system 101 facilitates determining the location and orientation of the head 115 of the examination device 151 within the oral cavity of the user by generating transformed sensor data, in which the orientation data is expressed in terms of an angular orientation system. In certain embodiments, the transformed sensor data also includes all non-transformed types of data included as part of the sensor data generated by any of the plurality of sensors included as part of the examination device 151. In certain embodiments, the orientation data is transformed to be expressed in terms of quaternion units. In other embodiments, the orientation data is transformed to be expressed in terms of Euler angles.

The image sensor 169 is configured as a camera which has its objective lens facing in the direction of the reference face 153 of the head 115. The image sensor 169 is operatively coupled to the circuit board 157 so that the image sensor 169 may be controlled by the programmable processor 165. The image sensor 169 is mechanically coupled to the interior of the handle 111, and the handle 111 includes an opening 181 through which the image sensor 169 can capture images of the side of the head 115 having the reference surface 153 when the examination device 151 is not in use. When the examination device 151 is in use during an oral care routine, the image sensor 169 is able to capture images of the user's mouth. Such images may also include portions of the user's face around the mouth. In the exemplary embodiment, the image sensor 169 may have a fixed focal length that is set at a point between a mid-point of the head 115 and the opening 181 in the handle 111. In such embodiments, the image sensor 169 does not need to spend any time adjusting focus to accommodate different depths of images.

The technical specifications of the image sensor 169 may be selected to suit a particular need or use for the oral care system 101. In certain embodiments, the image sensor 169 may be configured to capture images at a frame rate of 1-90 frames per second. Also, in certain embodiments, the resolution of the image sensor 169 may be between about 30×30 pixels and 5000×5000 pixels. In certain other embodiments, the pixel array may include between about 900 pixels in total to about 25 million pixels in total, and such pixel arrays may be square arrays or non-square arrays. In certain embodiments, the image sensor 169 may be any one of a color camera, a monochrome camera, a hue sensing camera, and a near-infrared camera. In certain other embodiments, the image sensor 169 may include one or more filters to provide filtering of desired wavelengths. In certain embodiments the image sensor 169 may be a CCD camera, a CMOS camera, or any other type of electronic image capturing device. In certain embodiments, the image sensor 169 may include a light source for providing illuminating during image capture. The image sensor 169 may thus include a wide range of configuration and functionality options. Even so, the configuration and functionality of the image sensor 169 is not to be limited unless expressly stated in a claim.

The image sensor 169 generates sensor data in the form of image data. This image data is further processed by the oral care system 101, as part of the sensor data, in a manner described in greater detail below to help provide enhanced oral care for a user of the oral care system 101.

The optical sensor 171 is located within the head 115 of the examination device 151 and is operatively to the circuit board 157 so that the optical sensor 171 may be controlled by the programmable processor 165 and provide data to the programmable processor 165. In this exemplary embodiment, the optical sensor 171 is located within, and is operated in conjunction with, the light module 173. In certain embodiments, the optical sensor 171 may be located elsewhere within the handle 111, the neck 113, or the head 115 of the examination device 151, such that it remains operatively coupled to the circuit board 157.

The light module 173 serves as a light emitter and a light collector and is positioned so that light emitted from the light module 173 is directed through an optical aperture 175 formed as a translucent optical window in the reference surface 115 of the head 115. Similarly, optical feedback may enter the head 115 through the optical aperture 175 to be collected by the optical sensor 171 within the light module 173. During operation of the examination device 151, the light entering the light module 173 is optical feedback, which is light that is reflected and/or fluoresced by the organic matter in response to being illuminated with light emitted from the light module 173. As should be evident, such organic matter may be soft oral tissue, hard oral tissue, plaque, biofilms, and many other types of organic matter that may typically be found within a user's oral cavity.

The light module 173 includes a light source, shown as a plurality of LEDs in FIG. 21A, for emission of light in one or more wavebands selected as being suitable to generate the desired optical feedback through interaction with organic matter within the oral cavity of the user during an oral care routine. The light module 173 is operatively coupled to the circuit board 157 so that the emission of light from the light module 173 may be controlled by the programmable processor 165. In certain embodiments, light from one or more LEDs may be directed to the light module 173 through a light guide.

In the exemplary embodiment, the waveband of the emitted light includes at least one of light in a visible spectrum and light in a violet range of the visible spectrum. In certain embodiments, light in the visible spectrum spans substantially all of the broadband visible spectrum, extending from about a 390 nm wavelength to about a 2300 nm wavelength. In certain embodiments, this broadband visible spectrum may extend from about a 450 nm wavelength to about a 1000 nm wavelength. In certain embodiments, light in the violet range of the visible spectrum may be a narrowband spectrum centered around a 405 nm wavelength.

The technical specifications of the optical sensor 171 may be selected to suit a particular need or use for the oral care system 101. In certain embodiments, the optical sensor 171 may be configured to output optical sensor data at a rate of about 10 Hz. In certain other embodiments, a higher or lower data rate for output of the optical sensor data may be used.

In this exemplary embodiment, the optical sensor 171 may be a CCD, CMOS, or other type of electronic image capturing device with sufficient pixel resolution to capture images within the oral cavity of the user using the optical feedback received during an oral care routine. The optical sensor data may thus be used to generate still images or a video of oral tissue within the oral cavity. Also, a light scattering element having a known scatter pattern, shown as a diffuser 177, is positioned between the optical sensor 171 and the optical aperture 175. Using the scattered incoming light, the programmable processor 165 (or another processor associated with the oral care system 101) is able to generate a 3-dimensional topographical image from the optical feedback that is reflected from organic matter within the oral cavity, the majority of which is reflected from soft and hard oral tissue. In embodiments in which a 3-dimensional topographical image is created, any of the sensor data collected from any of the sensors, alone or in combination, may be overlaid onto the topographical image in order to provide a visual of many different aspects the oral cavity of a user. In certain embodiments, a patterned mask may be used as the light scattering element, and such a patterned mask would still enable generation of a 3-dimensional topographical image. In certain other embodiments, a diffusing array of microlenses may be used as the light scattering element, and such an array of microlenses would still enable generation of a 3-dimensional topographical image.

In certain embodiments, the optical sensor 171 may be a 64-channel, 8×8 pixel array, and such an optical sensor 171 may be operated as a spectrometer in one or both of the visible and near-infrared wavebands.

The optical sensor 171 generates sensor data in the form of optical sensor data. This optical sensor data is further processed by the oral care system 101, as part of the sensor data, in a manner described in greater detail below to help provide enhanced oral care for a user of the oral care system 101.

In certain embodiments, the optical sensor 171 may be excluded from the examination device 151. However, it should be noted that exclusion of the optical sensor 171 necessarily limits the functionality of the oral care system 101. In certain embodiments, the examination device 151 may also include additional sensors, each of which may be included to add further functionality to the oral care system 101. The inclusion of, or conversely the exclusion of, a particular type or category of sensor is not to be limiting of the invention unless expressly stated in a claim.

Figure 4:
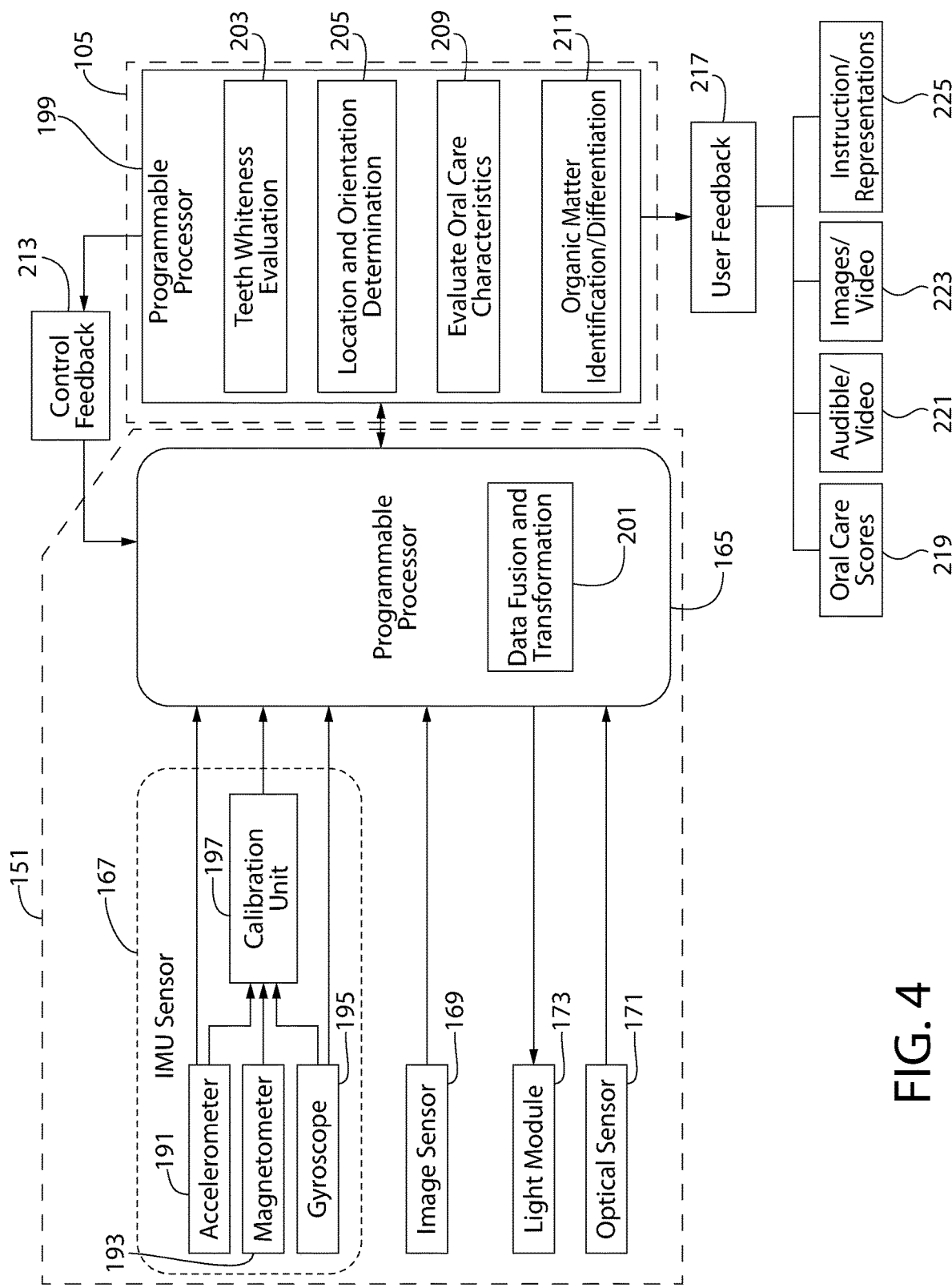
FIG. 4 is a schematic view of operational components of the oral care device of FIG. 2.

FIG. 4 illustrates the flow of data and control signals when using the examination device 151 as part of the oral care system 101 of FIG. 1. The data flow shown includes raw sensor data from the plurality of sensors, transformed sensor data, and feedback provided both to the user and to other components of the oral care system 101. As previously indicated, the programmable processor 165 is operatively coupled to each of the IMU 167, the image sensor 169, the optical sensor 171, and the light module 173, and each of these aforementioned components are included as part of the examination device 151. The programmable processor 165 is communicably coupled, by either a wired or wireless connection, to the programmable processor 199, which as shown is part of the programmable device 105. In certain embodiments, the programmable processor 199 is also communicably coupled to the programmable processor (not shown) of the server 107.

The IMU 167 includes a 3-axis accelerometer 191, a 3-axis magnetometer 193, a 3-axis gyroscope 195, and an internal calibration unit 197. Such an IMU is readily available on the market, and certain embodiments may also include a wireless communication module which may be used to enable direct wireless communications with the programmable processor 199 of the programmable device 105. The accelerometer 191 generates 3-axis linear acceleration data based in x, y, z coordinates, and that linear acceleration data is directed both to the calibration unit 197 and to the programmable processor 165. The magnetometer 193 generates 3-axis magnetic direction data, and that magnetic direction data is directed to the calibration unit 197. The gyroscope 195 generates 3-axis orientation data based in x, y, z coordinates, and that orientation data is directed both to the calibration unit 197 and to the programmable processor 165. The calibration unit 197 orients sensor data from the accelerometer 191 and the gyroscope 195, using sensor data from the magnetometer 193, so that the sensor data from both are aligned with the device coordinate system.

The image sensor 169 generates image data, and that image data is directed to the programmable processor 165. In the exemplary embodiment, the image data represents external images of the oral cavity generated during an oral care routine.

The optical sensor 171 generates optical sensor data, and that optical sensor data is directed to the programmable processor 165. In the exemplary embodiment, the optical sensor data represents optical feedback resulting from light from the light module 173 being incident on organic matter within the oral cavity of the user. When light from the light module 173 is incident on organic matter, the optical feedback may be one of reflected light or fluoresced light. In certain embodiments, the optical sensor 171 may benefit from regular color calibration. In such embodiments, reflectance of light from the light module 173 off a calibration surface having a known color or color scheme may be used to calibrate the optical sensor 171 to an established standard. In the exemplary embodiment, the optical sensor data may also include image data, generated from the optical feedback, when the optical sensor 171 has sufficient resolution and focus to obtain such image data that is useful when viewed by a user. Also in the exemplary embodiment, the optical sensor 171 includes the diffuser 177 with the known scatter pattern, such that the optical sensor data may also include 3-dimensional topographical image data, also generated from the optical feedback.

The programmable processor 165 receives the sensor data from each of the sensors and performs data fusion and transformation processes 201 on the sensor data. This data fusion and transformation process generates transformed sensor data. As part of this transformation process, the orientation data is expressed in terms of an angular orientation system. The purpose for expressing the orientation data in terms of an angular orientation system is to facilitate the mathematics underlying calculations for determining the location and orientation of the examination device 151 within the oral cavity and to facilitate the identification of relationships, and differences, in measured positions and orientations when the head is positioned within different parts of the oral cavity during an oral care routine. In the exemplary embodiment, the orientation data is transformed to be expressed in terms of quaternion units. As will be recognized by those of skill in the art, quaternion units include a W value which ranges from −1 to 1, where this full range represents two full rotations in the same direction of an object. One of the reasons that quaternion units can be particularly useful for determining the location and orientation of a toothbrush head in the oral cavity of a user is that they readily describe the rotation of an object in 3-dimensional space. When a user is brushing, the toothbrush is rotated around the surfaces the teeth, from inside to outside or from outside to inside, and it is this rotation about the teeth that quaternion units are able to track. And, this rotation can be instrumental for determining the location and orientation of the head of a toothbrush within the oral cavity during a freeform oral care routine For purposes of this description, a freeform routine is a routine in which the user determines the section in the oral cavity to begin the oral care routine and/or the order of the sections within the oral cavity to position the oral care device. As such, a freeform routine is one which does not follow a pattern that is defined by any source other than the user. A freeform brushing routine, for purposes of this description, is a freeform routine in which teeth brushing is performed as part of the oral care. In contrast, an oral care routine is a non-freeform routine if the user follows instructions which tell the user where to start and/or end the oral care routine within the oral cavity or which indicate an order of the sections within the oral cavity in which to move the oral care device. By way of example, the training oral care routines discussed herein are non-freeform routines. In addition, a non-freeform brushing routine is a non-freeform routine in which teeth brushing is performed as part of the oral care routine. By way of example, the training brushing routines discussed herein are non-freeform brushing routines. Both training oral care routines and training brushing routines may be referred to herein as "training routines."

In other embodiments, the orientation data is transformed to be expressed in terms of Euler angles. In the exemplary embodiment, the transformed sensor data also includes all non-transformed parts of the sensor data, so that all the collected sensor data is combined, or fused, together into groupings, thereby facilitating further analysis, as a whole, of all the collected sensor data. In addition, significant portions of the sensor data may have other individual usefulness during the data analysis process. In certain embodiments, the programmable processor 199 may perform some or all of the data fusion and transformation processes.

The programmable processor 165 communicates the fused and transformed sensor data to the programmable processor 199 for analysis. As shown, the programmable processor 199 is included as part of the programmable device 105. However, in certain embodiments, the programmable processor 199 may be included as part of the server 107. Still in other embodiments, the processes described herein as being performed by the programmable processor 199 may be distributed across multiple programmable processors, whether each such programmable processor is part of the oral care device 103, the programmable device 105, or the server 107. The analysis of the transformed sensor data may include one or more of: an evaluation of tooth enamel whiteness 203; a location and orientation determination 205 of the reference face 153 of the head 115 within the oral cavity during an oral care routine; an evaluation of oral care characteristics 209 for the user; and perform identification of organic matter 211 and differentiating between within the oral cavity. Other types of analyses may also be performed by the programmable processor 199. In certain embodiments with teeth cleaning elements extending from the reference face 153, the analysis may also include an evaluation of brushing pressure 207.

In the process of identifying and differentiating between organic matter 211 within the oral cavity, in certain embodiments the process may focus on identifying, and differentiating between, hard oral tissue, soft oral tissue, and plaque. In certain other embodiments, the process of identifying organic matter 211 within the oral cavity may also include identifying, and differentiating between, protoporphyrin, blood, soft oral tissue that is hydrated or dehydrated, and the potential presence of caries in tooth enamel. In still other embodiments, the process of identifying organic matter 211 within the oral cavity may include identification, and differentiating between, other types of hard or soft tissue oral health issues.

The evaluation of oral care characteristics 209 may include one or more of an oral health characteristic, a brushing effectiveness characteristic, and a teeth whiteness characteristic. Any one or more of these characteristics may be evaluated based on individual sections within the oral cavity or based on the oral cavity as a whole. In certain embodiments, the oral health characteristic may include at least one of a soft tissue health characteristic and a hard tissue health characteristic. In certain embodiments, the soft tissue health characteristic may include at least one of a soft tissue coloration characteristic, a bleeding characteristic, a blood oxygenation characteristic, and a tissue hydration characteristic. In certain embodiments, the hard tissue health characteristic may include at least one of a caries characteristic and a bacterial presence characteristic. In certain embodiments, the brushing effectiveness characteristic may include at least one of a bacterial presence characteristic and a caries characteristic, and in embodiments which include teeth cleaning elements, a brushing pressure characteristic and a stroke frequency characteristic.

Following analysis of the transformed sensor data, the programmable processor 199 may communicate control feedback 213 to the programmable processor 165. In certain embodiments, the control feedback 213 may include control data which the programmable processor 165 uses to control operation of one or more of the plurality of sensors. For example, the control feedback 213 may be a signal to activate or deactivate one or more of the sensors. By way of another example, the control feedback 213 may be a signal to increase or decrease the rate at which one or more of the sensors generates sensor data.

Also during or following analysis of the transformed sensor data, the programmable processor 199 may communicate user feedback 217 to the user. This user feedback 217 may include one or more of an oral care score 219 reflecting one or more of evaluated oral care characteristics, audible, visual, and/or haptic signals 221 to the user in real-time during the oral care routine, images and/or video 223 obtained during the oral care routine, and advice or instructive representations 225 of the sensor data and/or data analysis performed using the sensor data. In certain embodiments, the audible, visual, and/or haptic signals 221 used as feedback to the user may be made using the programmable device 105. In embodiments in which the oral care device 103 is an electric toothbrush, the vibrational motor may be controlled so that the vibrational frequency and/or amplitude of the vibrational motor are used to provide haptic signals to the user during the oral care routine. In certain embodiments, the oral care device 103 may include a speaker and/or an LED mounted to the handle 111 so that the audible and/or visual signals 221 may be made using the oral care device 103. In certain embodiments, the audible, visual, and/or haptic signals may provide real-time information to the user about the position of the head of the oral care device within the oral cavity and an evaluation of the oral health characteristics at that position. In certain embodiments, the audible signal may be generated by interfacing the oral care system 101 with a voice assistant platform. In such embodiments, the feedback 217 would be communicated to the voice assistant platform by the programmable processor 199, and the voice assistant platform would provide audible feedback to the user in the form of spoken words.

Figure 5:
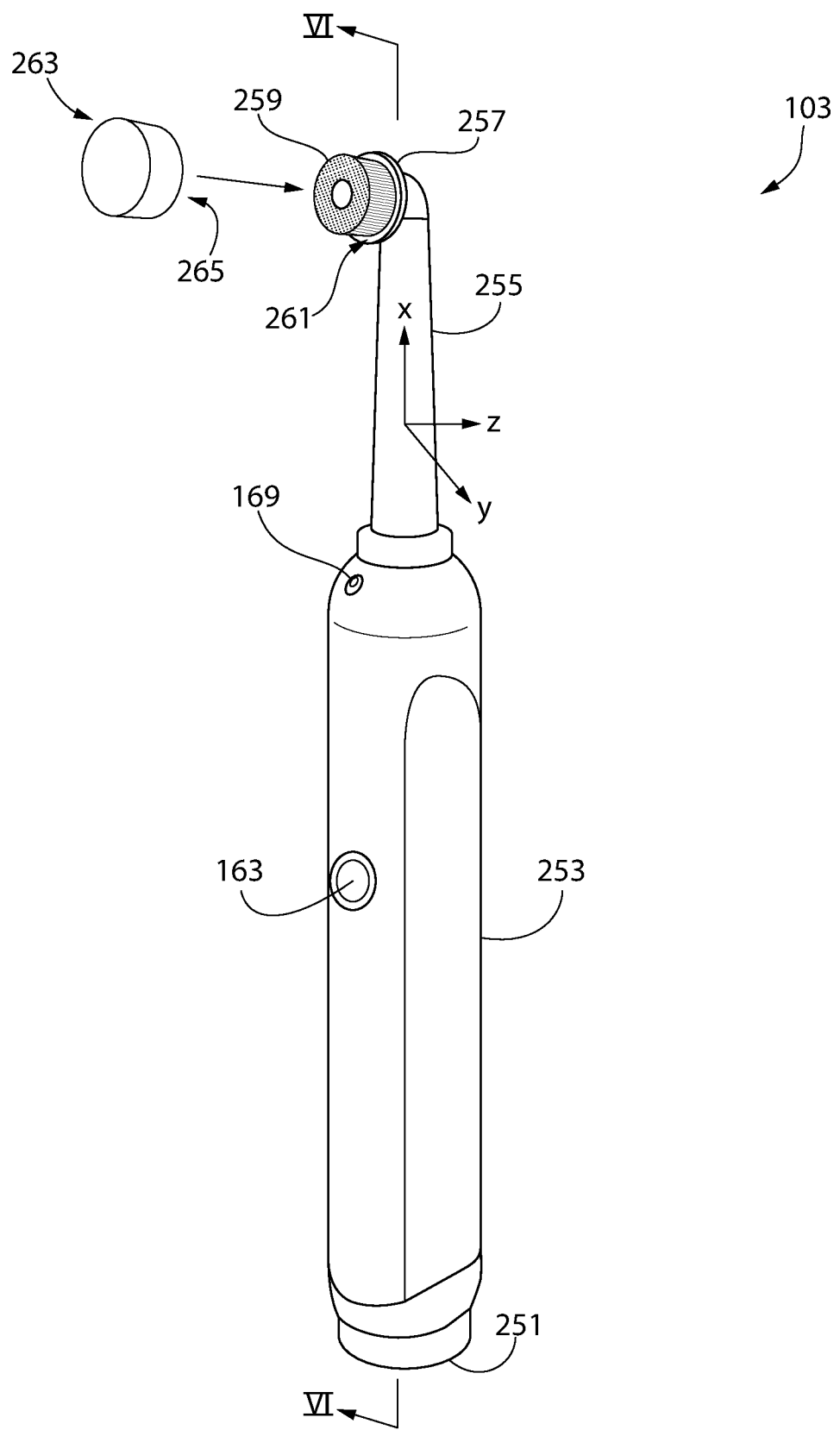
FIG. 5 is a perspective of a second embodiment of an oral care device for use with the oral care system of FIG. 1.
Figure 6:
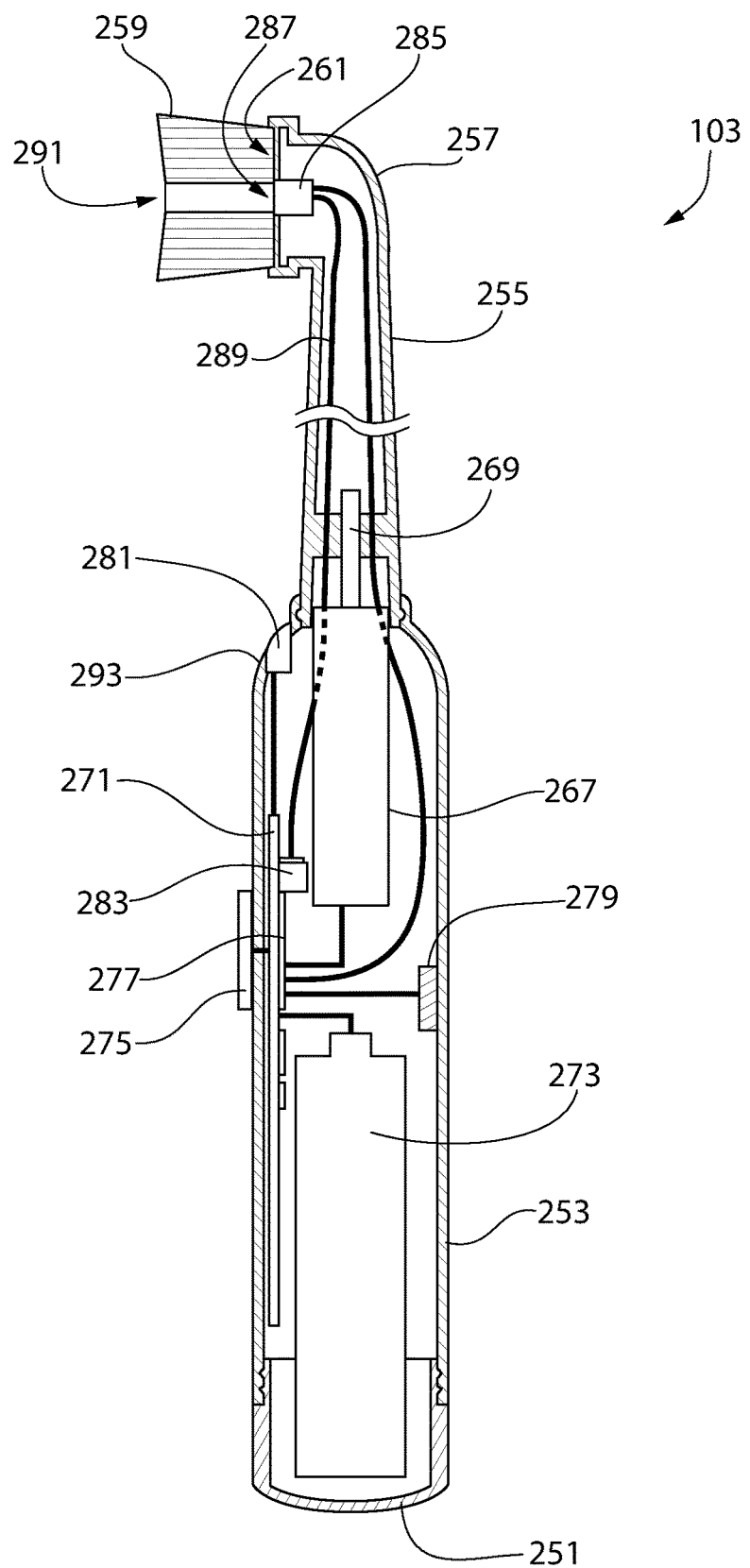
FIG. 6 is a cross-sectional view of the oral care device of FIG. 5 taken along the section line 6-6.

FIGS. 5-6 illustrate a second exemplary embodiment of an oral care device 103, shown as an electric toothbrush 251 The electric toothbrush 251 includes a handle 253, a neck 255, a head 257, and a plurality of teeth cleaning elements 259. The teeth cleaning elements 259 extend from the reference surface 261 of the head 257.

In this exemplary embodiment, the at least one teeth cleaning element is shown as a plurality of bristles, extending from the reference surface 261 of the head 257 for use in cleaning teeth surfaces. As used herein, the term "teeth cleaning element" is used in a generic sense to refer to any structure that can be used to clean or polish the teeth through relative surface contact. In certain embodiments, the electric toothbrush 251 may include a single teeth cleaning element, and in other embodiments, the electric toothbrush 251 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The teeth cleaning elements 259 may be connected to the reference surface 261 and thus to the head 257, in any manner known in the art. For example, staples/anchors, in-mold tufting (IMT) or anchor free tufting (AFT) could be used to mount bristles to the reference surface 261. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, bristles may be mounted to tuft blocks or sections by extending through suitable openings in the reference surface 261 so that the base of the bristles are mounted within or below the reference surface 261.

A circuit board 271 is enclosed within the handle 253. The circuit board 271, and all other electronic components of the electric toothbrush 251, are powered by a rechargeable battery 273, which is also enclosed within the handle 253. The rechargeable battery 273 may be recharged by setting the end of the electric toothbrush 251 in the receptacle of a recharging base unit, such as the recharging base unit 161 shown in FIG. 2. In certain embodiments, the electric toothbrush 251 may include a disposable battery instead of the rechargeable battery 273. The type of power source used to provide power to the electronic components of the electric toothbrush 251 is not to be limiting of the invention unless expressly stated in a claim.

The electric toothbrush 251 includes a vibratory motor 267 with a shaft 269 that mechanically engages the neck 255 so that when the vibratory motor 267 is activated, vibrations are induced in the head 257 of the electric toothbrush 251. In certain embodiments, the shaft 269 of the vibratory motor 267 may directly mechanically engage the head 257, instead of the neck 255. The vibratory motor 269 may be arranged to induce vibrations in the head in any number of ways which are known in the art, and as such, the particular manner in which the vibratory motor 267 induces vibrations in the head 257 of the electric toothbrush 251 is not to be limiting of the invention unless expressly stated in a claim.

A power button 275 is operatively coupled to the circuit board 271 so that a user may control power to the circuit board 271 and other electronic components of the electric toothbrush 251. The other electronic components of the electric toothbrush 251 include at least one programmable processor 277 and a plurality of sensors, and each of these other electronic components is operatively coupled to the circuit board 271. The circuit board 271 serves as an electronic junction, so that all electronic components may be controlled by the programmable processor 277 and thereby be utilized during operation of the oral care system 101. Each of the sensors included in the electric toothbrush 251 are configured to generate sensor data which is communicated to the programmable processor 277. The programmable processor 277 may be programmed to process the sensor data it receives in a variety of ways, a few of which are described in greater detail below.

The sensors included in the electric toothbrush 251 include an inertial measurement unit (IMU) 279, an image sensor 281, and an optical sensor 283. In this exemplary embodiment, the IMU 279 is a micro-electro-mechanical system (MEMS), which is a component that is readily available on the market and includes an accelerometer, a gyroscope, and a magnetometer. The functionality provided by the IMU 279 and other electronic components is described in further detail below. Also in this exemplary embodiment, the IMU 279 is shown included within and coupled to the body 253 of the electric toothbrush 251. In certain embodiments, however, the IMU 279 may be included within and coupled to the neck 255 or the head 257, without losing functionality, even though the processes by which sensor data from the IMU 279 may need to be changed in order to maintain the functionality. The manner in which the IMU 279 is coupled to the electric toothbrush 251, and the location at which it is coupled, is not to be limiting of the invention unless expressly stated in a claim.

The IMU 279 generates sensor data in the form of 3-axis linear acceleration data, 3-axis orientation data, and 3-axis magnetometer data. Certain embodiments of the IMU 279 may generate additional types of sensor data. The linear acceleration data, orientation data, and magnetometer data from the IMU 279 are further processed by the oral care system 101, as part of the sensor data, in a manner described in greater detail below to help provide enhanced oral care for a user of the oral care system 101.

Using the linear acceleration data, the orientation data, and the magnetometer data, the IMU 279 may be used to establish a device coordinate system for the electric toothbrush 251. Similar to the oral care device 151 shown in FIG. 2, the device coordinate system for the electric toothbrush 251 has the x-axis defined as the longitudinal axis of the electric toothbrush 251, the z-axis is defined by the downward pull of gravity, and the y-axis is defined as that axis that is orthogonal to both the x-axis and the z-axis. As is described in more detail below, the oral care system 101 facilitates determining the location and orientation of the head 257 of the electric toothbrush 251 within the oral cavity of the user by generating transformed sensor data, in which the orientation data is expressed in terms of an angular orientation system. In certain embodiments, the transformed sensor data also includes all non-transformed types of data forming part of the sensor data generated by any of the plurality of sensors included as part of the electric toothbrush 251. In certain embodiments, the orientation data is transformed to be expressed in terms of quaternion units. In other embodiments, the orientation data is transformed to be expressed in terms of Euler angles.

The image sensor 281 is configured as a camera which has its stationary or auto-adjustable objective lens facing the teeth cleaning elements 259 extending from the reference surface 261 of the head 257. In embodiments with an auto-adjustable objective lens, the image sensor 281 auto-focuses on objects within its field of view when capturing images. The image sensor 281 is operatively to the circuit board 271 so that the image sensor 281 may be controlled by the programmable processor 277. The image sensor 281 is mechanically coupled to the interior of the handle 253, and the handle 253 includes an opening 293 through which the image sensor 281 can capture images of the teeth cleaning elements 259 when the electric toothbrush 251 is not in use. When the electric toothbrush 251 is in use during a brushing routine, the image sensor 281 is able to capture images of the user's mouth. Such images may also include portions of the user's face around the mouth. In this exemplary embodiment, the image sensor 281 may have a fixed focal length that is set at a point between the teeth cleaning elements 259 and the opening 293 in the handle 253. In such embodiments, the image sensor 281 does not need to spend any time adjusting focus to accommodate different depths of images. In certain other embodiments, the image sensor 281 may be set to switch between two different focal lengths, the first focal length being at the distance of the teeth cleaning elements 259 from the opening 293 in the handle 253, and the second focal length being at about half of the distance of the teeth cleaning elements 259 from the opening 293 in the handle 253. In such embodiments, the image sensor 281 may default to the second focal length during the majority of operation, and then switch to the first focal length upon certain triggering events, such as are described in further detail below. By enabling switching between these two focal lengths, the image sensor 281 may be better able to accommodate the two primary functions it is intended to serve in such embodiments: generating images of the user's mouth during a brushing routine, and generating images of the teeth cleaning elements when triggered to do so, but not during a brushing routine.

The technical specifications of the image sensor 281 may be selected to suit a particular need or use for the oral care system 101, and such technical specifications may be the same as discussed above with respect to the image sensor 169 of the oral care device 151. The image sensor 281 may thus include a wide range of configuration and functionality options, and the configuration and functionality of the image sensor 281 is not to be limited unless expressly stated in a claim.

The image sensor 281 generates sensor data in the form of image data. This image data is further processed by the oral care system 101, as part of the sensor data, in a manner described in greater detail below to help provide enhanced oral care for a user of the oral care system 101.

The optical sensor 283 is located within the handle 253 of the electric toothbrush 251 and is operatively coupled to the circuit board 271 so that the optical sensor 283 may be controlled by the programmable processor 277. The optical sensor 283 is also directly mechanically coupled to the circuit board 271 in this exemplary embodiment. In certain embodiments, the optical sensor 271 may be located elsewhere within the handle 253, the neck 255, or the head 257 of the electric toothbrush 251, and although it remains operatively coupled to the circuit board 271, the optical sensor 283 need not be directly mechanically coupled to the circuit board 271. The optical sensor 283 operates in conjunction with a light module 285 disposed in the head 257.

The light module 285 serves as a light emitter and a light collector and is positioned so that light emitted from the light module 285 is directed through an optical aperture 287 formed in the reference face 261. Similarly, optical feedback may enter the head 257 through the optical aperture 287 and be collected by the light module 285. The teeth cleaning elements 259 are formed with a gap 291 around the optical aperture 287 so as to provide a clear path for 1) the light emitted from the light module 285 to pass out of the head 257 to be incident on organic matter within the oral cavity of a user during a brushing routine, and 2) receive optical feedback, which is light that is reflected and/or fluoresced by the organic matter in response to being illuminated with light emitted from the light module 285.

The optical feedback that is collected by the light module 285 is directed to the optical sensor 271 through a light guide 289 which optically couples the light module 285 to the optical sensor 271. In certain embodiments, the light guide 289 may be a broadband optical fiber. The light module 285 includes a light source, which may be a plurality of LEDs, similar to what is shown in FIG. 21B, for emission of light in one or more wavebands selected as being suitable to generate the desired optical feedback through interaction with organic matter within the oral cavity of the user during a brushing routine. In the exemplary embodiment, the waveband of the emitted light includes at least one of light in a visible spectrum and light in a violet range of the visible spectrum. In certain embodiments, light in the visible spectrum spans substantially all of the broadband visible spectrum, extending from about a 390 nm wavelength to about a 2300 nm wavelength. In certain embodiments, this broadband visible spectrum may extend from about a 450 nm wavelength to about a 1000 nm wavelength. In certain embodiments, light in the violet range of the visible spectrum may be a narrowband spectrum centered around a 405 nm wavelength.

The light module 285 is operatively coupled to the circuit board 271 so that the emission of light from the light module 285 may be controlled by the programmable processor 277. In certain embodiments, light from one or more LEDs may be directed to the light module 285 through a second light guide. In still other embodiments, the light sensor 283 may be positioned within the light module 285.

The technical specifications of the optical sensor 283 may be selected to suit a particular need or use for the oral care system 101. In certain embodiments, the optical sensor 283 may be configured to output optical sensor data at a rate of about 10 Hz. In certain other embodiments, a higher or lower data rate for output of the optical sensor data may be used. In this exemplary embodiment, the optical sensor 283 may be a CCD, CMOS, or other type of electronic image capturing device with sufficient pixel resolution to capture images or video within the oral cavity of the user using the optical feedback received during a brushing routine. In such embodiments, the optical sensor 283 may be configured to capture images at a frame rate of 1-90 frames per second. Also, in such embodiments, the resolution of the optical sensor 283 may be between about 30×30 pixels and 5000× 5000 pixels. In certain other embodiments, the pixel array may include between about 900 pixels in total to about 25 million pixels in total, and such pixel arrays may be square arrays or non-square arrays. In certain embodiments, the optical sensor 283 may be any one of a color camera, a monochrome camera, a hue sensing camera, and a near-infrared camera. In certain other embodiments, the optical sensor 283 may include one or more filters to provide filtering of desired wavelengths. In certain embodiments the optical sensor 283 may be a CCD camera, a CMOS camera, or any other type of electronic image capturing device. In certain embodiments, the optical sensor 283 may be positioned in the head 257, and a diffuser, patterned mask, or array of microlenses which create a known scatter pattern may be placed in front of the optical sensor 283, such that the programmable processor 277 (or any other processor associated with the oral care system 101) is able to generate a 3-dimensional topographical image from the optical feedback passing through the diffuser, patterned mask, or array of microlenses.

In certain embodiments, the optical sensor 283 may be a 64-channel, 8×8 pixel array, integrated spectrometer which is operational in one or both of the visible and near-infrared wavebands. In such embodiments, the optical sensor 283 would not likely be useful for capturing image data or for generating a 3-dimensional topographical image from the optical feedback.

The optical sensor 283 generates sensor data in the form of optical sensor data, which includes image data. The image data from the optical sensor 283 may be treated in the same way as the image data from the image sensor 281. This optical sensor data is further processed by the oral care system 101, as part of the sensor data.

In certain embodiments, the optical sensor 283 may be excluded from the electric toothbrush 251. However, it should be noted that exclusion of the optical sensor 283 necessarily limits the functionality of the oral care system 101. In certain embodiments, the electric toothbrush 251 may also include additional sensors, each of which may be included to add further functionality to the oral care system 101. The inclusion of, or conversely the exclusion of, a particular type or category of sensor is not to be limiting of the invention unless expressly stated in a claim.

Figure 7:
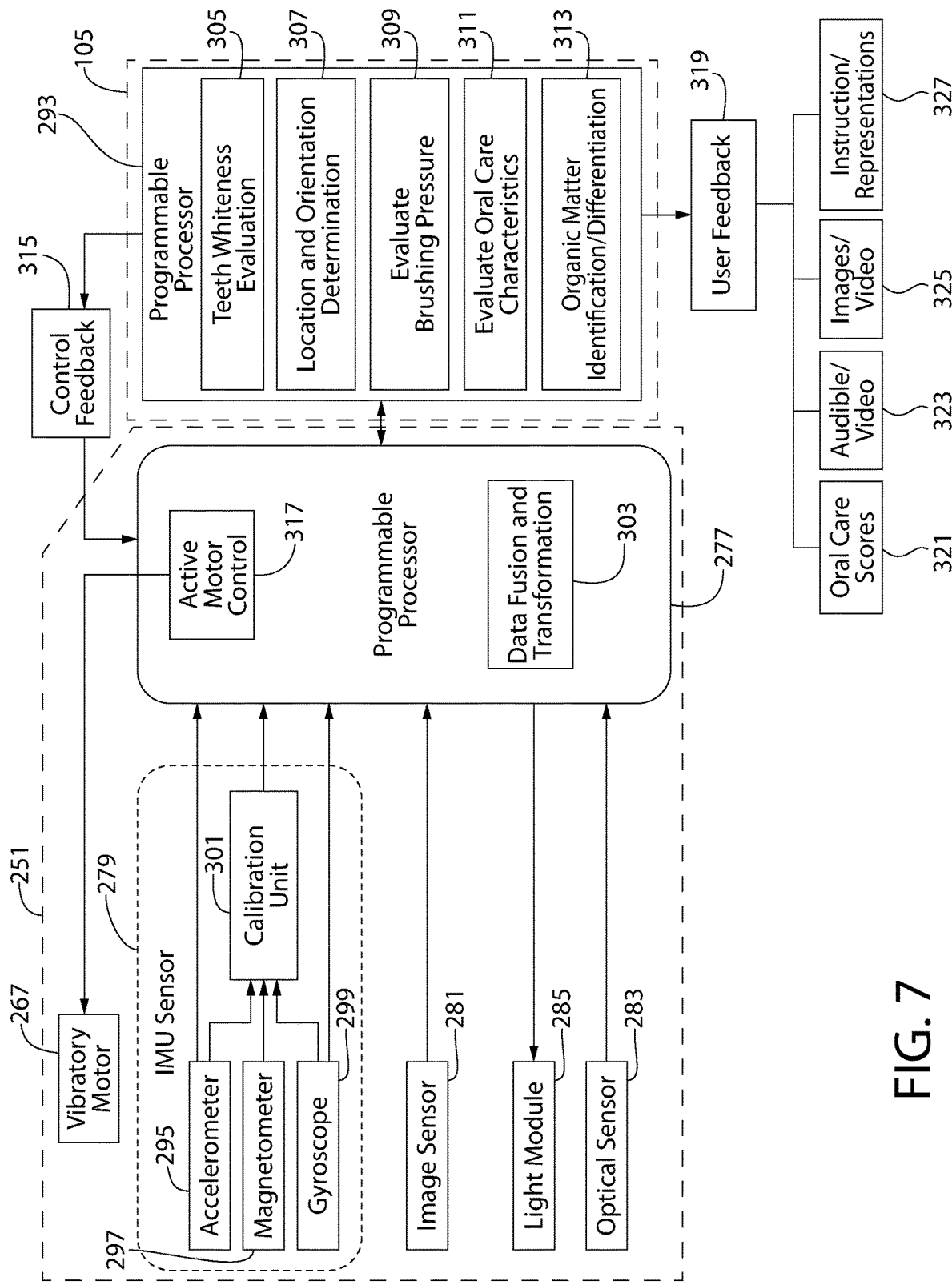
FIG. 7 is a schematic view of operational components of the oral care device of FIG. 5.

FIG. 7 illustrates the flow of data and control signals when using the electric toothbrush 251 as part of the oral care system 101 of FIG. 1. The data flow shown includes raw sensor data from the plurality of sensors, transformed sensor data, and feedback provided both to the user and to other components of the oral care system 101. As previously indicated, the programmable processor 359 is operatively coupled to each of the IMU 279, the image sensor 281, the optical sensor 273, and the light module 285 of the electric toothbrush 251, and each of these aforementioned components are included as part of the electric toothbrush 251. The programmable processor 277 is communicably coupled, by either a wired or wireless connection, to the programmable processor 293, which in this exemplary embodiment is part of the programmable device 105. In certain embodiments, the programmable processor 293 is also communicably coupled to the programmable processor (not shown) of the server 107.

The IMU 279 includes a 3-axis accelerometer 295, a 3-axis magnetometer 297, a 3-axis gyroscope 299, and an internal calibration unit 301. In certain embodiments, the IMU 279 may also include a wireless communication module which may be used to enable direct wireless communications with the programmable processor 293 of the programmable device 105. The accelerometer 295 generates 3-axis linear acceleration data based in x, y, z coordinates, and that linear acceleration data is directed both to the calibration unit 387 and to the programmable processor 277. The magnetometer 297 generates 3-axis magnetic direction data, and that magnetic direction data is directed to the calibration unit 301. The gyroscope 299 generates 3-axis orientation data based in x, y, z coordinates, and that orientation data is directed both to the calibration unit 301 and to the programmable processor 277. The calibration unit 301 orients sensor data from the accelerometer 295 and the gyroscope 299, using sensor data from the magnetometer 297, so that the sensor data from both are aligned with the device coordinate system.

The image sensor 281 generates image data, and that image data is directed to the programmable processor 277. In this exemplary embodiment, the image data may be one of two types. The first type is image data that represents external images of the oral cavity generated during a brushing routine. The second type is image data that represents images of the teeth cleaning elements 259 that are generated at times outside of a brushing routine. In certain embodiments, the image sensor 281 may be utilized to generate image data of other than the two aforementioned types.

The optical sensor 283 generates optical sensor data, and that optical sensor data is directed to the programmable processor 277. In this exemplary embodiment, the optical sensor data represents optical feedback resulting from light from the light module 285 being incident on organic matter within the oral cavity of the user. When light from the light module 285 is incident on organic matter, the optical feedback may be one of reflected light or fluoresced light. In certain embodiments, the optical sensor 283 may be positioned with the head 257 and receive the optical feedback through a light scattering element having a known scatter pattern, such as a diffuser, a patterned mask, or an array of microlenses. In such embodiments, the optical sensor data may include 3-dimensional topographical image data, which is also generated from the optical feedback.

In certain embodiments, the optical sensor 283 may benefit from regular color calibration. As shown in FIG. 5, the exemplary embodiment includes a cap 263 to cover the teeth cleaning elements 259 when the electric toothbrush 251 is not in use. The cap 263 includes an interior surface 265 which faces the optical aperture 287 when the cap 263 is placed over the teeth cleaning elements 259, this this interior surface 265 includes a known color or color scheme which may be used to calibrate the optical sensor 283 to an established standard The programmable processor 277 receives the sensor data from each of the sensors and performs data fusion and transformation processes 303 on the sensor data. This data fusion and transformation process generates transformed sensor data. As part of this transformation process, the orientation data is expressed in terms of an angular orientation system. In the exemplary embodiment, the orientation data is transformed to be expressed in terms of quaternion units. In other embodiments, the orientation data is transformed to be expressed in terms of Euler angles. In the exemplary embodiment, the transformed sensor data also includes all non-transformed parts of the sensor data, so that all the collected sensor data is combined, or fused, together into groupings, thereby facilitating further analysis, as a whole, of all the collected sensor data. In addition, significant portions of the sensor data may have other individual usefulness during the data analysis process. In certain embodiments, the programmable processor 277 may perform some or all of the data fusion and transformation processes.

The programmable processor 277 communicates the fused and transformed sensor data to the programmable processor 293 for analysis. As shown, the programmable processor 293 is included as part of the programmable device 105. However, in certain embodiments, the programmable processor 293 may be included as part of the server 107. Still in other embodiments, the processes described herein as being performed by the programmable processor 293 may be distributed across multiple programmable processors, whether each such programmable processor is part of the oral care device 103, the programmable device 105, or the server 107. The analysis of the transformed sensor data may include one or more of: an evaluation of tooth enamel whiteness 305; a location and orientation determination 307 of the reference surface 261 of the head 257 within the oral cavity during a brushing routine; evaluate brushing pressure 309; an evaluation of oral care characteristics 311 for the user; and perform identification of and differentiation between organic matter 313 within the oral cavity. Other types of analyses may also be performed by the programmable processor 379. In embodiments in which the optical sensor 283 is positioned in the head 257 of the electric toothbrush 251, the analysis may also include generating a 3-dimensional topographical image of the oral cavity.

In certain embodiments, the process of identifying and differentiating between organic matter 313 within the oral cavity may focus on identifying, and differentiating between, hard oral tissue, soft oral tissue, and plaque. In certain other embodiments, the process of identifying organic matter 313 within the oral cavity may also include identifying, and differentiating between, protoporphyrin, blood, soft oral tissue that is hydrated or dehydrated, and the potential presence of caries in tooth enamel. In still other embodiments, the process of identifying organic matter 313 within the oral cavity may include identification, and differentiating between, other types of organic matter.

The evaluation of oral care characteristics 311 may include one or more of an oral health characteristic, a brushing effectiveness characteristic, and a teeth whiteness characteristic. Any one or more of these characteristics may be evaluated based on individual sections within the oral cavity or based on the oral cavity as a whole. In certain embodiments, the oral health characteristic may include at least one of a soft tissue health characteristic and a hard tissue health characteristic. In certain embodiments, the soft tissue health characteristic may include at least one of a soft tissue coloration characteristic, a bleeding characteristic, a blood oxygenation characteristic, and a tissue hydration characteristic. In certain embodiments, the hard tissue health characteristic may include at least one of a caries characteristic and a bacterial presence characteristic. In certain embodiments, the brushing effectiveness characteristic may include at least one of a brushing pressure characteristic, a stroke frequency characteristic, a bacterial presence characteristic, and a caries characteristic.

Following analysis of the transformed sensor data, the programmable processor 293 may communicate control feedback 315 to the programmable processor 277. In certain embodiments, the control feedback 315 may include control data which the programmable processor 277 uses for purposes of controlling operation of one or more of the plurality of sensors. For example, the control feedback 315 may be a signal to activate or deactivate one or more of the sensors. By way of another example, the control feedback 315 may be a signal to increase or decrease the rate at which one or more of the sensors generates sensor data. In this exemplary embodiment, the control feedback 315 may also include data which the programmable processor 277 uses for purposes of active motor control 317 for control of the vibratory motor 267. In certain embodiments, the active motor control 317 includes increasing or decreasing the stroke frequency of the vibratory motor 267 during a brushing routine.

Also during or following analysis of the transformed sensor data, the programmable processor 277 may communicate user feedback 319 to the user. This user feedback 319 may include one or more of an oral care score 321 reflecting one or more of evaluated oral care characteristics, audible, visual, and/or haptic signals 323 to the user in real-time during the brushing routine, images and/or video 325 obtained during the brushing routine, and advice or instructive representations 327 of the sensor data and/or data analysis performed using the sensor data. In certain embodiments, the audible, visual, and/or haptic signals 323 used as feedback to the user may be made using the programmable device 105. In certain embodiments, the vibrational motor may be controlled so that the vibrational frequency and/or amplitude of the vibrational motor are used to provide haptic signals to the user during the oral care routine. In certain embodiments, the electric toothbrush 251 may include a speaker and/or an LED mounted to the handle 253 so that the audible and/or visual signals 323 may be made using the electric toothbrush 251. In certain embodiments, the audible, visual, and/or haptic signals may provide real-time information to the user about the position of the head of the electric toothbrush 251 within the oral cavity and an evaluation of the oral health characteristics at that position. In certain embodiments, the audible signal may be generated by interfacing the oral care system 101 with a voice assistant platform. In such embodiments, the feedback 319 would be communicated to the voice assistant platform by the programmable processor 277, and the voice assistant platform would provide audible feedback to the user in the form of spoken words.

Figure 8:
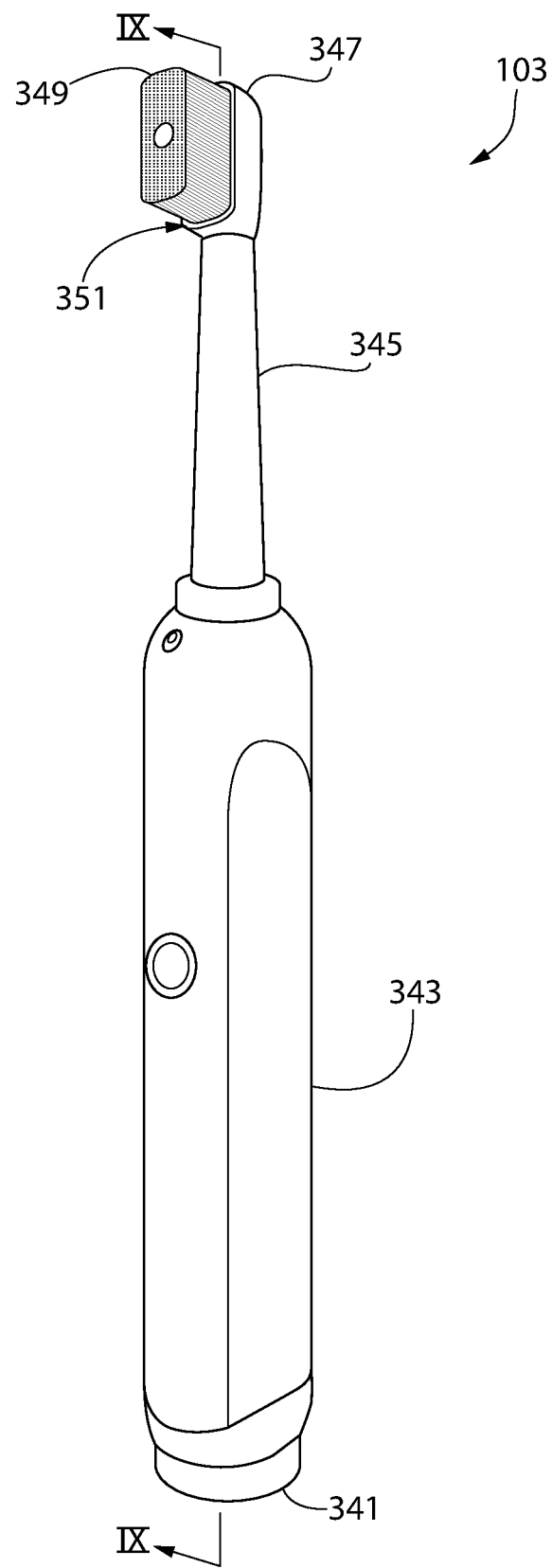
FIG. 8 is a perspective of a third embodiment of an oral care device for use with the oral care system of FIG. 1.
Figure 9:
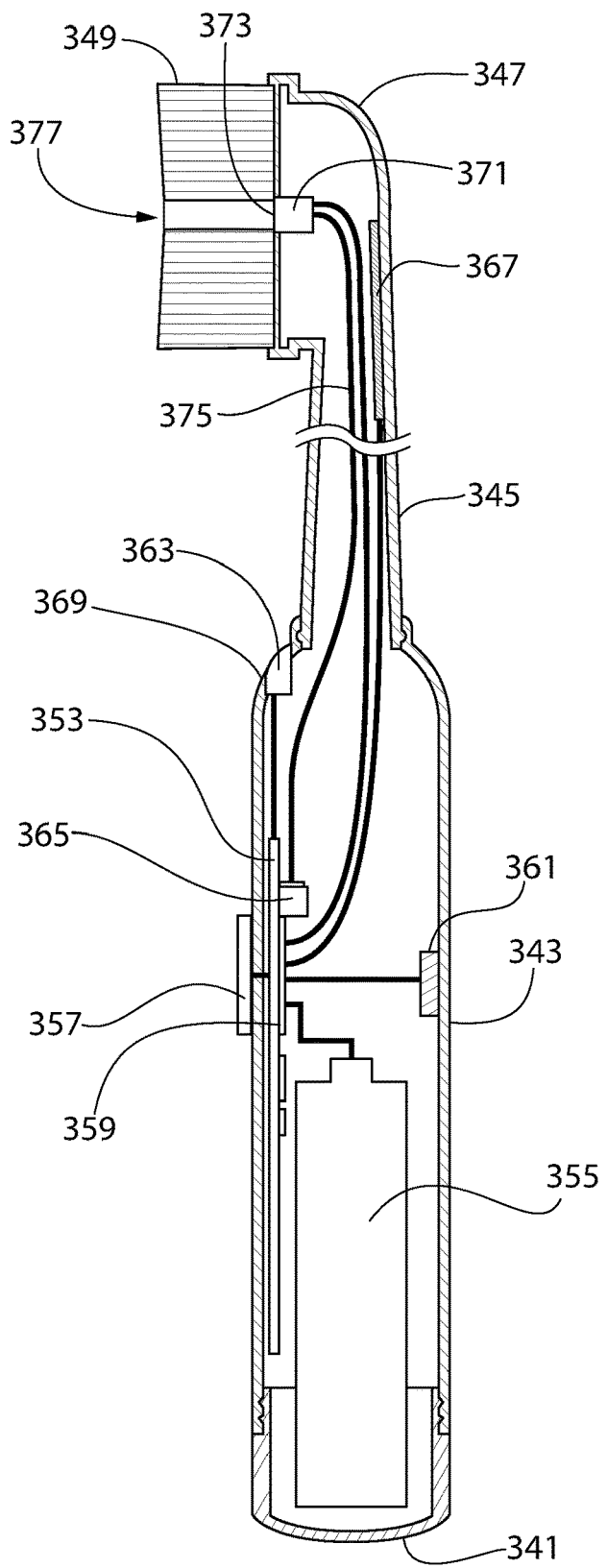
FIG. 9 is a cross-sectional view of the oral care device of FIG. 8 taken along the section line 9-9.

FIGS. 8-9 illustrate a third exemplary embodiment of an oral care device 103, shown as a manual toothbrush 341. The manual toothbrush 341 includes a handle 343, a neck 345, a head 347, and a plurality of teeth cleaning elements 349. The teeth cleaning elements 349 extend from the reference surface 351 of the head 347, and they may be affixed to the reference surface 351 in any of the manners discussed above. A circuit board 353 is enclosed within the handle 343. The circuit board 353, and all other electronic components of the manual toothbrush 341, are powered by a rechargeable battery 355, which is also enclosed within the handle 343. The rechargeable battery 355 may be recharged by setting the end of the manual toothbrush 341 in the receptacle of a recharging base unit, such as the recharging base unit 161 shown in FIG. 2. In certain embodiments, the manual toothbrush 341 may include a disposable battery instead of the rechargeable battery 355. The type of power source used to provide power to the electronic components of the manual toothbrush 341 is not to be limiting of the invention unless expressly stated in a claim.

A power button 357 is operatively coupled to the circuit board 353 so that a user may control power to the circuit board 353 and other electronic components of the manual toothbrush 341. The other electronic components of the manual toothbrush 341 include at least one programmable processor 319 and a plurality of sensors, and each of these other electronic components is operatively coupled to the circuit board 353. The circuit board 353 serves as an electronic junction, so that all electronic components may be controlled by the programmable processor 359 and thereby be utilized during operation of the oral care system 101. Each of the sensors included in the manual toothbrush 341 are configured to generate sensor data which is communicated to the programmable processor 359. The programmable processor 359 may be programmed to process the sensor data it receives in a variety of ways, a few of which are described in greater detail below.

The sensors included in the manual toothbrush 341 include an inertial measurement unit (IMU) 361, an image sensor 363, an optical sensor 365, and a pressure sensor 367. In this exemplary embodiment, the IMU 361 is a micro-electro-mechanical system (MEMS), which is a component that is readily available on the market and includes an accelerometer, a gyroscope, and a magnetometer. The functionality provided by the IMU 361 and other electronic components is described in further detail below. Also in this exemplary embodiment, the IMU 361 is shown included within and coupled to the body 343 of the manual toothbrush 341. In certain embodiments, however, the IMU 361 may be included within and coupled to the neck 345 or the head 347, without losing functionality, even though the processes by which sensor data from the IMU 361 may need to be changed in order to maintain the functionality. The manner in which the IMU 361 is coupled to the manual toothbrush 341, and the location at which it is coupled, is not to be limiting of the invention unless otherwise expressly stated in a claim.

The IMU 361 generates sensor data in the form of 3-axis linear acceleration data, 3-axis orientation data, and 3-axis magnetometer data. Certain embodiments of the IMU 361 may generate additional types of sensor data. The linear acceleration data, orientation data, and magnetometer data from the IMU 361 are further processed by the oral care system 101, as part of the sensor data, in a manner described in greater detail below to help provide enhanced oral care for a user of the oral care system 101.

Using the linear acceleration data, the orientation data, and the magnetometer data, the IMU 361 may be used to establish a device coordinate system for the manual toothbrush 341. Similar to the oral care device 151 shown in FIG. 2, the device coordinate system for the manual toothbrush 341 has the x-axis defined as the longitudinal axis of the manual toothbrush 341, the z-axis is defined by the downward pull of gravity, and the y-axis is defined as that axis that is orthogonal to both the x-axis and the z-axis. As is described in more detail below, the oral care system 101 facilitates determining the location and orientation of the head 347 of the manual toothbrush 341 within the oral cavity of the user by generating transformed sensor data, in which the orientation data is expressed in terms of an angular orientation system. In certain embodiments, the transformed sensor data also includes all non-transformed types of data forming part of the sensor data generated by any of the plurality of sensors included as part of the manual toothbrush 341. In certain embodiments, the orientation data is transformed to be expressed in terms of quaternion units. In other embodiments, the orientation data is transformed to be expressed in terms of Euler angles.

The image sensor 363 is configured as a camera which has its objective lens facing the teeth cleaning elements 349 extending from the reference surface 351 of the head 347. The image sensor 363 is operatively to the circuit board 353 so that the image sensor 363 may be controlled by the programmable processor 359. The image sensor 363 is mechanically coupled to the interior of the handle 343, and the handle 343 includes an opening 369 through which the image sensor 363 can capture images of the teeth cleaning elements 349 when the manual toothbrush 341 is not in use. When the manual toothbrush 341 is in use during a brushing routine, the image sensor 363 is able to capture images of the user's mouth. Such images may also include portions of the user's face around the mouth. In the exemplary embodiment, the image sensor 363 may have a fixed focal length that is set at a point between the teeth cleaning elements 349 and the opening 369 in the handle 343. In such embodiments, the image sensor 363 does not need to spend any time adjusting focus to accommodate different depths of images. In certain other embodiments, the image sensor 363 may be set to switch between two different focal lengths, the first focal length being at the distance of the teeth cleaning elements 349 from the opening 369 in the handle 343, and the second focal length being at about half of the distance of the teeth cleaning elements 349 from the opening 369 in the handle 343. In such embodiments, the image sensor 363 may default to the second focal length during the majority of operation, and then switch to the first focal length upon certain triggering events, such as are described in further detail below.

The technical specifications of the image sensor 363 may be selected to suit a particular need or use for the oral care system 101, and such technical specifications may be the same as discussed above with respect to the image sensor 169 of the oral care device 151. The image sensor 363 may thus include a wide range of configuration and functionality options, and the configuration and functionality of the image sensor 363 is not to be limited unless expressly stated in a claim.

The image sensor 363 generates sensor data in the form of image data. This image data is further processed by the oral care system 101, as part of the sensor data, in a manner described in greater detail below to help provide enhanced oral care for a user of the oral care system 101.

The optical sensor 365 is located within the handle 343 of the manual toothbrush 341 and is operatively coupled to the circuit board 353 so that the optical sensor 365 may be controlled by the programmable processor 359. The optical sensor 365 is also directly mechanically coupled to the circuit board 353 in this exemplary embodiment. In certain embodiments, the optical sensor 365 may be located elsewhere within the handle 343, the neck 345, or the head 347 of the manual toothbrush 341, and although it remains operatively coupled to the circuit board 359, the optical sensor 365 need not be directly mechanically coupled to the circuit board 359. The optical sensor 365 operates in conjunction with a light module 371 disposed in the head 347.

The light module 371 serves as a light emitter and a light collector and is positioned so that light emitted from the light module 371 is directed through an optical aperture 373 formed in the reference face 351. Similarly, optical feedback may enter the head 347 through the optical aperture 373 and be collected by the light module 371. The teeth cleaning elements 349 are formed with a gap 377 around the optical aperture 373 so as to provide a clear path for 1) the light emitted from the light module 371 to pass out of the head 347 to be incident on organic matter within the oral cavity of a user during a brushing routine, and 2) receive optical feedback, which is light that is reflected and/or fluoresced by the organic matter in response to being illuminated with light emitted from the light module 371.

The optical feedback that is collected by the light module 371 is directed to the optical sensor 365 through a light guide 375 which optically couples the light module 371 to the optical sensor 365. In certain embodiments, the light guide 375 may be a broadband optical fiber. The light module 371 includes a light source, which may be a plurality of LEDs, similar to what is shown in FIG. 21B, for emission of light in one or more wavebands selected as being suitable to generate the desired optical feedback through interaction with organic matter within the oral cavity of the user during a brushing routine. In the exemplary embodiment, the waveband of the emitted light includes at least one of light in a visible spectrum and light in a violet range of the visible spectrum. In certain embodiments, light in the visible spectrum spans substantially all of the broadband visible spectrum, extending from about a 390 nm wavelength to about a 2300 nm wavelength. In certain embodiments, this broadband visible spectrum may extend from about a 450 nm wavelength to about a 1000 nm wavelength. In certain embodiments, light in the violet range of the visible spectrum may be a narrowband spectrum centered around a 405 nm wavelength.

The light module 371 is operatively coupled to the circuit board 353 so that the emission of light from the light module 371 may be controlled by the programmable processor 359. In certain embodiments, light from one or more LEDs may be directed to the light module 371 through a second light guide. In still other embodiments, the light sensor 365 may be positioned within the light module 371.

The technical specifications of the optical sensor 365 may be selected to suit a particular need or use for the oral care system 101. In certain embodiments, the optical sensor 365 may be configured to output optical sensor data at a rate of about 10 Hz. In certain other embodiments, a higher or lower data rate for output of the optical sensor data may be used. In this exemplary embodiment, the optical sensor 365 may be a CCD, CMOS, or other type of electronic image capturing device with sufficient pixel resolution to capture images or video within the oral cavity of the user using the optical feedback received during a brushing routine. In such embodiments, the optical sensor 365 may be configured to capture images at a frame rate of 1-90 frames per second. Also, in such embodiments, the resolution of the optical sensor 365 may be between about 30×30 pixels and 5000×5000 pixels. In certain other embodiments, the pixel array may include between about 900 pixels in total to about 25 million pixels in total, and such pixel arrays may be square arrays or non-square arrays. In certain embodiments, the optical sensor 365 may be any one of a color camera, a monochrome camera, a hue sensing camera, and a near-infrared camera. In certain other embodiments, the optical sensor 365 may include one or more filters to provide filtering of desired wavelengths. In certain embodiments the optical sensor 365 may be a CCD camera, a CMOS camera, or any other type of electronic image capturing device. In certain embodiments, the optical sensor 365 may be positioned in the head 347, and a diffuser, a patterned mask, or an array of microlenses which create a known scatter pattern may be placed in front of the optical sensor 365, such that the programmable processor 359 (or any other processor associated with the oral care system 101) is able to generate a 3-dimensional topographical image from the optical feedback passing through the diffuser, patterned mask, or array of microlenses.

In certain embodiments, the optical sensor 365 may be a 64-channel, 8×8 pixel array, integrated spectrometer which is operational in one or both of the visible and near-infrared wavebands. In such embodiments, the optical sensor 365 would not likely be useful for capturing image data or for generating a 3-dimensional topographical image from the optical feedback.

The optical sensor 365 generates sensor data in the form of optical sensor data, which includes image data. The image data from the optical sensor 365 may be treated in the same way as the image data from the image sensor 363. This optical sensor data is further processed by the oral care system 101, as part of the sensor data.

In certain embodiments, the optical sensor 365 may be excluded from the manual toothbrush 341. However, it should be noted that exclusion of the optical sensor 365 necessarily limits the functionality of the oral care system 101. In certain embodiments, the manual toothbrush 365 may also include additional sensors, each of which may be included to add further functionality to the oral care system 101. The inclusion of, or conversely the exclusion of, a particular type or category of sensor is not to be limiting of the invention unless expressly stated in a claim.

The pressure sensor 367 is operatively coupled to the circuit board 353 and is disposed in the neck 345. In this exemplary embodiment, the pressure sensor 367 is in the form of a flex sensor that provides sensor data to the programmable processor 359 based on whether and how much the neck 345 flexes during a brushing routine. In certain other embodiments, the pressure sensor 367 may be disposed in the head 347 and be in the form of a strain sensor. In such embodiments, the pressure sensor 367 provides sensor data to the programmable processor 359 based on whether and how much strain is placed on the head 347 during a brushing routine.

The pressure sensor 367 generates sensor data in the form of pressure sensor data. This image pressure sensor data is further processed by the oral care system 101, as part of the sensor data, in a manner described in greater detail below to help provide enhanced oral care for a user of the oral care system 101.

Figure 10:
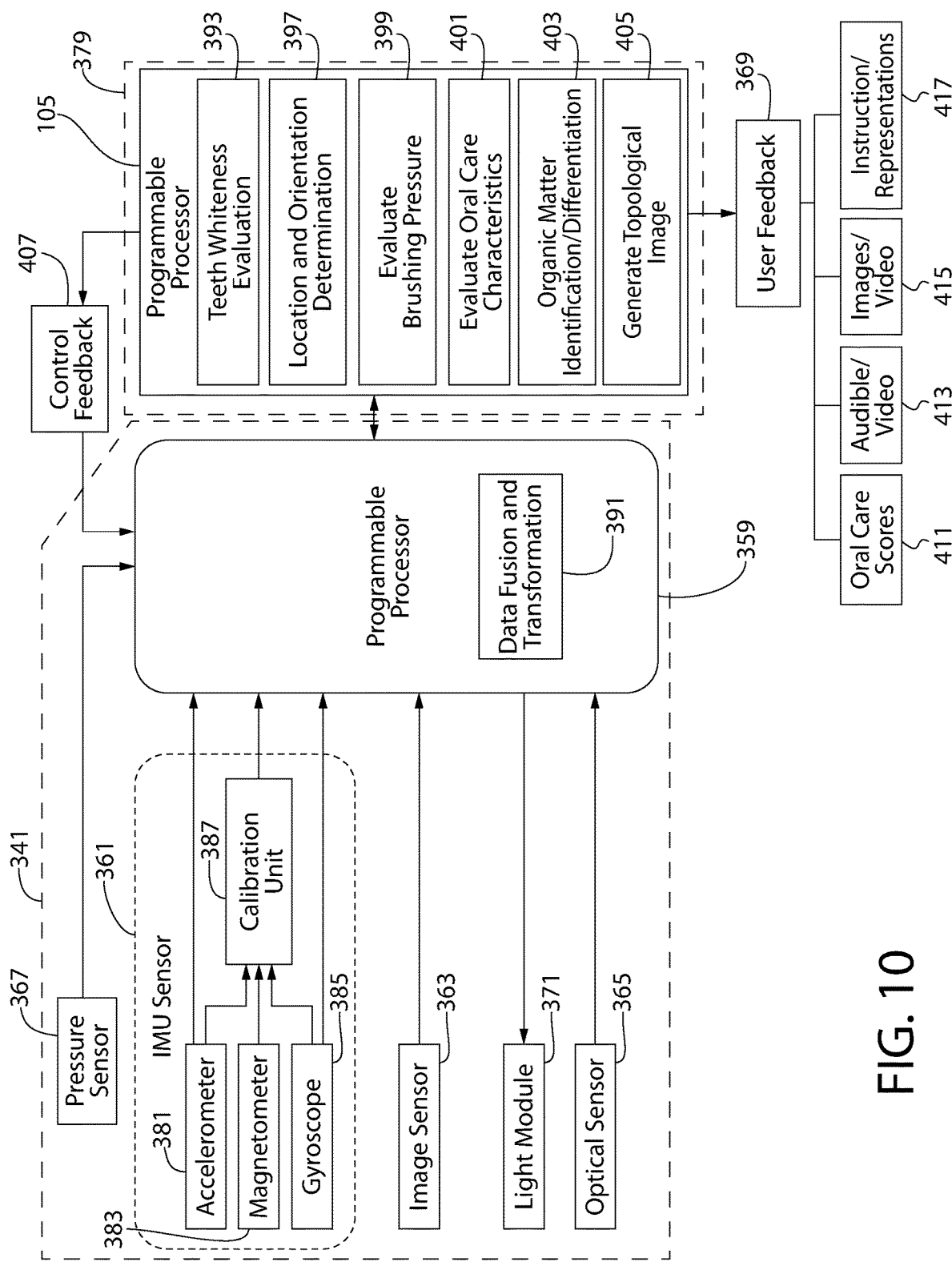
FIG. 10 is a schematic view of operational components of the oral care device of FIG. 8.

FIG. 10 illustrates the flow of data and control signals when using the manual toothbrush 341 as part of the oral care system 101 of FIG. 1. The data flow shown includes raw sensor data from the plurality of sensors, transformed sensor data, and feedback provided both to the user and to other components of the oral care system 101. As previously indicated, the programmable processor 359 is operatively coupled to each of the IMU 361, the image sensor 363, the optical sensor 365, the light module 371, and the pressure sensor 367 of the manual toothbrush 341, and each of these aforementioned components are included as part of the manual toothbrush 341. The programmable processor 359 is communicably coupled, by either a wired or wireless connection, to the programmable processor 379, which in this exemplary embodiment is part of the programmable device 105. In certain embodiments, the programmable processor 379 is also communicably coupled to the programmable processor (not shown) of the server 107.

The IMU 361 includes a 3-axis accelerometer 381, a 3-axis magnetometer 383, a 3-axis gyroscope 385, and an internal calibration unit 387. In certain embodiments, the IMU 361 may also include a wireless communication module which may be used to enable direct wireless communications with the programmable processor 379 of the programmable device 105. The accelerometer 381 generates 3-axis linear acceleration data based in x, y, z coordinates, and that linear acceleration data is directed both to the calibration unit 387 and to the programmable processor 359. The magnetometer 383 generates 3-axis magnetic direction data, and that magnetic direction data is directed to the calibration unit 387. The gyroscope 385 generates 3-axis orientation data based in x, y, z coordinates, and that orientation data is directed both to the calibration unit 387 and to the programmable processor 359. The calibration unit 387 orients sensor data from the accelerometer 381 and the gyroscope 385, using sensor data from the magnetometer 383, so that the sensor data from both are aligned with the device coordinate system.

The image sensor 363 generates image data, and that image data is directed to the programmable processor 359. In the exemplary embodiment, the image data may be one of two types. The first type is image data that represents external images of the oral cavity generated during a brushing routine. The second type is image data the represents images of the teeth cleaning elements 349 that are generated at times outside of a brushing routine. In certain embodiments, the image sensor 363 may be utilized to generate image data of other than the two aforementioned types.

The optical sensor 365 generates optical sensor data, and that optical sensor data is directed to the programmable processor 359. In this exemplary embodiment, the optical sensor data represents optical feedback resulting from light from the light module 371 being incident on organic matter within the oral cavity of the user. When light from the light module 371 is incident on organic matter, the optical feedback may be one of reflected light or fluoresced light. In certain embodiments, the optical sensor 365 may be positioned with the head 347 and receive the optical feedback through a light scattering element having a known scatter pattern, such as a diffuser, a patterned mask, or an array of microlenses. In such embodiments, the optical sensor data may include 3-dimensional topographical image data, which is also generated from the optical feedback.

In certain embodiments, the optical sensor 365 may benefit from regular color calibration. In such embodiments, reflectance of light from the light module 371 off a calibration surface having a known color or color scheme may be used to calibrate the optical sensor 365 to an established standard. In certain embodiments, the calibration surface may be incorporated as part of a cap for the teeth cleaning elements 349.

The programmable processor 359 receives the sensor data from each of the sensors and performs data fusion and transformation processes 391 on the sensor data. This data fusion and transformation process generates transformed sensor data. As part of this transformation process, the orientation data is expressed in terms of an angular orientation system. In the exemplary embodiment, the orientation data is transformed to be expressed in terms of quaternion units. In other embodiments, the orientation data is transformed to be expressed in terms of Euler angles. In the exemplary embodiment, the transformed sensor data also includes all non-transformed parts of the sensor data, so that all the collected sensor data is combined, or fused, together into groupings, thereby facilitating further analysis, as a whole, of all the collected sensor data. In addition, significant portions of the sensor data may have other individual usefulness during the data analysis process. In certain embodiments, the programmable processor 379 may perform some or all of the data fusion and transformation processes.

The programmable processor 359 communicates the fused and transformed sensor data to the programmable processor 379 for analysis. As shown, the programmable processor 379 is included as part of the programmable device 105. However, in certain embodiments, the programmable processor 379 may be included as part of the server 107. Still in other embodiments, the processes described herein as being performed by the programmable processor 379 may be distributed across multiple programmable processors, whether each such programmable processor is part of the oral care device 103, the programmable device 105, or the server 107. The analysis of the transformed sensor data may include one or more of: an evaluation of tooth enamel whiteness 393; a location and orientation determination 397 of the reference surface 351 of the head 347 within the oral cavity during a brushing routine; evaluate brushing pressure 399; an evaluation of oral care characteristics 401 for the user; and perform identification of and differentiation between organic matter 403 within the oral cavity. In embodiments in which the optical sensor 365 is positioned in the head 347 of the electric toothbrush 341, the analysis may also include generating a 3-dimensional topographical image 405 of the oral cavity. Other types of analyses may also be performed by the programmable processor 379.

In certain embodiments, the process of identifying and differentiating between organic matter 403 within the oral cavity may focus on identifying, and differentiating between, hard oral tissue, soft oral tissue, and plaque. In certain other embodiments, the process of identifying organic matter 403 within the oral cavity may also include identifying, and differentiating between, protoporphyrin, blood, soft oral tissue that is hydrated or dehydrated, and the potential presence of caries in tooth enamel. In still other embodiments, the process of identifying organic matter 403 within the oral cavity may include identification, and differentiating between, other types of organic matter.

The evaluation of oral care characteristics 401 may include one or more of an oral health characteristic, a brushing effectiveness characteristic, and a teeth whiteness characteristic. Any one or more of these characteristics may be evaluated based on individual sections within the oral cavity or based on the oral cavity as a whole. In certain embodiments, the oral health characteristic may include at least one of a soft tissue health characteristic and a hard tissue health characteristic. In certain embodiments, the soft tissue health characteristic may include at least one of a soft tissue coloration characteristic, a bleeding characteristic, a blood oxygenation characteristic, and a tissue hydration characteristic. In certain embodiments, the hard tissue health characteristic may include at least one of a caries characteristic and a bacterial presence characteristic. In certain embodiments, the brushing effectiveness characteristic may include at least one of a brushing pressure characteristic, a stroke frequency characteristic, a bacterial presence characteristic, and a caries characteristic.

Following analysis of the transformed sensor data, the programmable processor 379 may communicate control feedback 407 to the programmable processor 359. In certain embodiments, the control feedback 407 may include control data which the programmable processor 359 uses for purposes of controlling operation of one or more of the plurality of sensors. For example, the control feedback 407 may be a signal to activate or deactivate one or more of the sensors. By way of another example, the control feedback 407 may be a signal to increase or decrease the rate at which one or more of the sensors generates sensor data.

Also following analysis of the transformed sensor data, the programmable processor 379 may communicate user feedback 409 to the user. This user feedback 409 may include one or more of an oral care score 411 reflecting one or more of evaluated oral care characteristics, audible and/or visual signals 413 to the user during the brushing routine, images and/or video 415 obtained during the brushing routine, and advice or instructive representations 417 of the sensor data and/or data analysis performed using the sensor data. In certain embodiments, the audible and/or visual signals 413 used as feedback to the user may be made using the programmable device 105. In certain embodiments, the manual toothbrush 341 may include a speaker and/or an LED mounted to the handle 303 so that the real-time audible and/or visual signals 413 may be made using the manual toothbrush 341. In certain embodiments, the audible and/or visual signals may provide real-time information to the user about the position of the head of the oral care device 103 within the oral cavity and an evaluation of the oral health characteristics at that position. In certain embodiments, the audible signal may be generated by interfacing the oral care system 101 with a voice assistant platform. In such embodiments, the feedback 409 would be communicated to the voice assistant platform by the programmable processor 379, and the voice assistant platform would provide audible feedback to the user in the form of spoken words.

Figure 11A:
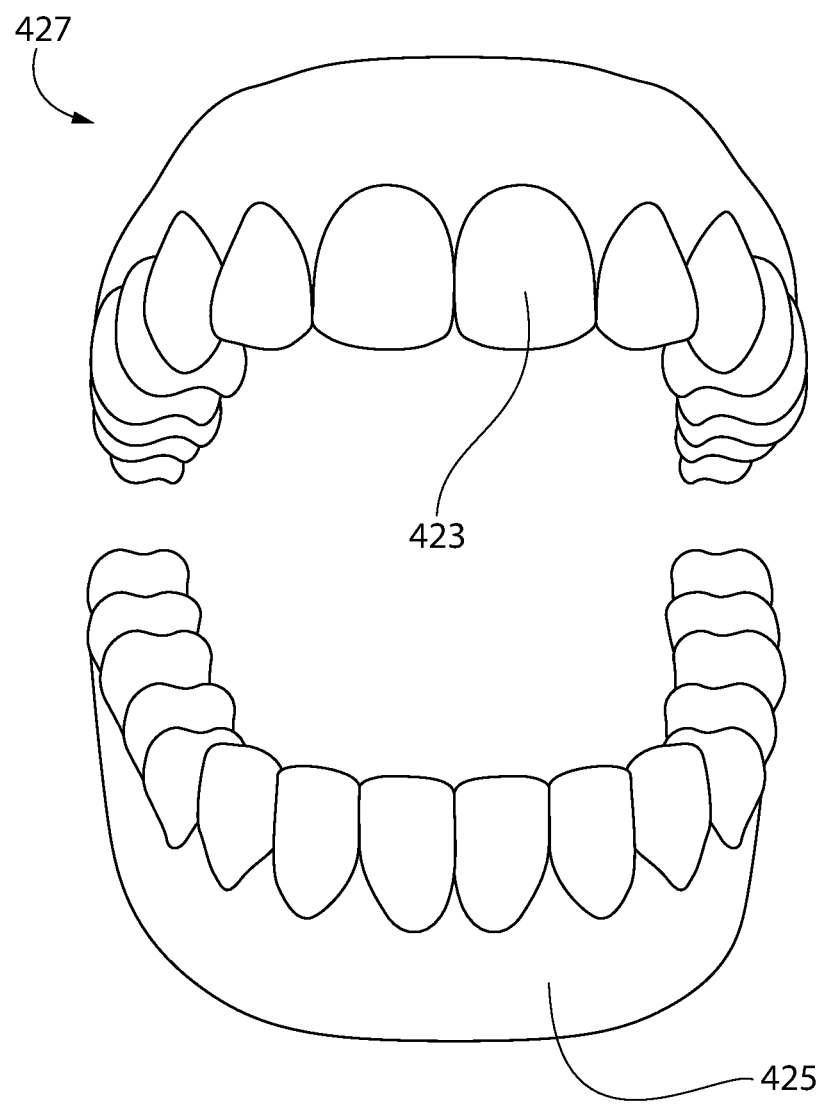
FIG. 11A illustrates the soft and hard tissue within a user's mouth.

FIG. 11A illustrates an oral cavity 421 of a user, albeit without and surrounding facial tissue or features. The oral cavity 421 includes both hard oral tissue 423, in the form of teeth, and soft oral tissue 425, in the form of gums. As indicated above, the oral care system 101 will operate to differentiate when the reference face of the oral care device is positioned over soft oral tissue 425. As will be described in greater detail below, the oral care system 101 is able to change the stroke frequency of a vibratory motor in an electric toothbrush embodiment in order to account for the type of oral tissue 423, 425 being brushed. By way of example, the oral care system 101 is able to change the stroke frequency of a vibratory motor in an electric toothbrush embodiment when teeth cleaning elements are positioned over hard oral tissue and additional brushing is warranted. Also, the oral care system 101 is able to change the stroke frequency of a vibratory motor in an electric toothbrush embodiment when the user is either applying too much pressure or too little pressure during a brushing routine in order to increase the effectiveness of the brushing routine.

Figure 11B:
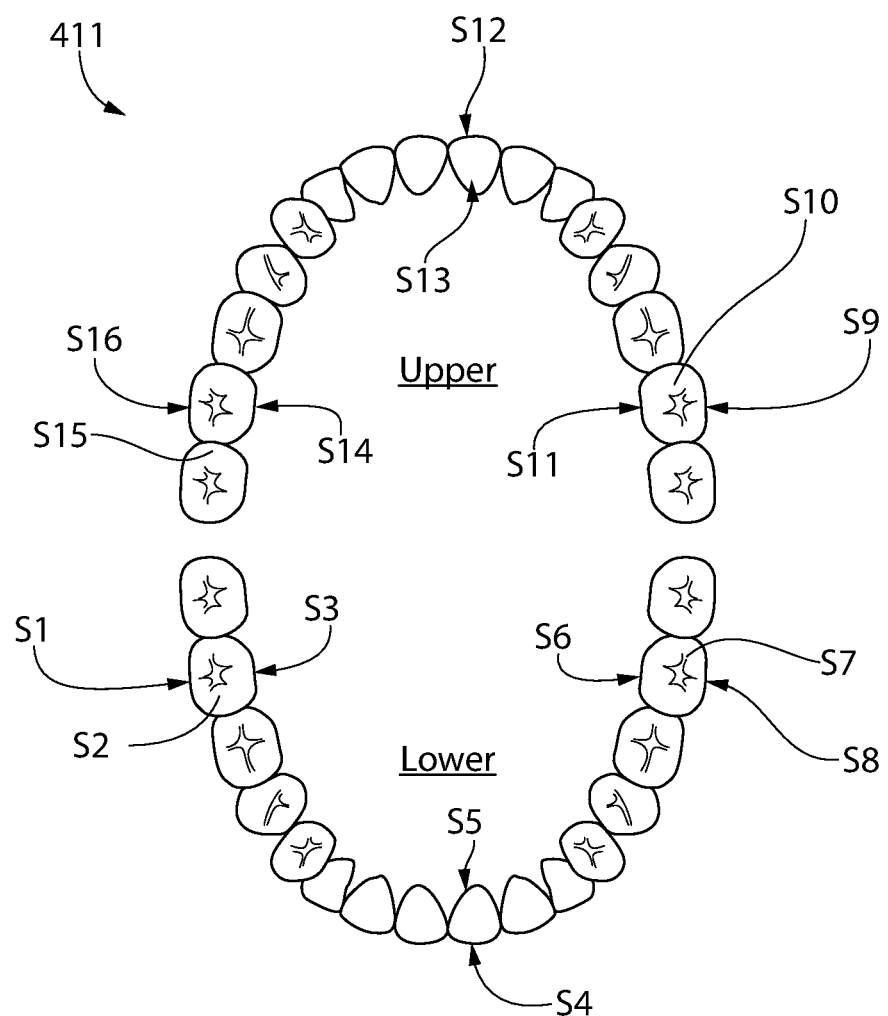
FIG. 11B illustrates the upper and lower teeth within a user's mouth.

FIG. 11B illustrates a layout view of the upper and lower teeth 427 for the typical user. In order for the oral care system to operate efficiently, the teeth are divided up into 16 sections, described and labeled with section numbers as follows: Bottom Right Outside (BRO) S1; Bottom Right Top (BRT) S2; Bottom Right Inside (BRI) S3; Bottom Front (BF) S4; Bottom Back (BB) S5; Bottom Left Inside (BLI) S6; Bottom Left Top (BLT) S7; Bottom Left Outside (BLO) S8; Top Left Outside (TLO) S9; Top Left Bottom (TLB) S10; Top Left Inside (TLI) S11; Top Front (TF) S12; Top Back (TB) S13; Top Right Inside (TRI) S14; Top Right Bottom (TRB) S15; and Top Right Outside (TRO) S16. The section numbers will be referenced in the description below. As can be seen, there are three sections for each of the four corners of the oral cavity, and there are four sections for the front of the oral cavity. For each corner, each section is defined by, respectively, the top, inside, and outside surface of the molars and bicuspids. For the front, each section is defined by the front and back of the top and bottom incisors.

Figure 12:
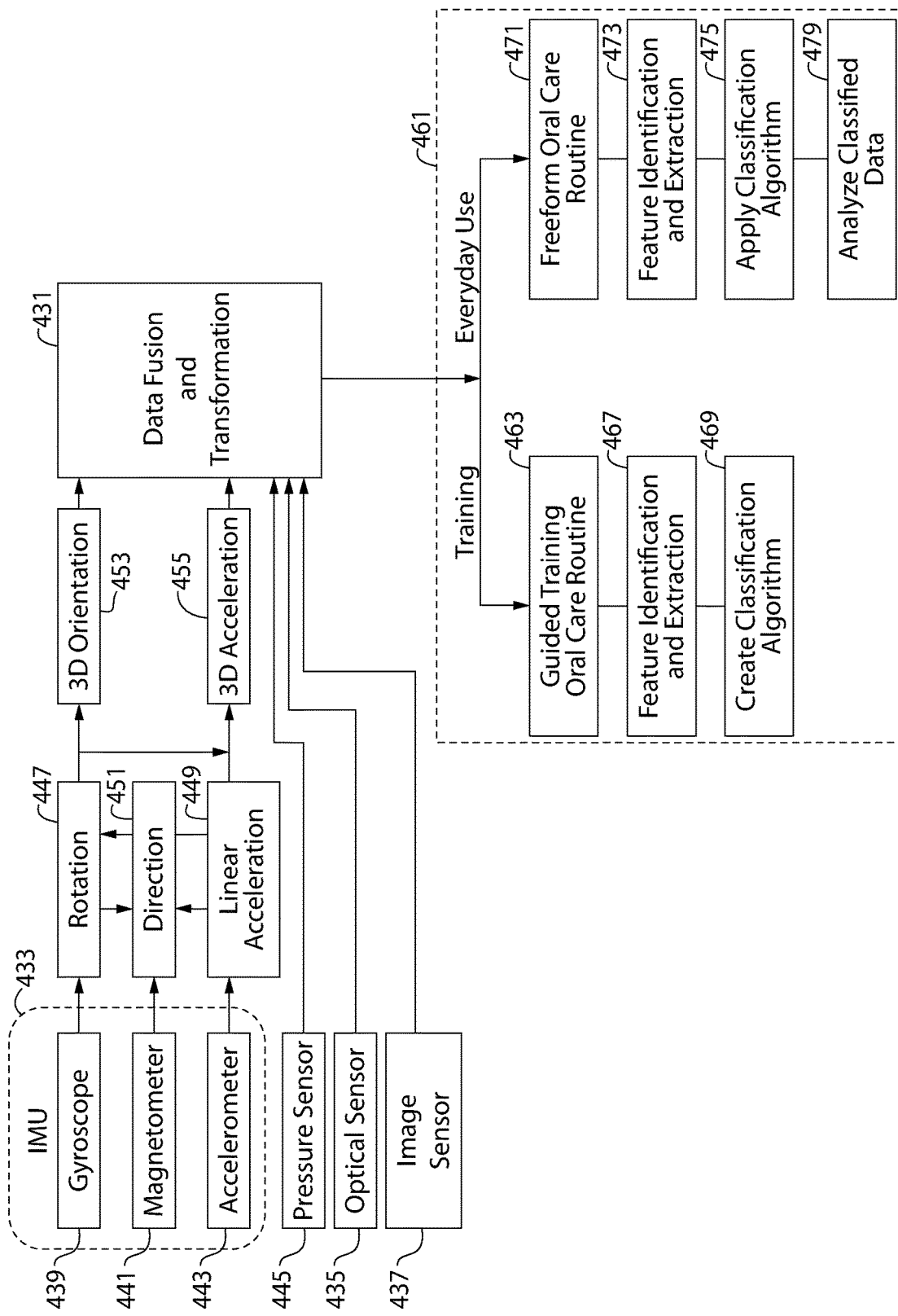
FIG. 12 is a schematic diagram showing dataflow within the oral care system of FIG. 1.

FIG. 12 illustrates the manner in which the sensor data is processed for the oral care system 101. While this process is described in connection with the oral care device 151 of FIG. 2, it should be readily apparent that this same process also applies to the toothbrushes 251, 341 of FIGS. 5 and 8 and for any other embodiment within the scope of the claims. This same process may be used for determining the location and orientation of the reference face within the oral cavity, actively controlling the vibratory motor in an electric toothbrush embodiment during a freeform oral care routine, evaluating oral care characteristics and providing feedback therefor, and determining when the teeth cleaning elements are ready for a recommended replacement based on actual wear.

As used herein, when this process is used in connection with an oral care device which is embodied as a toothbrush, the oral care routine may be referred to as a brushing routine. Similarly, a freeform oral care routine may be referred to as a freeform brushing routine, and a training oral care routine may be referred to as a training brushing routine.

This process starts with generation sensor data by the by the plurality of sensors, including the IMU 433, the optical sensor 435, and the image sensor 437. The process may use all of the sensor data or any subset thereof. As has already been discussed, within the IMU 433 the gyroscope 439 generates 3-axis orientation data based in x, y, z coordinates, the magnetometer 41 generates 3-axis magnetic direction data, and the accelerometer 443 generates 3-axis linear acceleration data based in x, y, z coordinates. A pressure sensor is 445 shown for purposes of illustrating a full set of sensors as described above, however, the as was discussed previously the accelerometer 443 can be used to measure a pressure of the teeth cleaning elements on oral tissue within the oral cavity. The optical sensor 435 generates optical sensor data that shows the spectrum of the optical feedback, and the image sensor 437 generates image data representing images of the exterior of the user's mouth during an oral care routine and images of the teeth cleaning elements 121 at times other than during an oral care routine.

Both the orientation data 447 and the linear acceleration data 449 are informed by the magnetic direction data 451 in order to generate 3-dimensional orientation data 453 and 3-dimensional linear acceleration data 455 from each that use a magnetic direction as a reference direction. The 3-dimensional orientation data 453 and the 3-dimensional linear acceleration data 455 are received by the data fusion and transformation process step 431. Similarly, the sensor data generated by each of the optical sensor 435 and the image sensor 437 are also received by the data fusion and transformation process step 431. In the data fusion and transformation process step 431, the sensor data from all the sensors are arranged so that the sensor data from each sensor is associated with contemporaneous sensor data from each of the other sensors. In addition, the 3-dimensional orientation data is transformed so that it is expressed in terms of an angular orientation system. In the exemplary embodiment, the angular orientation system is quaternion units. In certain embodiments, the angular orientation system may be Euler angles. In quaternion units, the angular orientation and rotation are expressed in terms of W, x, y, z variables, where W ranges from −1 to 1 and is indicative of rotation, and two full rotations span the entire range of the W variable.

Figure 32:
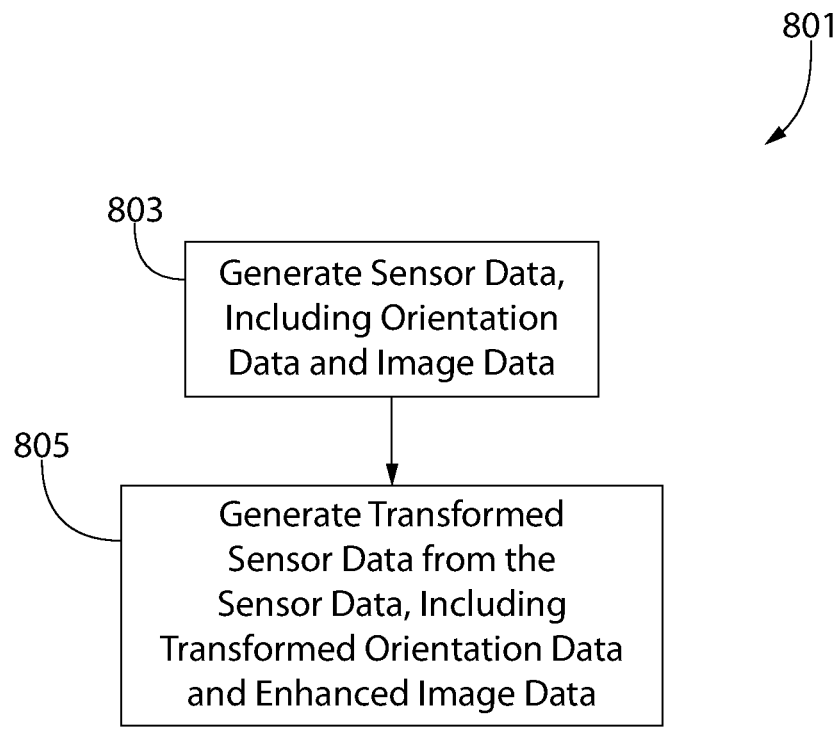
FIG. 32 illustrates a process flow for generating enhanced image data using the oral care system of FIG. 1.
Figure 33A:
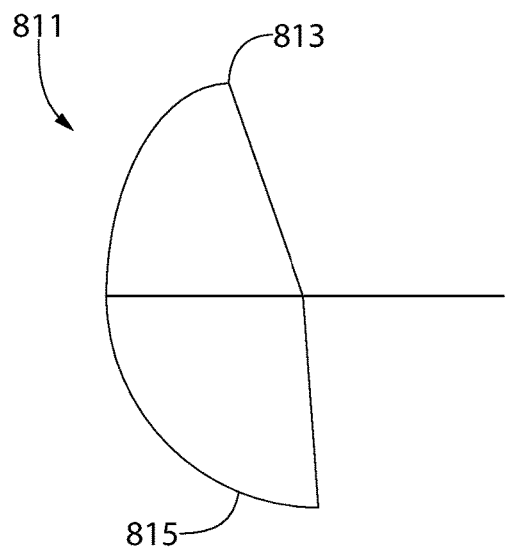
FIGS. 33A-D illustrate overlays that may be used for generating enhanced image data using the process flow of FIG. 32.

FIGS. 32-33A-D illustrate an embodiment of a process that may be performed by the programmable processing device 165 to generate enhanced image data from the orientation data and from the image data generated by the image sensor 437. In certain embodiments, this process of generating enhanced image data is performed during the data fusion and transformation step 431 (see FIG. 12). FIG. 32 shows a flowchart 801 for a process that may be used for generating the enhanced image data. The first step 803 of this process is to generate the sensor data from the various sensors, as is described in detail above. For purposes of the process of flowchart 801, the sensor data includes both orientation data and image data. As described above, the orientation data is generated by the IMU 433, and the sensor data is generated by the image sensor 437. The second step 805 of this process is to generate transformed sensor data from the sensor data. The transformed sensor data, for purposes of the process of flowchart 801, includes transformed orientation data and enhanced image data, and similar to processes described above, these data transformations may occur in the data fusion and transformation step 431. Also as described above, the transformed orientation data may be in quaternion units or Euler angles. For ease of description, the following description of generating enhanced image data is made with reference to the transformed orientation data being in quaternion units.

Figure 13:
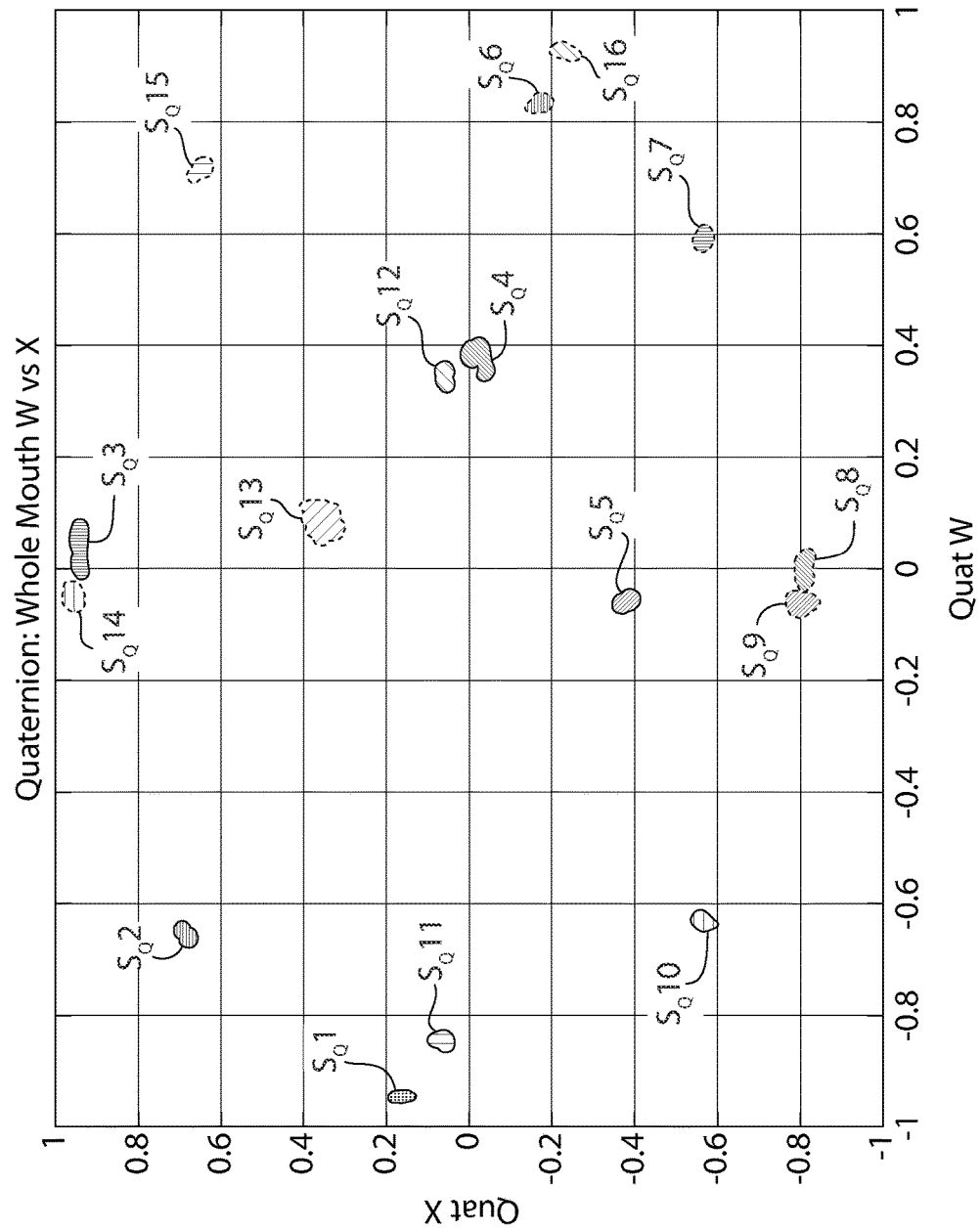
FIG. 13 is a graph illustrating position data for an oral care device of the oral care system of FIG. 1, the position data transformed into quaternions.

In this embodiment, the transformed sensor data is generated as described above, with the addition that the x, y, z variables also range from −1 to 1 so that the vector defined by these variables, as part of the quaternion data, has a unit length. As indicated in FIG. 13 and the accompanying description below, a plot of x vs. W can help determine the position and orientation of the oral care device in the oral cavity. Also, as described herein, images from the image sensor can help resolve any ambiguity in the position and orientation that may result from analysis of x vs. W. The enhanced image data, therefore, represents a combination of external images of the oral cavity, as generated by the image sensor, with representations of the W and x variables of the quaternion data, such that each external image is combined with a representation of the corresponding transformed orientation data, and specifically with a representation of the corresponding W and x variables of the quaternion data. The enhanced images, therefore, include all the information needed by the programmable processor(s) to determine the location and orientation of the head of the oral care device within the oral cavity. In certain embodiments, the combination of an external image with the representation of the corresponding transformed orientation data may result in the external image being displayed side-by-side with the representation of the corresponding transformed orientation data. In certain other embodiments, the combination of an external image with the representation of the corresponding transformed orientation data may result in the representation of the corresponding transformed orientation data being added as an overlay to the external image. In such embodiments, the overlay of the representation of the transformed orientation data may be positioned on the external image so that it appears in a corner of the external image and does not interfere with subsequent analysis of the external image portion of each enhanced image.

In certain embodiments that generate such enhanced image data using a first programmable processor, the first programmable processor may transmit only the motion data and the enhanced image data to the second programmable processor for further processing and analysis, as described herein, during all oral care routines. In such embodiments, the transformed orientation data may be omitted from such transmissions because the enhanced image data includes sufficient information to determine the orientation and location of the oral care device within the oral cavity. In certain other embodiments, the first programmable processer may transmit to the second programmable processor all of the transformed sensor data during training oral care routines, and then transmit only the motion data and the enhanced image data to the second programmable processor during subsequent freeform oral care routines.

FIGS. 33A-D illustrate several embodiments of representations of the quaternion data that may be combined with the external images in order to generate the enhanced image data. FIG. 33A shows an embodiment of a representation of transformed orientation data 811 (which in these embodiments is quaternion data) that includes two partial arcs, an upper arc 813 and a lower arc 815. The upper arc 813 encodes the W variable, while the lower arc 815 encodes the x variable. The upper arc 813 encodes the W variable within the arclength, with an arclength of 0 representing W=−1, an arclength of 90° representing W=0, and an arclength of 180° representing W=1. Arclengths between any two of these three points may use one or more of these predetermined points to estimate the value of W during subsequent analysis of the enhanced image data. Similarly, the lower arc 815 encodes the x variable within the arclength, with an arclength of 0 representing x=−1, an arclength of 90° representing x=0, and an arclength of 180° representing x=1. Again, arclengths between any two of these three points may use one or more of these predetermined points to estimate the value of x during subsequent analysis of the enhanced image data. The orientation of the arcs 813, 815 is used here for ease of description only. When the representation of transformed orientation data 811 is used to generate the enhanced image data, the representation of transformed orientation data 811 may be combined with the external image so that it has a consistent orientation. That consistent orientation need not bear any correlation to the orientation of the representation of transformed orientation data 811 as shown in FIG. 33A.

Figure 33B:
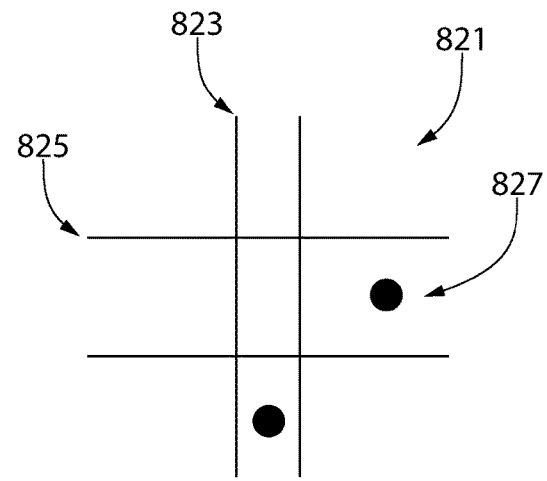

FIG. 33B shows a second embodiment of a representation of transformed orientation data 821 (again, quaternion data) that includes two vertical lines 823 and two horizontal lines 825 forming a mesh pattern. In this embodiment, the two vertical lines 823 encode the W variable by the distance separating the two vertical lines, and the two horizontal lines 825 encode the x variable by the distance separating the two horizontal lines 825. Two spots 827 are included, both having the same diameter, with one placed equidistant between the two vertical lines 823, and the other placed equidistant between the two horizontal lines 825. The spot 827 between the two vertical lines 823 may be placed in one of two predetermined fixed positions, one position being above the horizontal lines 825 and the other position being below the horizontal lines 825. Similarly, the spot 827 between the two horizontal lines may be placed in one of two predetermined fixed positions, one position being above the vertical lines 823 and the other position being below the vertical lines 823.

This arrangement provides the ability to fully encode both the W and x variables. When the two vertical lines 823 are a distance apart equal to the diameter of the spot 827, then W=0. When the two vertical lines 823 are a distance apart where one is tangent to the spot 827 between the two horizontal lines 825, then W=1. When the two vertical lines 823 are halfway between these two extremes, then W=0. Separation distances of the two vertical lines 823 between any two of these three points may use one or more of these predetermined locations/values to estimate the value of W during subsequent analysis of the enhanced image data. When the spot 827 is in the predetermined fixed position below the two horizontal lines 825 (as shown), then W is a negative number, and when the spot 827 is in the predetermined fixed position above the two horizontal lines 825, then W is a positive number. The x variable is encoded in a similar manner. When the two horizontal lines 825 are a distance apart equal to the diameter of the spot 827 between the two horizontal lines 825, then x=0. When the two horizontal lines 825 are a distance apart where one is tangent to the spot 827 between the two vertical lines 823, then x=1. When the two horizontal lines 825 are halfway between these two extremes, then x=0. Separation distances of the two horizontal lines 825 between any two of these three points may use one or more of these predetermined locations/values to estimate the value of x during subsequent analysis of the enhanced image data. When the spot 827 is in the predetermined fixed position to the right of the two vertical lines 823 (as shown), then x is a positive number, and when the spot 827 is in the predetermined fixed position above the two vertical lines 823, then x is a negative number.

Figure 33C:
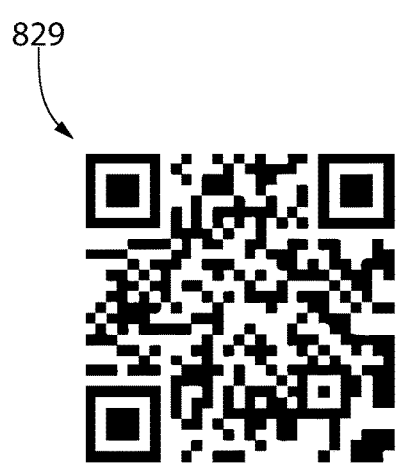

FIG. 33C shows a third embodiment of a representation of transformed orientation data 829 (again, quaternion data) that is in the form of a QR code. The QR code is convenient to use because it is a known structure that can be used for storing data in a graphic format. Since the construction of QR codes are well-known in the arts dealing with such coded graphics, the process of encoding the W and x variables into the representation of transformed orientation data 829 is not discussed herein.

Figure 33D:
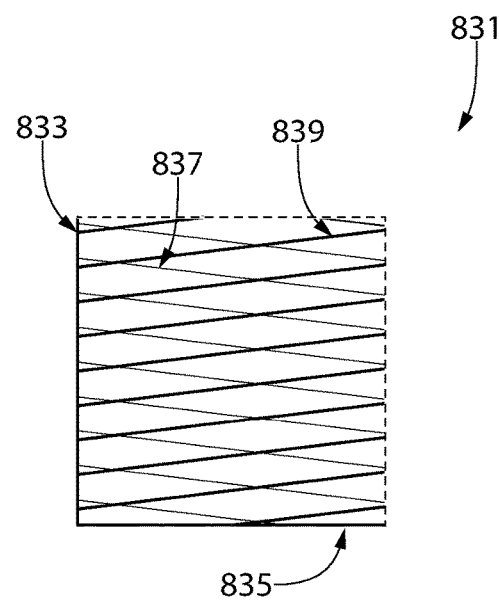

FIG. 33D shows a fourth embodiment of a representation of transformed orientation data 931 (again, quaternion data) in which the W and x variables are encoded in the lines of modified cross-hatch pattern. In this embodiment, the representation of transformed orientation data 931 is bounded two vertical boundary lines 833 and by two horizontal boundary lines 835. The modified cross-hatch pattern includes a first series of parallel lines 837 having a first line width and a second series of parallel lines 839 having a second line width. The line widths of each series of parallel lines 837, 839 are made to be visually distinguishable from each other when combined with or overlaid against one of the external images. The first series of parallel lines 837 represents the W variable, and the second series of parallel lines 839 represents the x variable.

The angle of the first series of parallel lines 837 with respect to the vertical boundary lines 833 represents the value of W, such that when the first series of parallel lines 837 are parallel to the vertical boundary lines 833, W=1, and when the first series of parallel lines 837 are perpendicular to the vertical boundary lines 833, W=0. When the first series of parallel lines 837 are at an angle between any two of these three predefined angles, the angle of the first series of parallel lines 837 with respect to one or more of these predefined angles may be used to estimate the value of W during subsequent analysis of the enhanced image data. In addition, when the left side vertical boundary line 833 is solid, W is negative, and when the right side vertical boundary line 833 is solid, W is positive. The vertical boundary lines 833 are not both solid or both not-solid in any single representation.

Similarly, the angle of the second series of parallel lines 839 with respect to the horizontal boundary lines 835 represents the value of x, such that when the second series of parallel lines 839 are parallel to the horizontal boundary lines 835, x=1, and when the second series of parallel lines 839 are perpendicular to the horizontal boundary lines 835, x=0. When the second series of parallel lines 839 are at an angle between any two of these three predefined angles, the angle of the second series of parallel lines 839 with respect to one or more of these predefined angles may be used to estimate the value of x during subsequent analysis of the enhanced image data. In addition, when the upper side horizontal boundary line 835 is solid, x is positive, and when the lower side horizontal boundary line 835 is solid, x is negative. The horizontal boundary lines 835 are not both solid or both not-solid in any single representation.

It is important to note that FIGS. 33A-D illustrate only exemplary embodiments for representations of the transformed orientation data. Any graphic representation of the W and x quaternion data may be used to generate the enhanced image data. The representations of the transformed orientation data, therefore, is not to be limited unless otherwise expressly stated in the claims.

With the orientation sensor data transformed (and in certain embodiments, with the enhanced image data generated), and all the sensor data fused, the transformed sensor data, which may include all the generated sensor data in addition to the transformed orientation data, is communicated to the machine learning algorithm 461. This machine learning algorithm 461 is a deep learning algorithm that is able to find common features in data sets. Of course, like all machine learning, the algorithm must be trained first with training data. The process, therefore, has a training phase and an everyday use phase. The branch of the algorithm for everyday use needs to be fully trained before it will properly work during a user's regular freeform oral care routine.

In the training phase, the algorithm is trained to look for common features of data in each classified data set. A large set of sample data is acquired, including sensor data from all the sensors and the transformed orientation data, all collected during training oral care routines. The training oral care routines are guided routines in which the user is asked to start in one section of the oral cavity, brush for a pre-determined period of time (e.g., 5-10 seconds in each section of the oral cavity) and then move on to brush the next indicated section of the oral cavity.

As part of this deep learning process, it is desirable to generate and analyze sensor data that includes more than 500 images from the image sensor 169 for each section of the oral cavity during training oral care routines. Because images from each section of the oral cavity are grouped as part of the sensor data, which also includes the transformed orientation data, the machine learning algorithm is able to be more efficient at identifying commonalities and correlations within the sensor data. As the deep learning proceeds during the training process, the deep learning algorithm performs feature identification and extraction 467 in order to identify those features which are indicative of shared commonalities within the data. Such deep machine learning is well-known in other areas of technology, such as robotics, and is therefore not discussed in any significant detail herein.

By proceeding through a training oral care routine that is guided, the user is able to generate hundreds, or even thousands if needed, of images and sensor data from each section and while brushing each section of the oral cavity. Through these many, many images, the deep learning algorithm is able to identify subtle differences amongst the images taken from the different sections of the mouth. These images alone, however, do not provide sufficient context to be able to determine the location and orientation of the head 115 of the examination device 151 within the user's oral cavity. The quaternion units, however, are able to provide that context upon analysis by the deep learning algorithm in connection with the images.

FIG. 13 is a graph 501 representing W vs. X for quaternion units obtained during an oral care routine. This graph illustrates that transformed sensor data from many of the sections of the oral cavity stand sufficiently apart from others, thereby allowing them to be easily identified and classified according to which section the head was in during the oral care routine when the sensor data was generated. Moreover, if transformed sensor data from these sections of the oral cavity are readily identifiable on the graph 501, then those sections will also stand out when the transformed sensor data is analyzed by a deep machine learning algorithm. The sections that stand out in the transformed sensor data and are sufficiently separated from other sections include: $S_Q2$, $S_Q5$, $S_Q7$, $S_Q10$, $S_Q13$, and $S_Q15$.

Figure 14A:
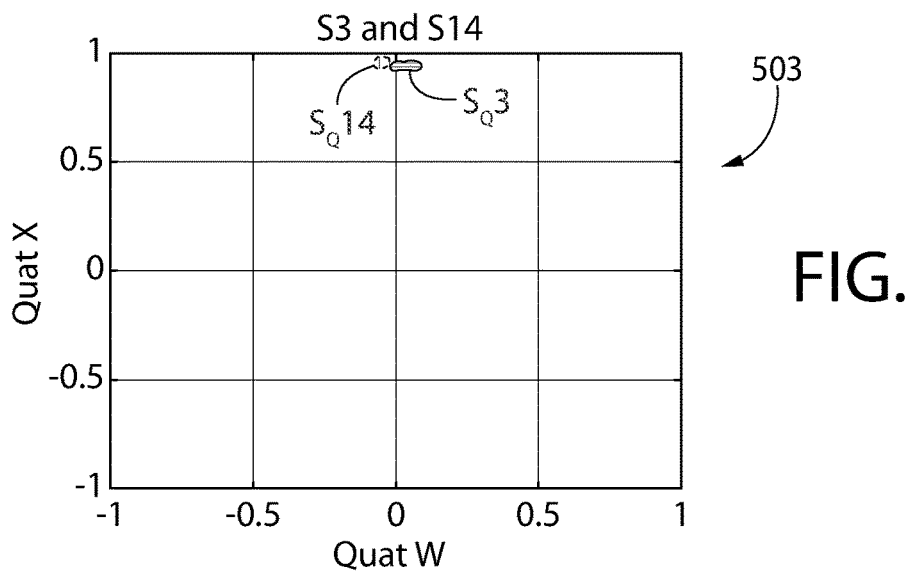
FIGS. 14A-E are graphs showing isolated pairs of position data from FIG. 13.
Figure 14B:
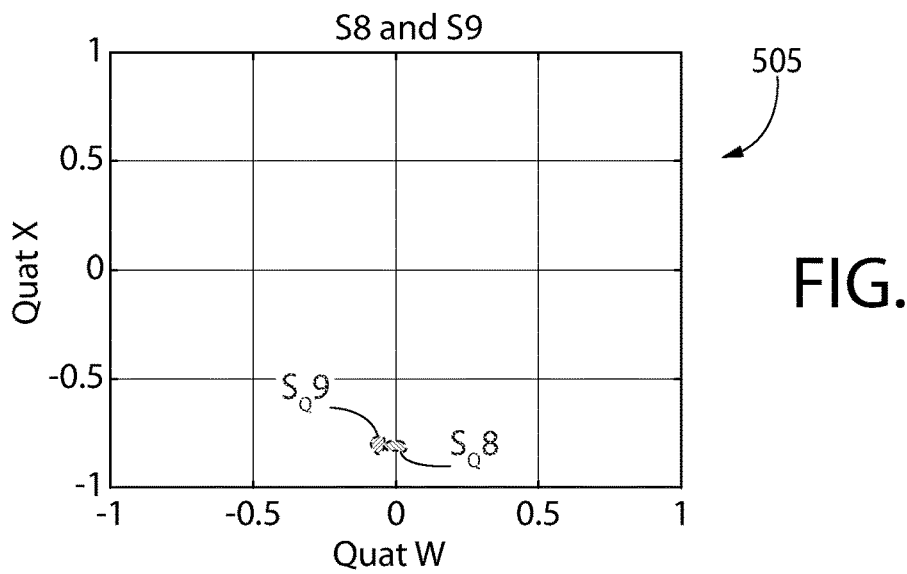
Figure 14C:
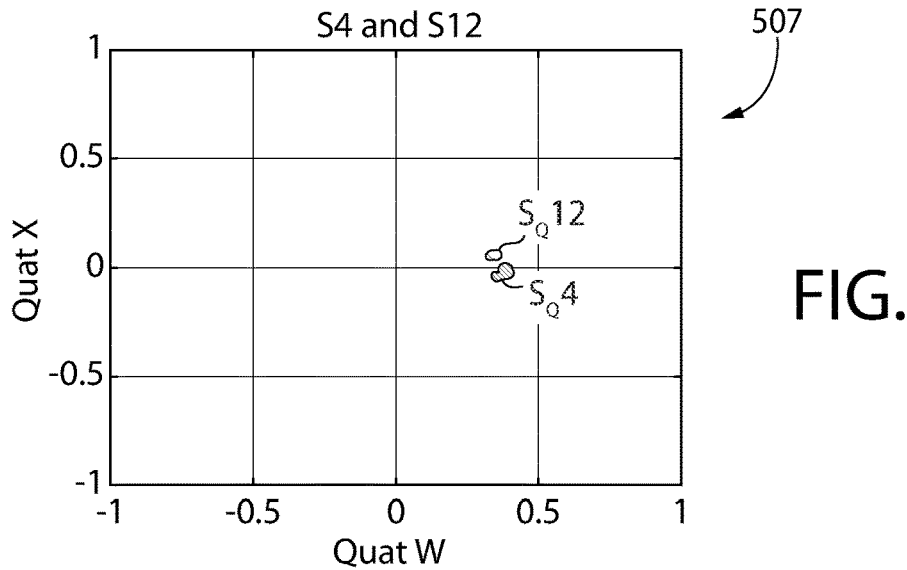
Figure 14D:
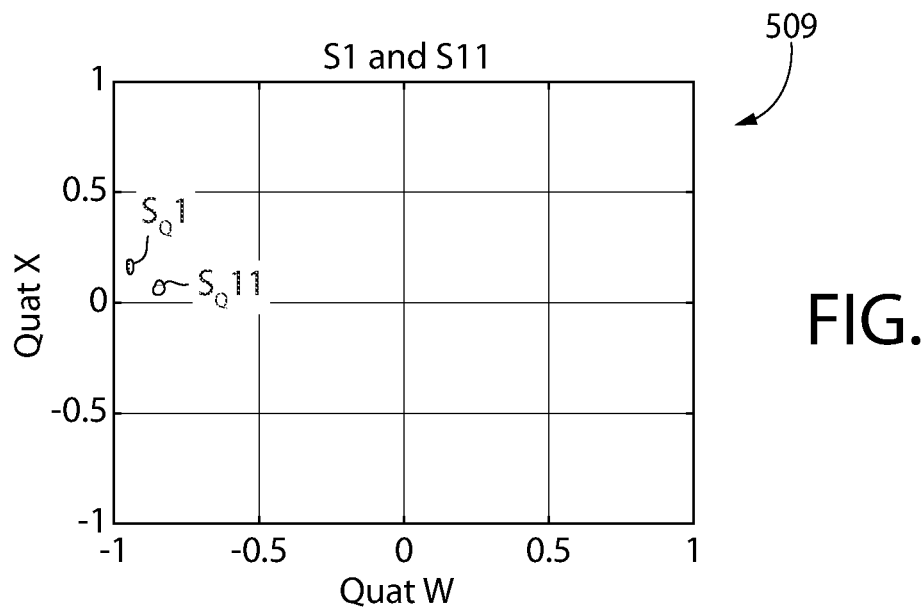
Figure 14E:
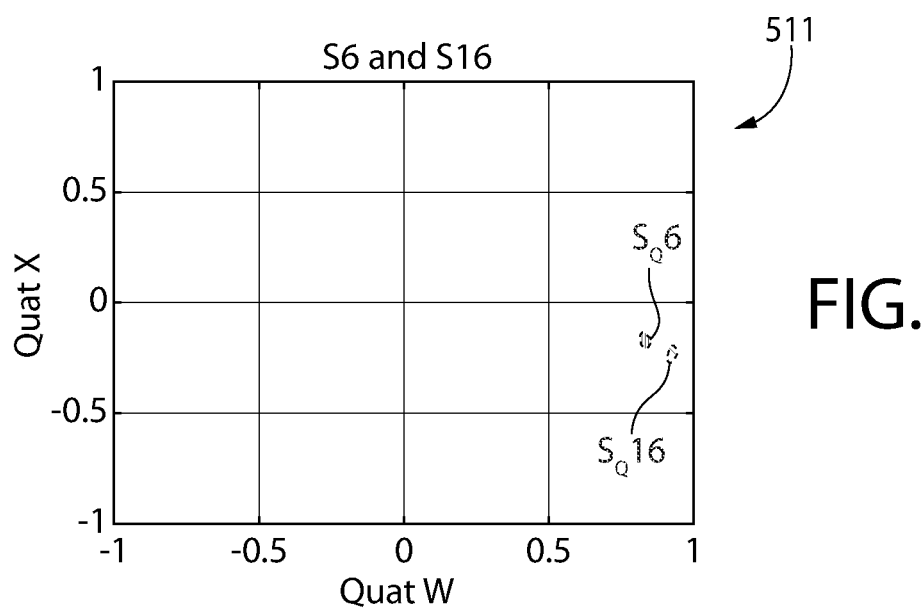

Another thing that is evident from this graph 501 is that transformed sensor data from some sections aren't sufficiently set apart from the sensor data from other sections, and all of these closely grouped sensor data sections are in pairs. These pairs of transformed sensor data, shown in FIGS. 14A-E, either overlap or are too close to each other to easily discern which group belongs to which section of the oral cavity. These pairs of include: $S_Q3$ and $S_Q14$, as shown in the graph 503 of FIG. 14A; $S_Q8$ and $S_Q9$, as shown in the graph 505 of FIG. 14B; $S_Q4$ and $S_Q12$, as shown in the graph 507 of FIG. 14C; $S_Q1$ and $S_Q11$, as shown in the graph 509 of FIG. 14D; and $S_Q6$ and $S_Q16$, as shown in the graph 511 of FIG. 14E.

Even those these pair groupings are too close to each other to be easily distinguishable based on the transformed sensor data alone, they can be differentiated once the deep machine learning algorithm processes them in conjunction with the image data obtained from the image sensor 169. Moreover, once the location and orientation of the reference face 153 of the head 115 within the oral cavity can be confidently determined, then data from the other sensors can be used to greater advantage.

Figure 15:
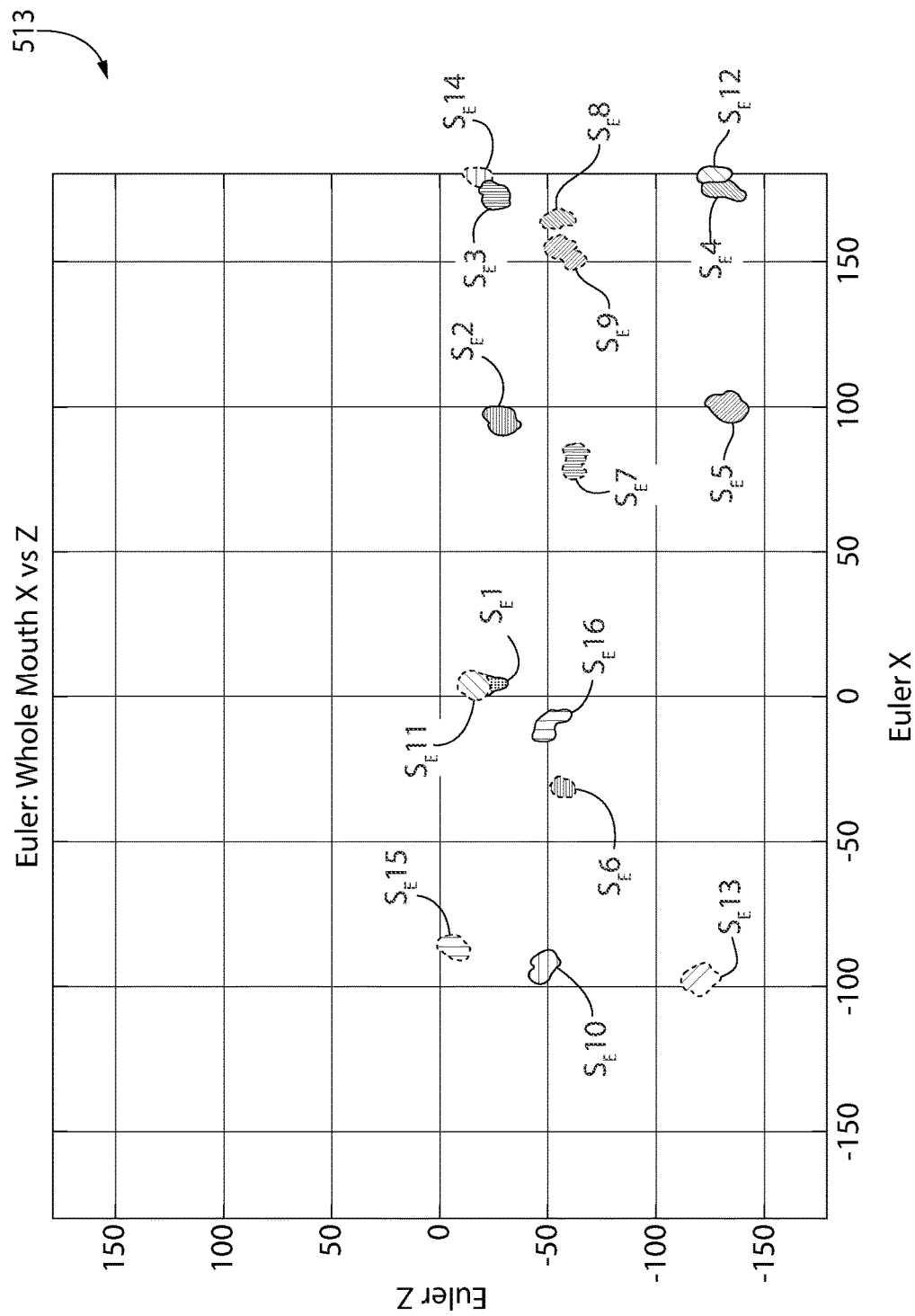
FIG. 15 is a graph illustrating position data for an oral care device of the oral care system of FIG. 1, the position data transformed into Euler angle units.
Figure 16:
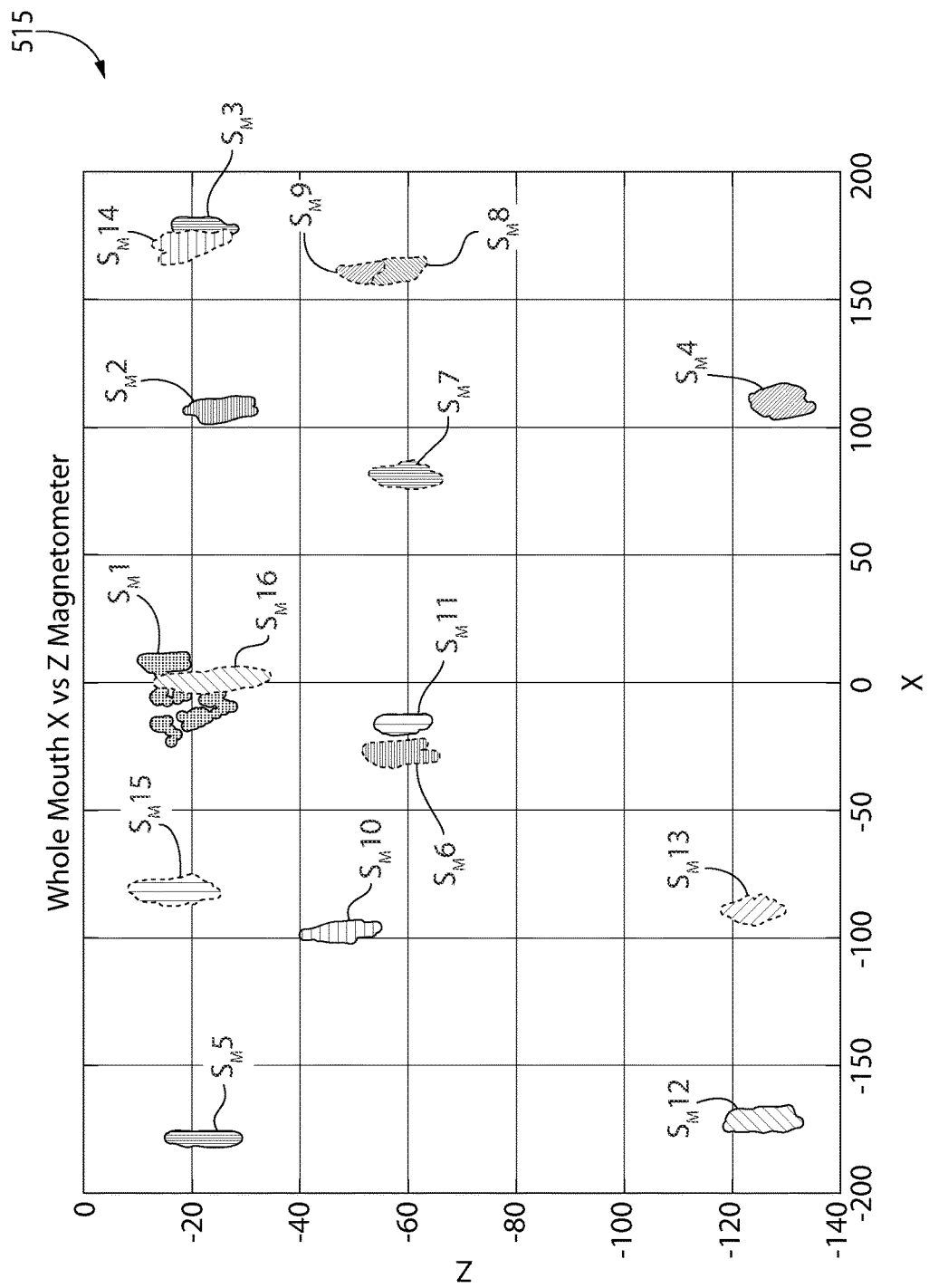
FIG. 16 is a graph illustrating magnetometer data for an oral care device of the oral care system of FIG. 1.

By way of comparison, FIG. 15 is a graph 513 showing the comparison of x vs. z when the IMU sensor data 433 is transformed into Euler angles. This graph 513 demonstrates that the transformation of the orientation data into Euler angles can also create differentiation in the transformed sensor data between several of the different sections of the oral cavity. Therefore, transformation of the orientation data into Euler angles enables identification and differentiation of the different sections of the oral cavity when combined with image data from the image sensor 169 and processed using deep machine learning analysis. By way of a contrasting comparison, FIG. 16 is a graph 515 showing the comparison of x vs. z from the magnetometer data. While a few of the IMU sensor data clusters are separated from the others, several of them are also too close together to be able to differentiate them without additional sensor data that enables such differentiation. However, the sections with overlapping data in graph 515 would not be easily discernible even with the addition of the image data from the image sensor 169. This is because the sections with overlapping data, such as S1 and S16, are all so close to each other within the oral cavity that the image data would not serve to provide sufficient differentiation.

Returning to FIG. 12, with the training oral care routines providing oral care routine data for analysis, the classification algorithm can be created 469. Then, a user can take advantage of the oral care system 101 and the machine learning to accurately track the location and orientation of the reference face 153 of the head 115 during a freeform oral care routine 471. In the feature identification and extraction step 473, the oral care features that the user wants to track are identified and the relevant data is extracted from the transformed sensor data. Once the oral care features are identified, the data necessary for tracking the selected features can be extracted from the transformed sensor data. The classification algorithm, which is based on analysis of oral care routine data from training oral care routines, is then applied 475 to the extracted data to determine whether that extracted data fits into the established classification. Whether the extracted data fits into the classification or not is then incorporated into the analysis of the classified data 479. Among the analysis is a determination of the location and orientation of the reference face 153 of the head 115 in the oral cavity. The oral care system 101 can further provide the user with numerous oral care evaluations, examples of which are detailed below. Advantageously, the evaluations of oral care may be provided on a section-by-section basis, on the basis of a combination of sections, or even on the basis of an evaluation of the oral cavity as a whole. It should be noted that the advantages provided by knowing, with a strong degree of certainty, the location and orientation of the reference face 153 of the head 115 within the oral cavity are expected to provide many oral health benefits, beyond even those discussed herein, when applied in combination other aspects of the sensor data, particularly the optical sensor data. The invention, however, is not to be limited to any particular evaluation of oral care or oral health unless expressly so limited in a claim.

Figure 17A:
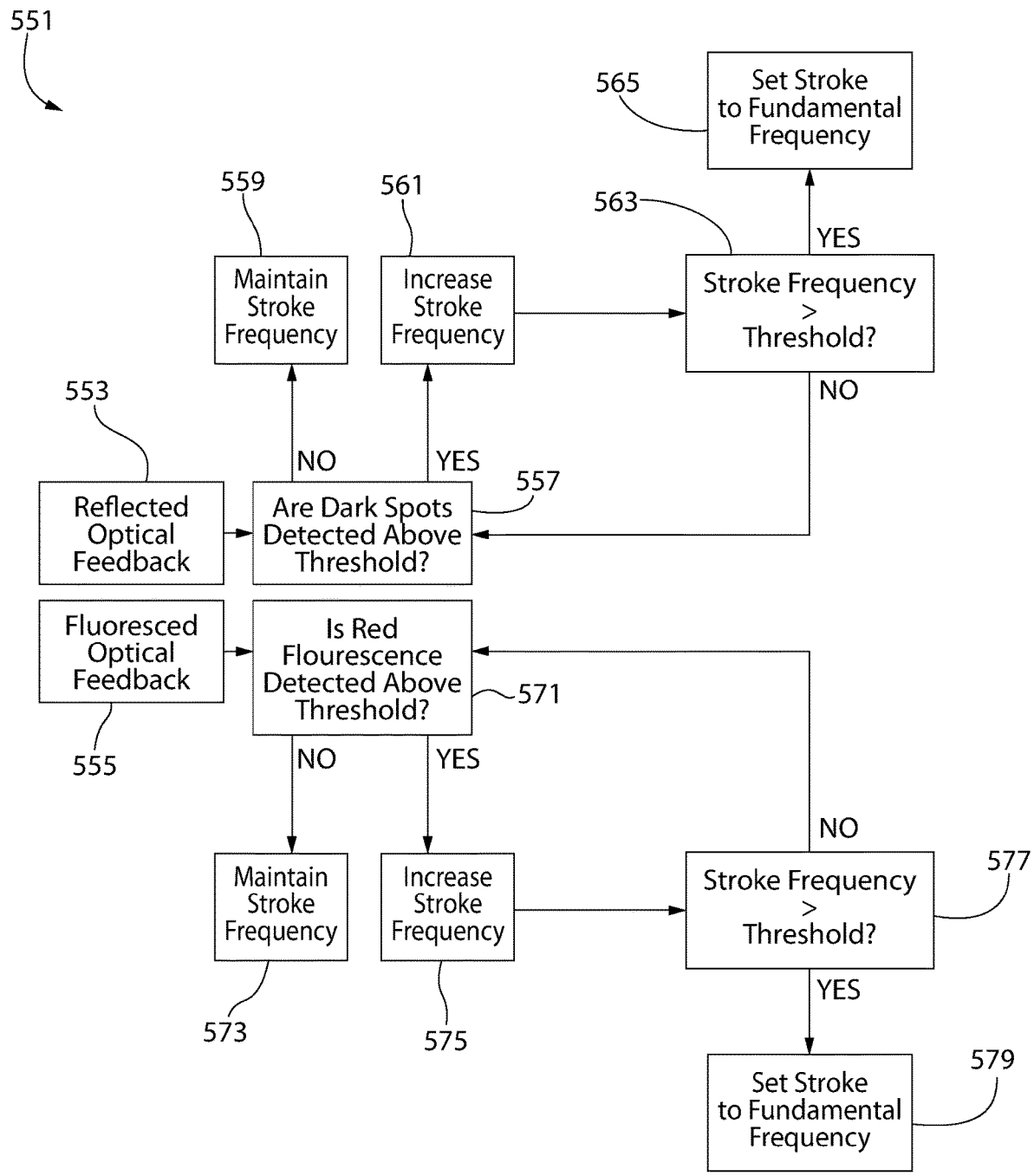
FIG. 17A illustrates a first process flow for actively controlling a stroke frequency of the oral care device of FIG. 5.

FIG. 17A is a diagram showing a process 557 for actively controlling the vibratory motor 267 of the electric toothbrush 251 of FIG. 5 to the benefit of improving oral health of the user. The process 557, when used in isolation, is based only upon the optical sensor data. However, during the typical brushing routine, the process 557 will rarely be used in isolation. In practice, this process 557, and the results it produces, would be balanced against other processes and the oral health history and existing needs of the user.

The process 557 uses the optical feedback that is reflected 553 from certain organic matter within the oral cavity and the optical feedback that is fluoresced 555 by certain organic matter within the oral cavity, both of which are part of the optical sensor data, in order to determine how to control the stroke frequency of the vibratory motor. By way of example, the presence of dark spots on teeth may be an indication of the presence of caries in tooth enamel, and such dark spots will show up in the optical feedback that is reflected and received by the image sensor. Similarly, by way of example, the presence of red fluorescence in the fluoresced optical feedback may be an indication of the presence of plaque on teeth. In each instance, it is desirable to increase the stroke frequency of the vibratory motor 267.

Both the evaluation of the presence of dark spots in the reflected optical feedback and the evaluation of the presence of red fluorescence in the fluoresced optical feedback are performed using the deep machine learning process discussed above. By using the machine learning process to evaluate the state of oral tissue or other organic matter in the oral cavity through reflected and fluoresced light, the oral care system 101 can respond in real time to the state of the oral cavity during a brushing routine. For example, should the circumstances call for it, using the machine learning process, the oral care system 101 can increase or decrease the stroke frequency of the vibratory motor every half second, or even less. If the vibratory motor has a stroke frequency on the order of 200 Hz, adjusting the stroke frequency upward by 5 HZ every half second can make a significant difference in how many extra strokes get applied to a potential problem spot on the teeth of the user. Similarly, the stroke frequency may be adjusted downward to help prevent overbrushing. The amount of adjustment to the stroke frequency made by any process disclosed herein is not to be limited unless expressly stated in a claim.

Using the optical feedback that is reflected 553, the process 557 determines if dark spots are detected 557 in the reflected optical feedback above a predetermined threshold. This threshold may be based upon a preexisting standard, or alternatively, it may be based upon the training data provided by the user. In the event that dark spots are not detected above the predetermined threshold, then the stroke frequency is maintained 559 at the then-current frequency.

In the event that dark spots are detected above the predetermined threshold, then the stroke frequency of the vibratory motor is increased 561 by a small increment. After the increase 561, the stroke frequency is checked against a frequency threshold 563. If the stroke frequency is not above the frequency threshold, then the process 557 returns to determining if dark spots above the predetermined threshold are detected 557 in the reflected optical feedback. The process 557 may continue to increase the stroke frequency as appropriate according to the standards set within the algorithm. If the stroke frequency is at or above the frequency threshold, then the process 557 resets the stroke frequency to a base or fundamental frequency, after which the process 557 returns to determining if dark spots above the predetermined threshold are detected 557 in the reflected optical feedback.

Using the optical feedback that is fluoresced 571, the process 557 determines if red fluorescence is detected 571 in the fluoresced optical feedback above a predetermined threshold. This threshold may be based on a preexisting standard, or alternatively, it may be based upon the training data provided by the user. In the event that red fluorescence is not detected above the predetermined threshold, then the stroke frequency is maintained 573 at the then-current frequency. In the event that red fluorescence is detected above the predetermined threshold, then the stroke frequency of the vibratory motor is increased 561 by a small increment. After the increase 577, the stroke frequency is checked against a frequency threshold 579. If the stroke frequency is not above the frequency threshold, then the process returns to determining if red fluorescence above the predetermined threshold is detected 571 in the fluoresced optical feedback. If the stroke frequency is at or above the frequency threshold, then the process 557 resets the stroke frequency to a base or fundamental frequency, after which the process 557 returns to determining if red fluorescence above the predetermined threshold is detected 571 in the fluoresced optical feedback.

In certain embodiments, a process similar to the process 571 may be used increase the stroke frequency of the vibratory motor when stains on teeth are detected. Adjustment of the stroke frequency of the vibratory motor may be used to improve brushing effectiveness for a variety of other reasons as well. In certain embodiments, other types of detectable features in the oral cavity may be used to increase or decrease the stroke frequency of the vibratory motor. The type of detectable feature is not to be limiting of the invention unless expressly stated in a claim.

Figure 17B:
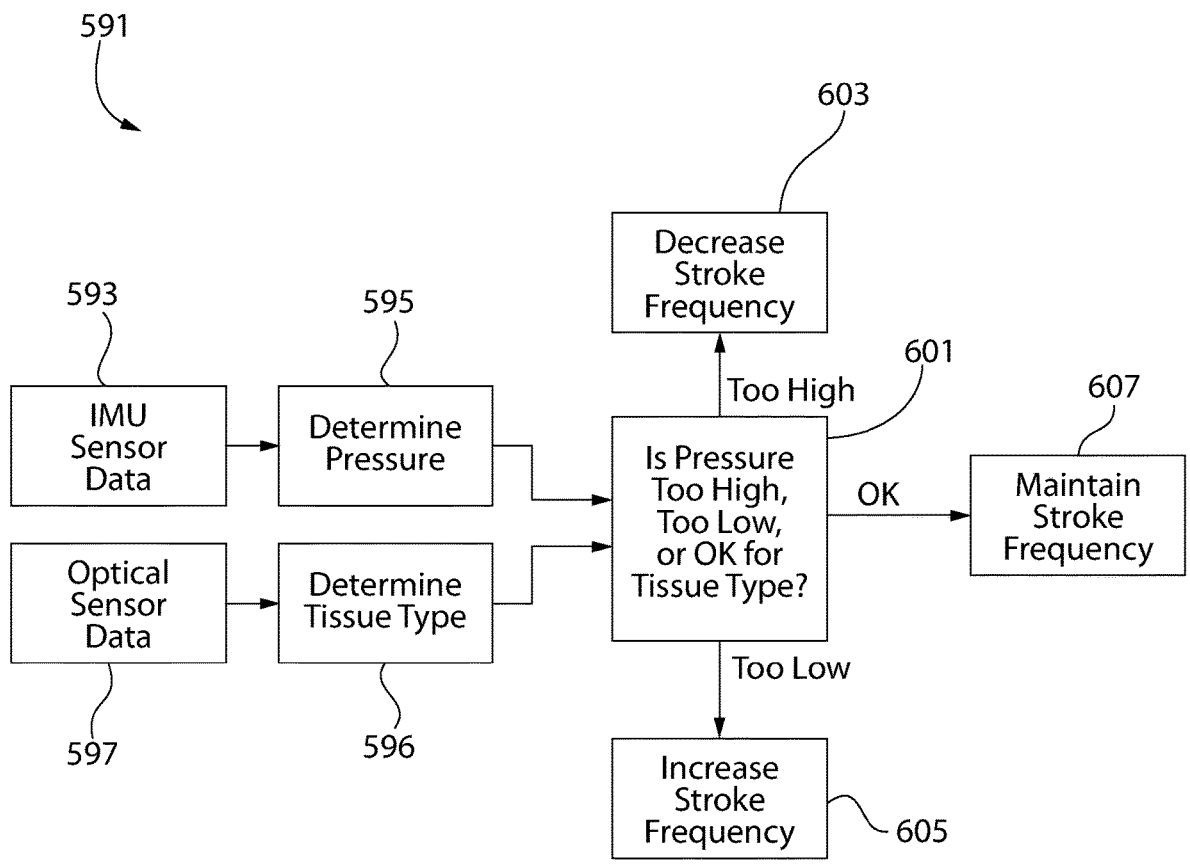
FIG. 17B illustrates a second process flow for actively controlling a stroke frequency of the oral care device of FIG. 5.

FIG. 17B is a diagram showing another process 591 for actively controlling the vibratory motor 267 of the electric toothbrush 251 of FIG. 5 to the benefit of improving oral health of the user. The process 591, when used in isolation, is based upon sensor data from the accelerometer 295 and from the optical sensor 283. In practice, this process 591, and the results it produces, would be balanced against other processes and the oral health history and existing needs of the user. In certain embodiments, if a separate pressure sensor is included in the electric toothbrush 251, then this process 591 may also be based upon the pressure sensor data.

Figure 18:
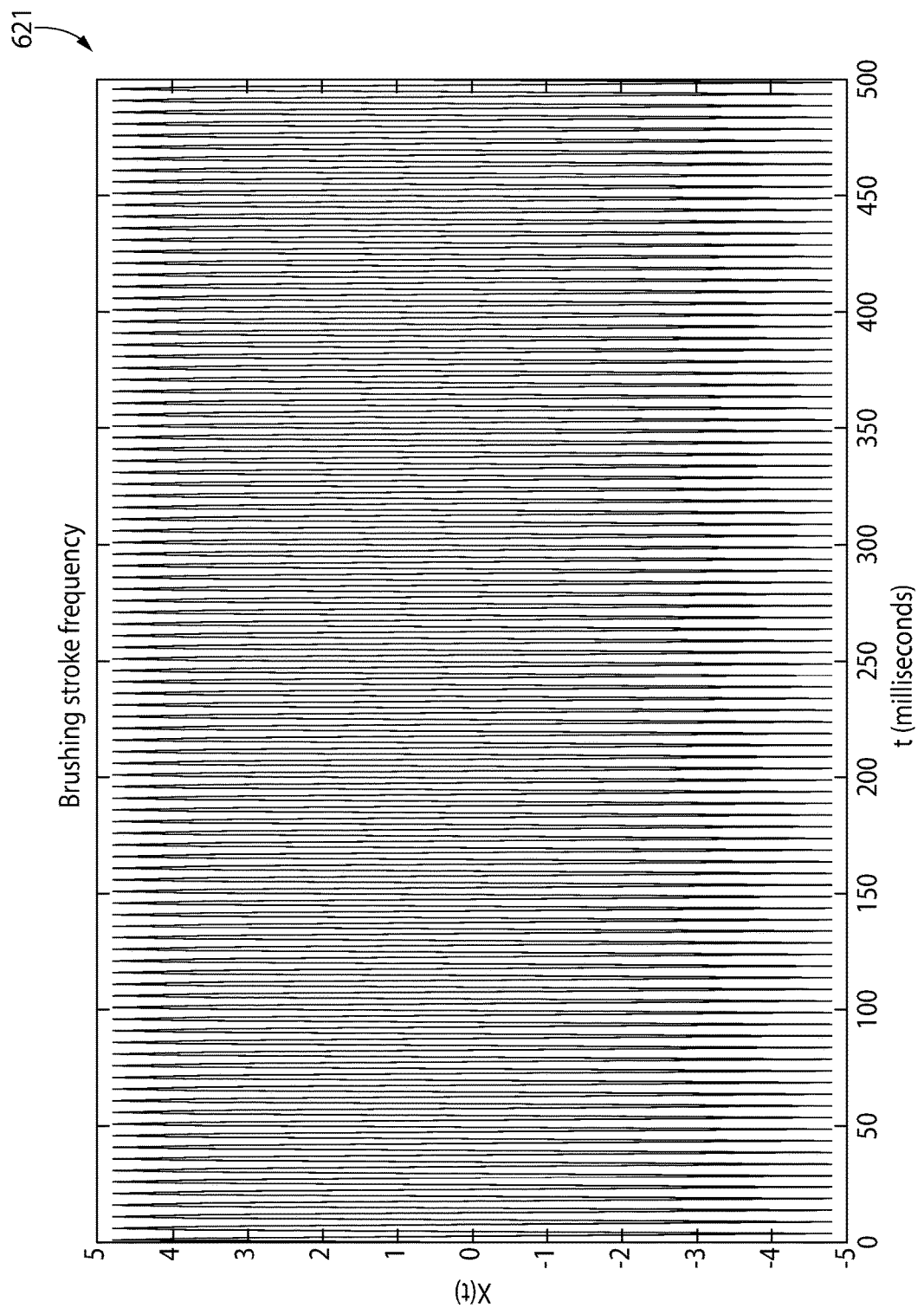
FIG. 18 is a graph illustrating an undampened stroke frequency of the oral care device of FIG. 5.
Figure 19:
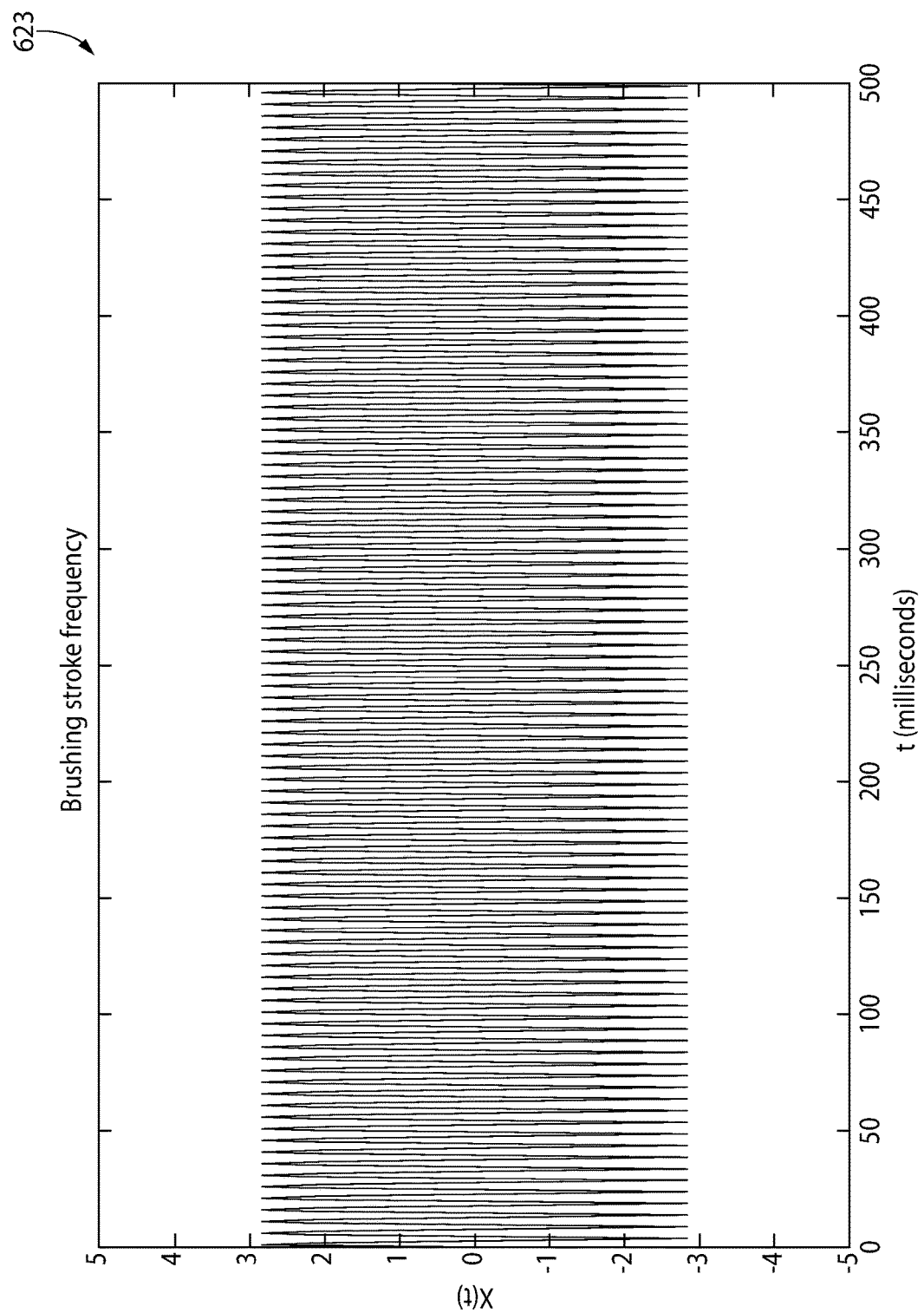
FIG. 19 is a graph illustrating a partially dampened stroke frequency of the oral care device of FIG. 5.
Figure 20:
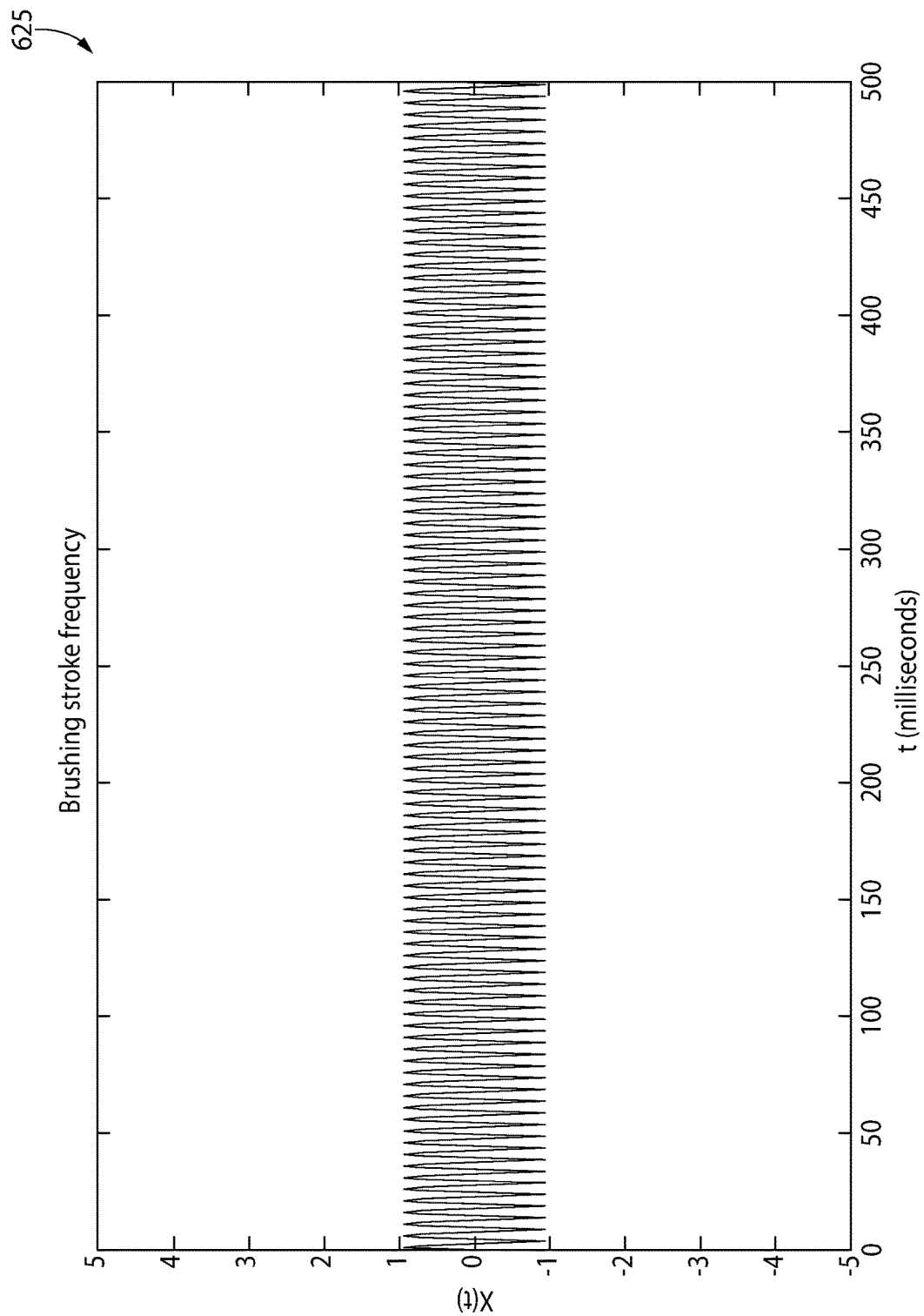
FIG. 20 is a graph illustrating a substantially dampened stroke frequency of the oral care device of FIG. 5.

Using sensor data from the IMU 279, particularly linear acceleration data from the accelerometer 295, the pressure of the teeth cleaning elements 259 against tissue in the oral cavity of the user is determined. FIGS. 18-22 illustrate how the pressure may be determined from the linear acceleration data. FIG. 18 is a graph 621 which illustrates the measured stroke frequency of the vibratory motor 267 in the electric toothbrush 251. The measurement of the stroke frequency is performed using the IMU 279, and particularly the accelerometer 295 within the IMU 279. The oscillations shown in the graph 621 represent undamped vibrations of the vibratory motor 267, as measured by the accelerometer 295, during a brushing routine. FIG. 19 is a graph 623 which illustrates another measurement of the stroke frequency of the vibratory motor 267 in the electric toothbrush 251. The oscillations shown in the graph 623 represent partially dampened vibrations of the vibratory motor 267, as measured by the accelerometer 295, during a brushing routine. The partial dampening is caused by the teeth cleaning elements 259 being pressed into the teeth or gums of the user. FIG. 20 is a graph 625 which illustrates another measurement of the stroke frequency of the vibratory motor 267 in the electric toothbrush 251. The oscillations shown in the graph 625 represent substantially dampened vibrations of the vibratory motor 267, as measured by the accelerometer 295, during a brushing routine. The substantial dampening is caused by the teeth cleaning elements 259 being pressed significantly into the teeth or gums of the user. Such a hard pressing of the teeth cleaning elements into the teeth or gums of the user can cause damage to the oral tissue.

Figure 21:
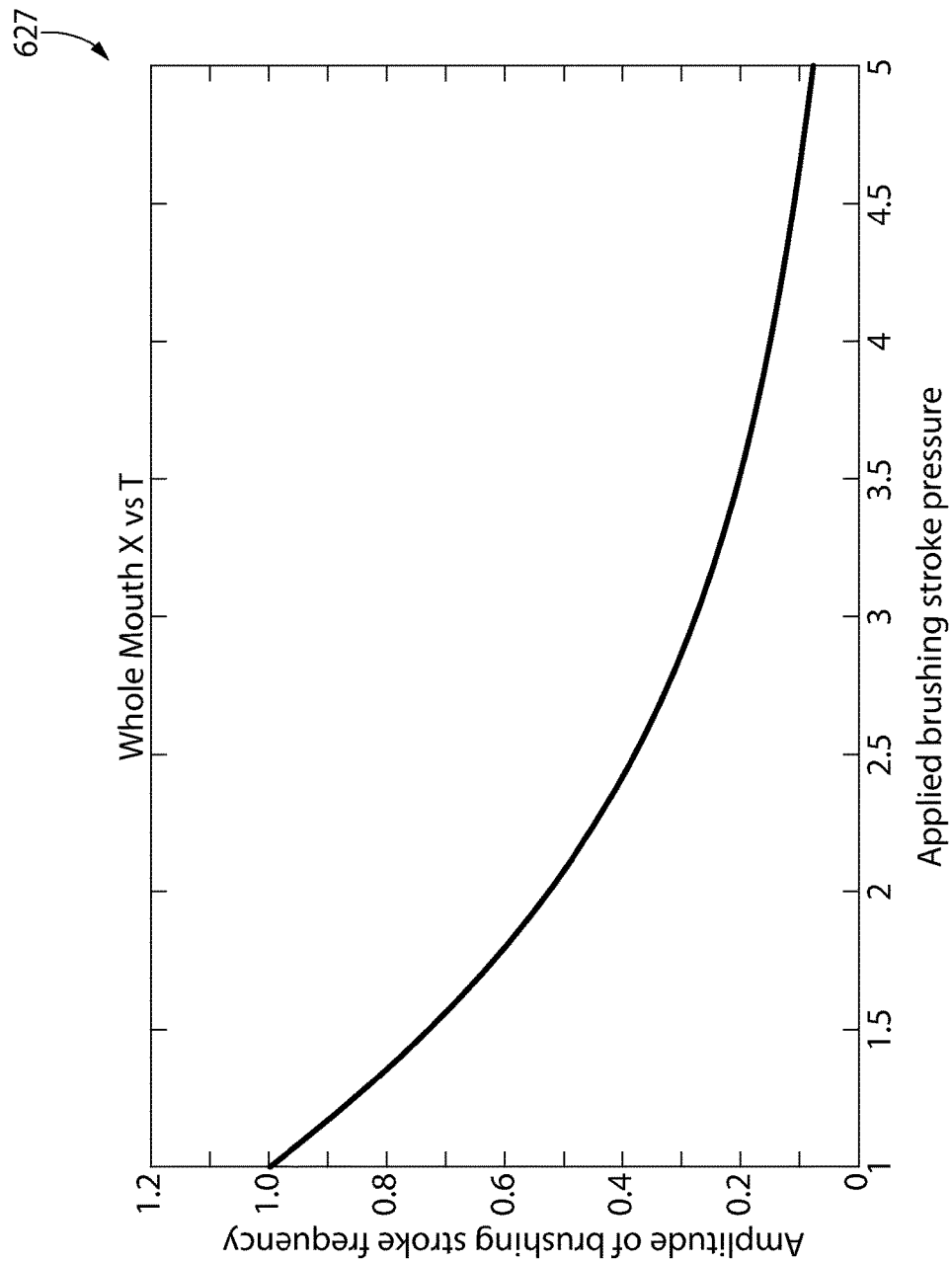
FIG. 21 is a graph showing an amplitude of stroke frequency versus brushing stroke pressure as measured from a sensor at or near the head of the oral care device of FIG. 5.
Figure 22:
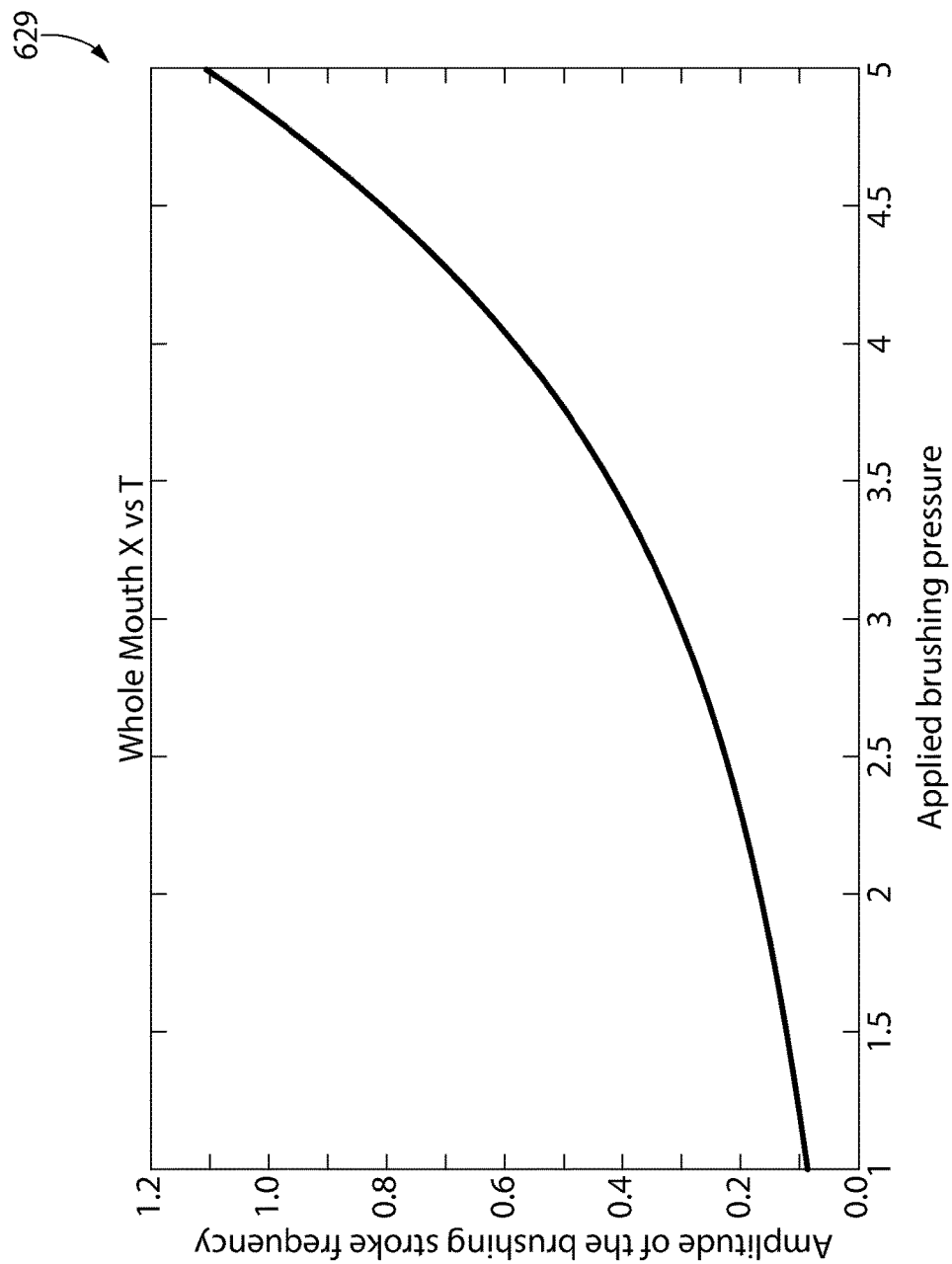
FIG. 22 is a graph showing an amplitude of stroke frequency versus brushing stroke pressure as measured from a sensor coupled to the body of the oral care device of FIG. 5.

FIG. 21 shows a graph 627 which plots amplitude of stroke frequency against the amplitude of stroke pressure when the stroke frequency is measured by the IMU 279 disposed in the head 257 of the electric toothbrush 251. The curve in graph 627 is a typical vibration dampening curve in which the amplitude of the stroke frequency bears some inverse proportionality (not linear) to the amplitude of the stroke pressure. FIG. 22 shows a second graph 629 which also plots amplitude of stroke frequency against the amplitude of stroke pressure, except for this curve the amplitude of stoke frequency is measured by the IMU 279 disposed in the handle 253 of the electric toothbrush 251. The curve in graph 629 is the opposite of what might be expected of a dampening measurement, with the amplitude of the stroke frequency bearing some direct proportionality (again, not linear) to the amplitude of the stroke pressure. The machine learning process will take this difference into account.

Returning to FIG. 17B, the process 591 is based on both IMU sensor data 593 and optical sensor data 597. The IMU sensor data, particularly linear acceleration data, is used to determine the stroke pressure 595 being applied by the user during a brushing routine, and the optical sensor data is used to determine the tissue type against which the teeth cleaning elements 259 are being pressed. Using the machine learning process discussed above, the process 591 determines 601 if the applied stroke pressure is too high, too low, or acceptable for the tissue type. If the applied stroke pressure is too high 603, the process 591 will decrease the stroke frequency. If the applied stroke pressure is too low 605, the process 591 will increase the stroke frequency. In the event that the applied stroke frequency is acceptable, then the process 591 will maintain the stroke frequency at the then-current level.

In certain embodiments, the process 591 may also take into account where the identified tissue type is located within the oral cavity of the user, and again using the machine learning process, make a determination about whether to increase, decrease, or maintain the stroke frequency.

Figure 23:
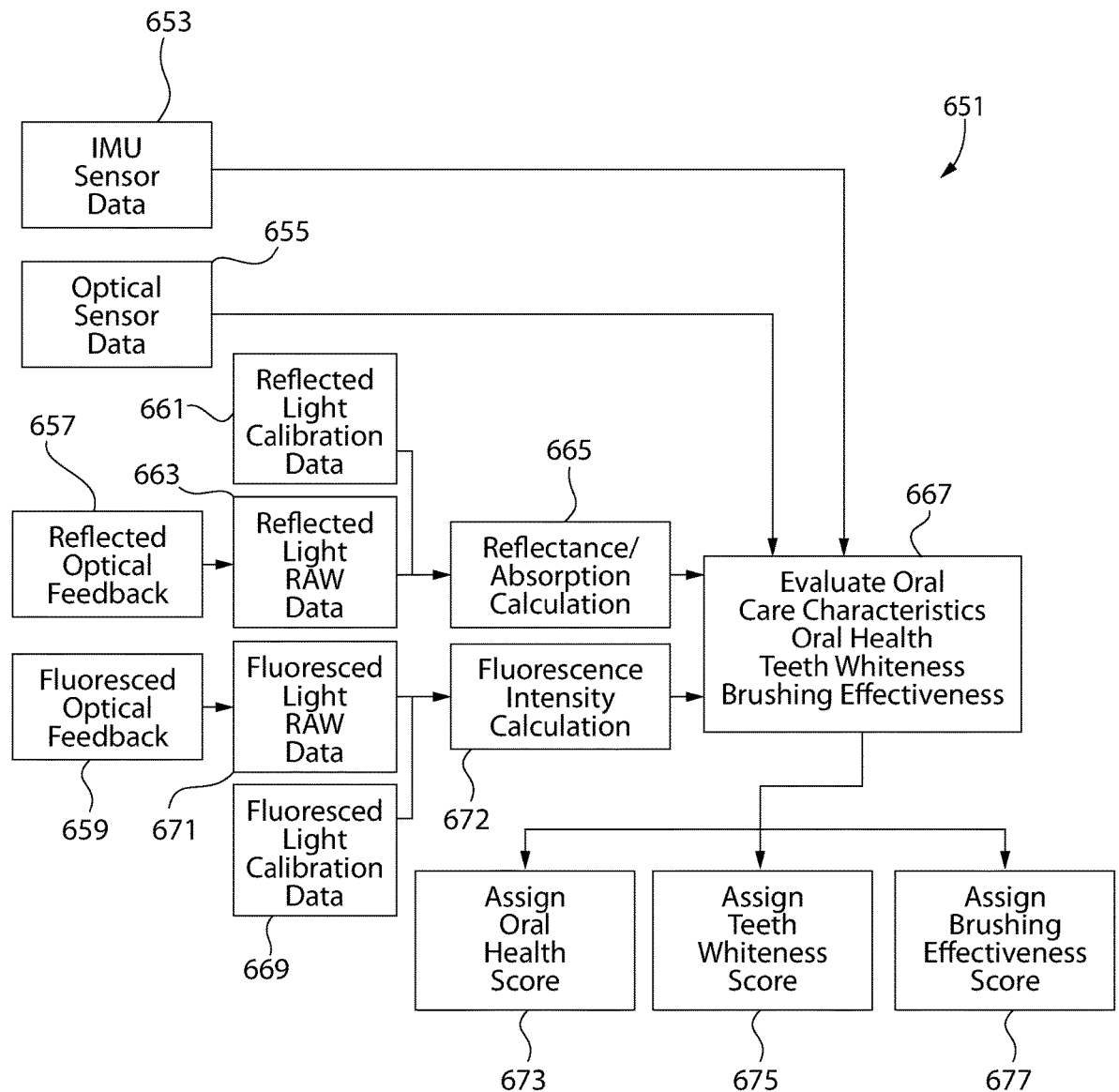
FIG. 23 illustrates a process flow for evaluating optical sensor data for the oral care system of FIG. 1.

FIG. 23 illustrates a process 651 for evaluating oral care characteristics for a user of the oral care system 101. It should be understood that this process 651 may be used with any of the embodiments disclosed herein, and any other embodiment of the invention, and implementation the process 651 may be limited by the particular configuration of the oral care device 103 with which it is used.

Figure 25:
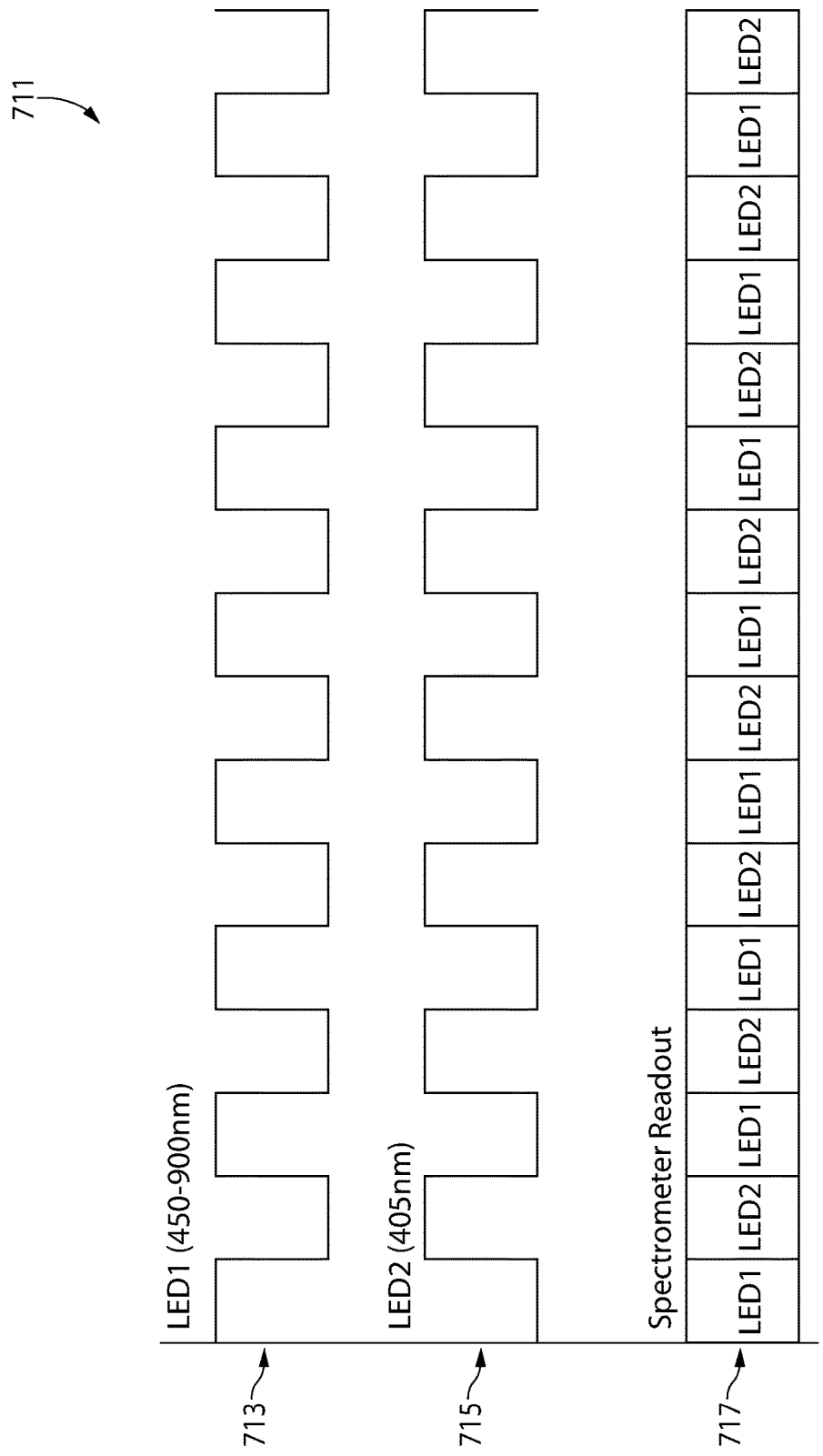
FIG. 25 illustrates a process for alternating actuation of LEDs having different spectral emission wavebands in the oral care system of FIG. 1.

The oral care characteristics may be assigned a score, and each such assigned score may reflect one or more oral care characteristics and/or one or more sections of the oral cavity. The process 651 is based upon IMU sensor data 653, image sensor data 655, reflected optical feedback 657 received by the optical sensor 169, and fluoresced optical feedback 659 received by the optical sensor 169. FIG. 24A illustrates the light module 173 within the head 115 of the examination device 151, showing the components of the light module 173 that are used to generate both the reflected optical feedback 657 and the fluoresced optical feedback 659. Similarly, FIG. 24B illustrates the light module 285 within the head 257 of the electric toothbrush 251, showing the components of the light module 285 that are used to generate both the reflected optical feedback 657 and the fluoresced optical feedback 659. FIG. 25 illustrates a process for operating the components of the light module 173. The light module 173, in this exemplary embodiment, includes two broadband LEDs 701 and one narrowband LED 703. The broadband LEDs 701 in this exemplary embodiment emit light in the range of 450 nm to 900 nm, and the narrowband LED 703 emits light in a narrowband spectrum centered on 405 nm. Light emitted from both the wideband LEDs 701 and the narrowband LED 703 are directed toward and through the optical aperture 175. The emitted light passes through the optical aperture 175 and toward organic matter when the head 115 is within the oral cavity. There, light from the wideband LEDs 701 is mostly partially reflected and partially absorbed by the organic matter, and light from the narrowband LED 703 is absorbed by the some of the organic matter, with some of the light energy absorbed being remitted by as fluorescent light. At least some of the reflected light and some of the fluorescent light pass back through the optical aperture 175, to respectively become the reflected optical feedback 657 and the fluoresced optical feedback 659. Some of both the reflected optical feedback 657 and the fluoresced optical feedback 659 are incident on the optical sensor 171 positioned in the head 115 of the examination device 151. The optical sensor 171 generates optical sensor data from both of the reflected optical feedback 657 and the fluoresced optical feedback 659, and the optical sensor data includes both the reflected light raw data 663 and the fluoresced light raw data 671, although not both simultaneously. In embodiments such as the electric toothbrush 251 where the optical sensor 283 is located in the body 253, the reflected optical feedback 657 and the fluoresced optical feedback 659 are incident on the end of the light guide 289, which transports the collected light to the optical sensor 283.

FIG. 25 illustrates a process 711 for operating both the wideband LEDs 701 and the narrowband LED 703 so that the reflected optical feedback 657 and the fluoresced optical feedback 659 may be generated nearly simultaneously during a brushing routine. As part of this process 711, a first control signal 713 is generated to control the ON/OFF state of the wideband LEDs 701, and a second control signal 715 is generated to control the ON/OFF state of the narrowband LED 703. The first and second control signal 713, 715 may be generated by the programmable processor 165 of the examination device 151, and the control signals 713, 715 are constructed so that when the wideband LEDs 701 are in the ON state, the narrowband LED 703 is in the OFF state, and when the wideband LEDs 701 are in the OFF state, the narrowband LED 703 is in the ON state. By controlling the wideband LEDs 701 and the narrowband LED 703 in this manner, the optical sensor 171 alternately receives 717 the reflected optical feedback 657 and the fluoresced optical feedback 659, and does not receive both optical feedbacks 657, 659 simultaneously.

Returning to FIG. 23, during the process 651, the reflected light raw data 663 is color corrected using the reflected light calibration data 661, and the fluoresced light raw data 671 is color corrected using the fluoresced light calibration data 669. The color corrected reflected light raw data is processed by calculating the reflectance and absorption 665 of the organic material in the oral cavity, and the color corrected fluoresced light raw data is processed by calculating the fluorescence intensity 672. The IMU sensor data 653, the image sensor data 655, the reflected light raw data 663, the reflectance and absorption calculation 665, the fluoresced light raw data 671, and the fluorescence intensity calculation 672 are all used to evaluate oral care characteristics 667. As with other processes described herein, the evaluation of oral care characteristics 667 that is performed as part of this process 651 is performed using the deep machine learning process described above.

As the evaluation of oral care characteristics 667, the IMU sensor data 653 and the image sensor data 655 are primarily used to determine from which sections of the oral cavity the rest of the data was generated. On this basis, the reflected optical feedback 657 and the fluoresced optical feedback 659 can be used to evaluate oral care characteristics for each and every section of the oral cavity and for the oral cavity as a whole. Moreover, the process 651 may assign an oral care score to each of the oral care characteristics that is evaluated for any brushing routine. In certain embodiments, the assigned oral care scores may be saved in a memory so that a comparison can be made between a first brushing routine and a second brushing routine. Additionally, changes over time in assigned oral care scores may be tracked by the user, or even provided to the user's dental care professional.

In this exemplary embodiment, the oral care characteristics that may be evaluated include an oral health characteristic, a brushing effectiveness characteristic, and a teeth whiteness characteristic. The process 651 may assign a score for each of the oral health characteristic 673, the brushing effectiveness characteristic 677, and the teeth whiteness characteristic 675. These scores may be position scores for the real-time position of the head of the oral care device within the oral cavity of the user, individual section scores for different sections of the oral cavity, an overall score for the entire oral cavity, or combination scores for multiple sections within the oral cavity. As should be apparent, the type of oral care characteristics that may be evaluated are device dependent. For example, the examination device 151, which does not include teeth cleaning elements, cannot be used to evaluate characteristics that require the presence of teeth cleaning elements, such as brushing pressure.

The oral health characteristic may include at least one of a soft tissue health characteristic and a hard tissue health characteristic. The soft tissue health characteristic may include one or more of a soft tissue coloration characteristic, a bleeding characteristic, a blood oxygenation characteristic, and a tissue hydration characteristic. The hard tissue health characteristic may include one or more of a caries characteristic and a bacterial presence characteristic. The brushing effectiveness characteristic may include one or more of a brushing pressure characteristic, a stroke frequency characteristic, a bacterial presence characteristic, and a caries characteristic. The teeth whiteness characteristic may include an evaluation of teeth whiteness at the time of the brushing routine and/or an evaluation of changes in teeth whiteness.

Figure 26:
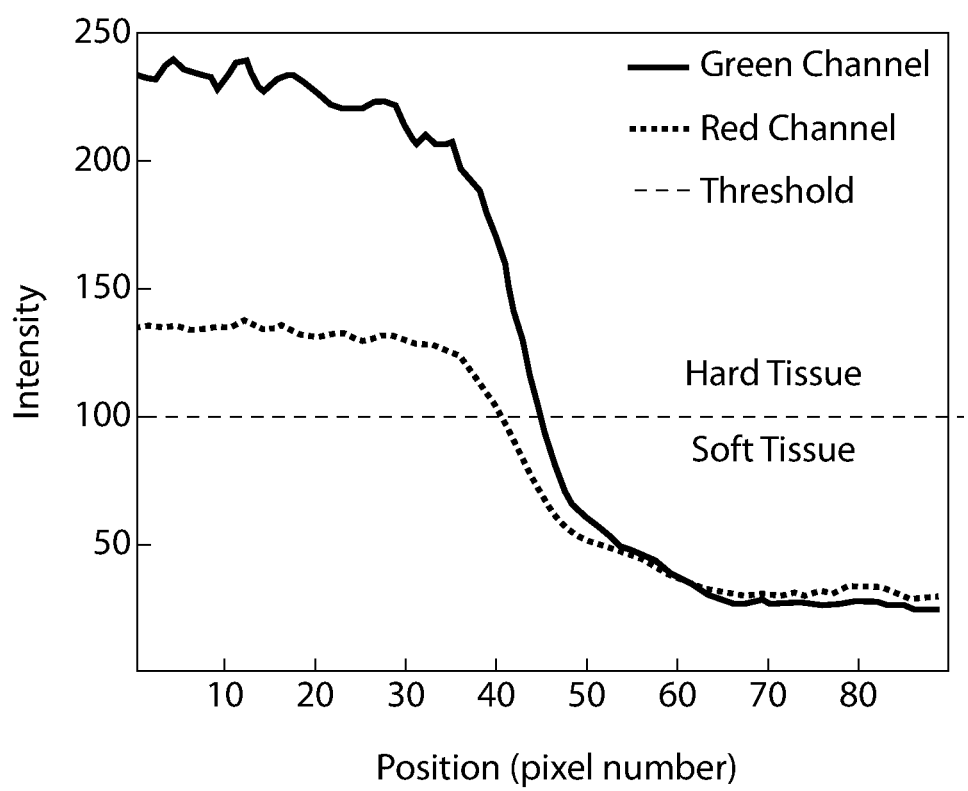
FIG. 26 is a graph showing a line spread function to measure intensity of fluoresced light in the oral care system of FIG. 1.

FIG. 26 is a graph 731 which graphically illustrates a process for differentiating between soft tissue and hard tissue using the line spread function. Both hard and soft tissue within the oral cavity may be illuminated with a narrowband spectrum centered around a 405 nm wavelength to induce fluorescence in both the soft tissue and the hard tissue. The fluoresced optical feedback includes both a green channel and a red channel, and the graph 731 illustrates the intensities of each channel against pixel number. Through use of the line spread function, in this example the intensity difference between hard tissue and soft tissue is at an intensity of 100. Being able to differentiate between soft tissue and hard tissue is useful because it helps identify the location of the head 115 of the oral care device 103 more precisely within any one section of the oral cavity.

Figure 27:
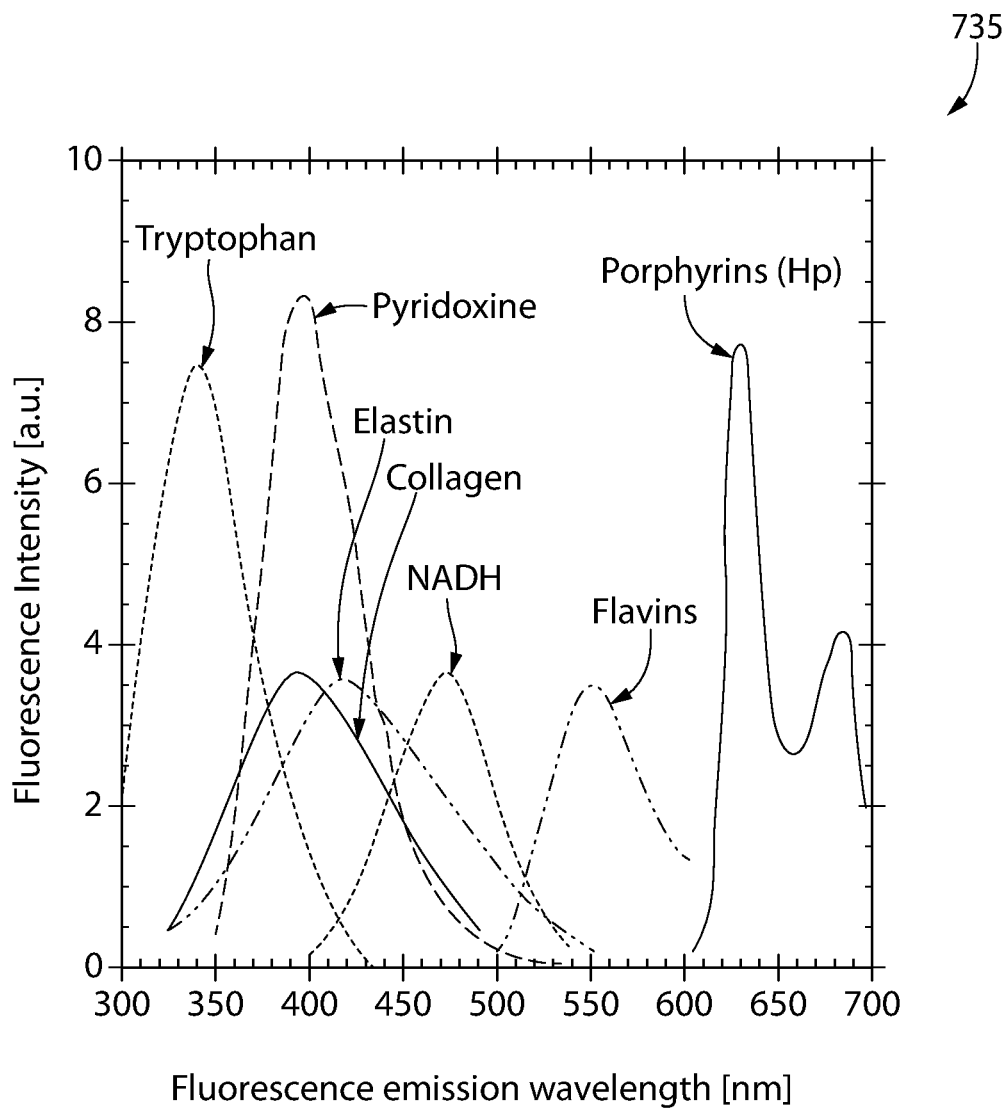
FIG. 27 is a graph showing fluorescence peaks for various types of organic matter that may be found in an oral cavity.

FIG. 27 is a graph 735 showing the fluorescent wavebands generated by various organic matter. Of particular relevance in this graph is that porphyrins have fluorescence peaks at around 635 nm and 700 nm. It is also known that hard oral tissue (i.e., tooth enamel) fluoresces at about 520 nm. That the peaks for porphyrins and hard oral tissue are readily distinguishable enables the process 651 to differentiate between these different organic matters and assign an oral health score based on the presence of porphyrins in the oral cavity of a user.

Figure 28:
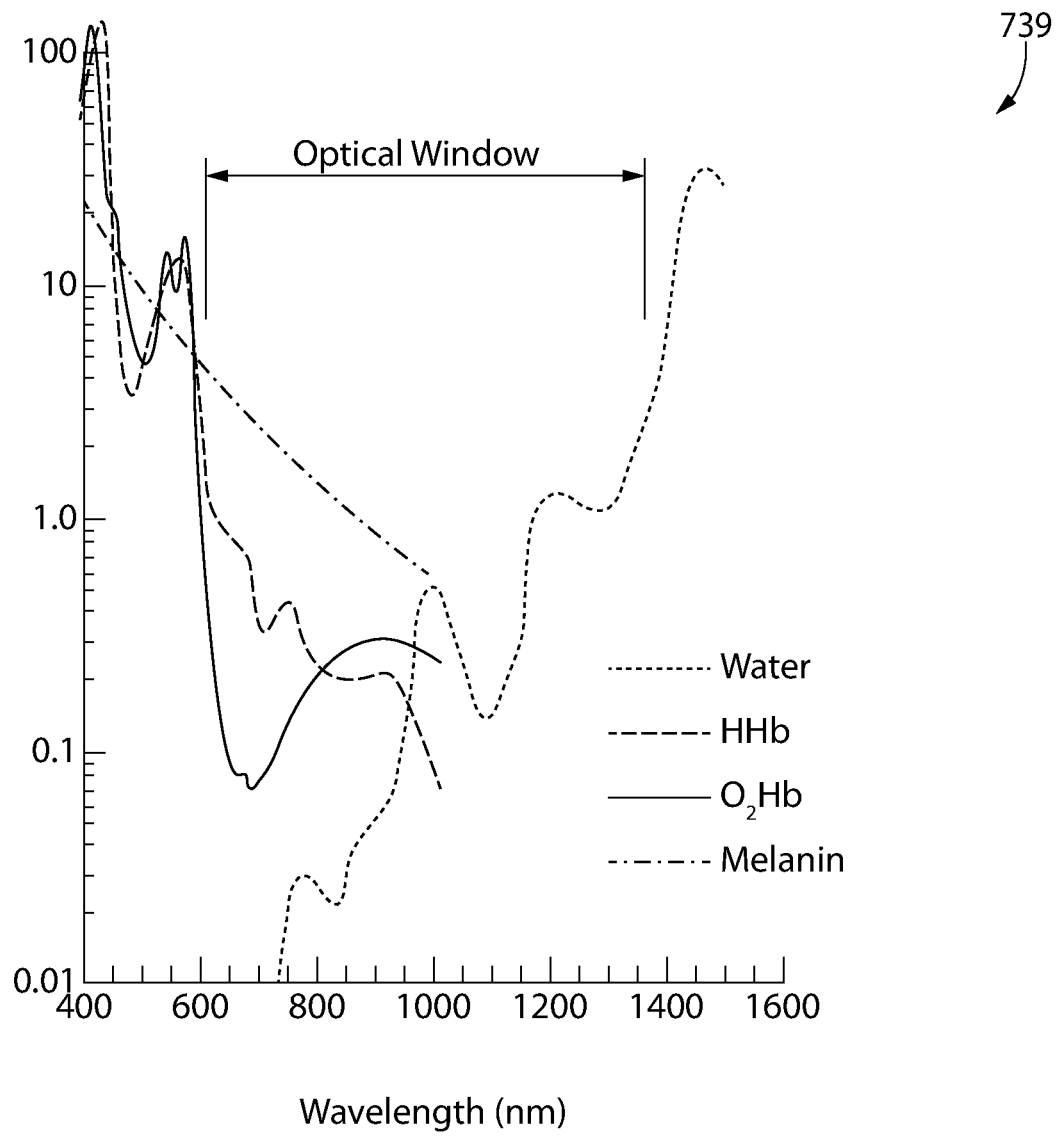
FIG. 28 is a graph showing reflectance spectrum for various types of matter that may be found in an oral cavity.

FIG. 28 is a graph 739 showing reflectance profiles for four different types of organic matter, namely water, oxyhemoglobin ($O_2Hb$), deoxyhemoglobin (HHb), and melanin. Tissue hydration may be measured using the reflection profile of water, while tissue oxygenation may be measured using the reflection profile for oxyhemoglobin and/or deoxyhemoglobin. In certain embodiments, other organic materials may be identified and evaluated using their reflectance and/or fluorescence spectral profiles.

Figure 29:
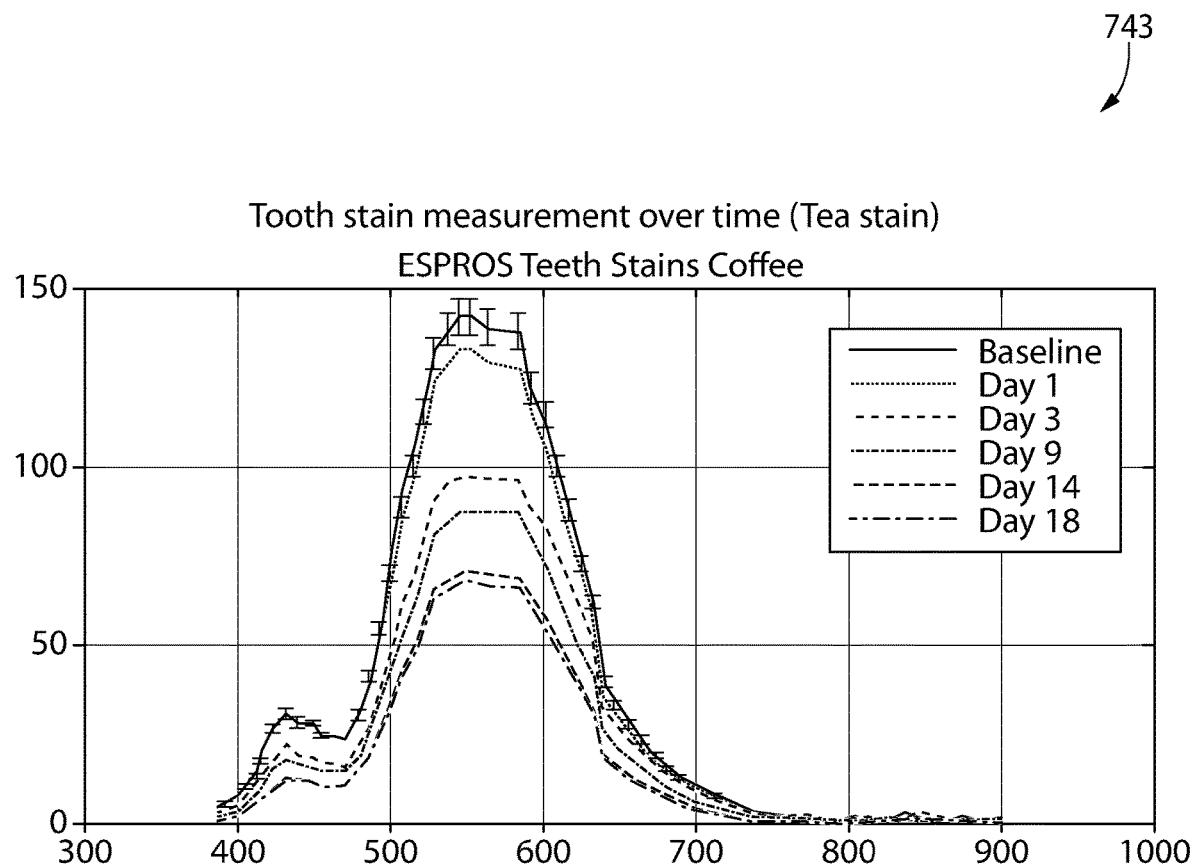
FIG. 29 is a graph illustrating measured changes in teeth whiteness over time.

FIG. 29 is a graph 743 illustrating an evaluation of teeth whiteness over time. For measuring the tooth color during oral care routine, the light module 173 is controlled to illuminate teeth in the oral cavity with light in the broadband visible spectrum, and the reflected light is received by the optical sensor 171, which generates optical sensor data in response thereto. The values of the CIE*Lab color space standard are then extracted from the optical sensor data, namely the values of L* (luminosity, or value), a* (quantity of red-green), b* (quantity of yellow-blue) color coordinates, or the L (luminosity), c (chroma), h (hue). The graph 743 shows the measurement of tooth color using reflected broadband visible light over a period of over two weeks. In certain embodiments, when assigning a score for the teeth whiteness characteristic using data such as is seen in the graph 743, the value at the peak, normalized to a scale of 0-100, may be used to set the teeth whiteness score. In certain other embodiments, a line passing through the curve at a value less than the peak may be used to assign the teeth whiteness score.

In assigning scores to the various oral care characteristics, the process 651 in an exemplary embodiment initially assigns an internal score using the range of 0-100, and then when the score is presented to a user, the score is normalized to a scale of 0-4 for presentation to a user of the oral care system 101. In certain embodiments, when a score is to be a combination of more than one oral care characteristic (e.g. brushing effectiveness may be a combination of a stroke pressure characteristic and a bacterial presence characteristic), each characteristic may be initially assigned a separate score before being combined to create an average score. In certain embodiments, when a score is to be a combination of more than one oral care characteristic one or more of the scores to be included in the combined score may be weighted to have a stronger or lesser influence on the resulting combined score.

Figure 30:
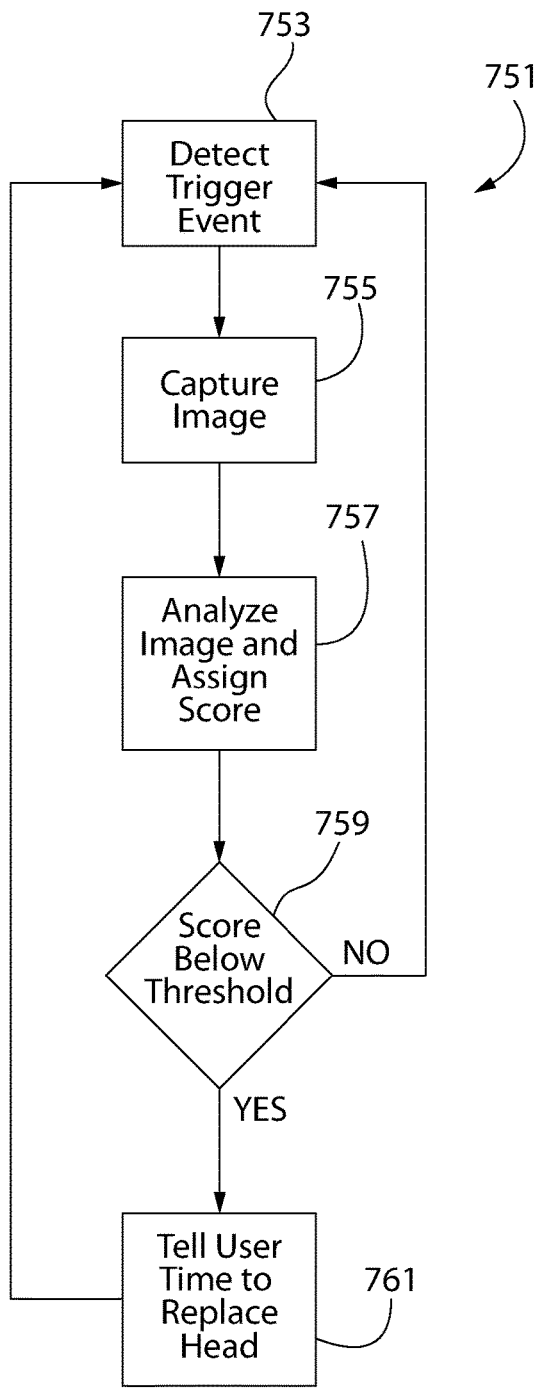
FIG. 30 illustrates a process for determining when a toothbrush head is in need of being replaced for the oral care device of FIG. 5.

A process 751 for informing a user when it is recommended to replace an oral care device head is shown in FIG. 30. Like the other processes discussed herein, this analysis for this process 751 is performed using deep machine learning as discussed above. When training the deep machine learning algorithm, the algorithm generates cleaning element wear data during data training routines. The cleaning element wear data may then be used as part of the process to evaluate whether current teeth cleaning elements should be replaced.

Figure 31A:
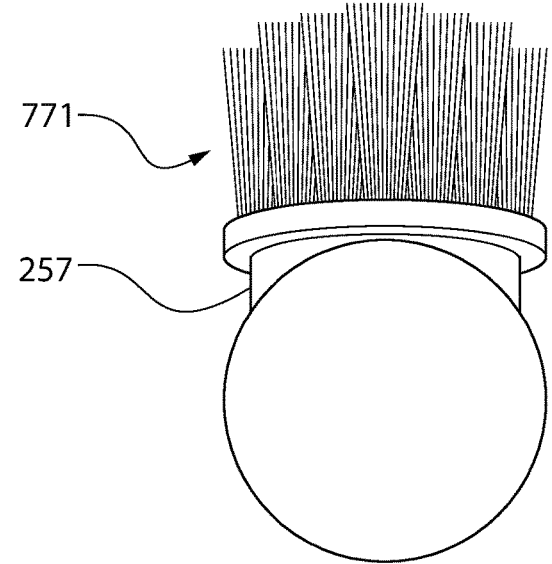
FIG. 31A illustrates new teeth cleaning elements, as viewed from the image sensor in the body of the oral care device of FIG. 5.
Figure 31B:
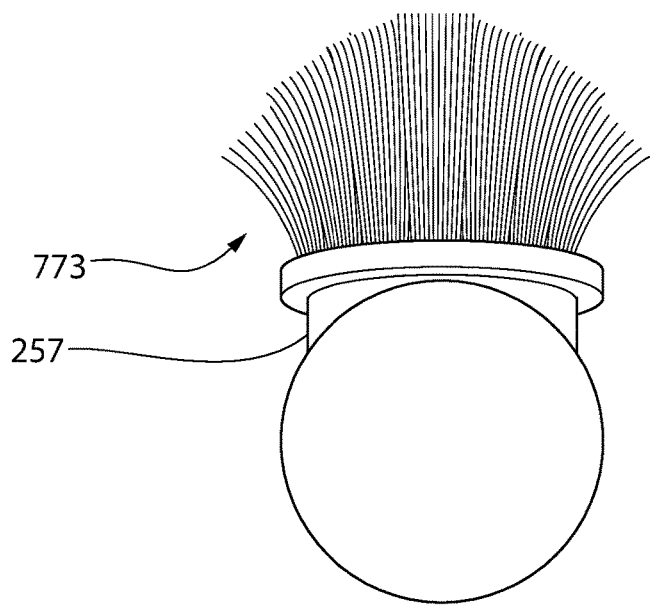
FIG. 31B illustrates teeth cleaning elements in need of replacement, as viewed from the image sensor in the body of the oral care device of FIG. 5.

This process 751 may be used with the oral care devices depicted in FIGS. 5 and 8, both of which include teeth cleaning elements and an image sensor positioned to generate an image of the teeth cleaning elements. In the context of the electric toothbrush 251 of FIG. 5, FIGS. 31A-B show two images of the head 257 of an oral care device. In FIG. 31A, the teeth cleaning elements 771 are all straight and extend in a linear direction away from the head 257. These teeth cleaning elements 771 include no wear indicia. In contrast, many of the teeth cleaning elements 773 in FIG. 31B extend from the head 257 in a curved or bent manner. The curves or bends in the teeth cleaning elements 773 are wear indicia, which indicate that the teeth cleaning elements 773 might be in need of replacement. By employing machine learning and using the image sensor that is facing the teeth cleaning elements, a process may evaluate the wear indicia of the teeth cleaning elements to determine whether to recommend that the teeth cleaning elements are in need of replacement. Moreover, the programmable processor of the oral care device 103 or the programmable device 105 may provide an audible or visual alert to the user it is time to make such a recommendation. Of course, such a suggestion could strongly rely on the predetermined wear life, such as may be established by the manufacturer. And, although FIG. 31B shows the bend in teeth cleaning elements as being the basis for needing replacement, in certain embodiments any physical property of the teeth cleaning elements that may be captured as an image and analyzed by machine learning may serve as the basis for making a recommendation to replace the head of the oral care device.

Turning back to the process 751, detection of a trigger event 753 begins the analysis of the quality of the teeth cleaning elements. The trigger event may be anything appropriate to cause the programmable processor of the oral care device to begin to perform the process 751. Thus, the trigger event may be the user pushing the button on the oral care device, whether it is to turn the oral care device ON as the user prepares to begin a brushing routine, or whether it is to turn the oral care device OFF after the user has finished a brushing routine. In the latter case, the oral care device would fully turn off only after performing the process 751. In other embodiments, the trigger event may be the user coupling the oral care device to a power source in order to recharge a rechargeable battery included as part of the oral care device. Following detection of the event trigger 753, the image sensor of the oral care device captures an image 755 of the teeth cleaning elements. The captured image is analyzed, and a wear score is assigned 757 to the teeth cleaning elements. The process 751 continues by determining whether the wear score is below a predetermined threshold 759. If the threshold is not crossed, then the process 751 waits idle until detection of the next trigger event 753. If, however, the wear score falls below the threshold, then the processor generates a wear signal. The wear signal will be received by a wear indicator, which is configured to provide feedback to the user, the feedback being a recommendation to replace the teeth cleaning elements. In certain embodiments, the display screen or speaker of the programmable device 105 may serve as the wear indicator. In certain other embodiments, the oral care device may include an LED or speaker that serves as the wear indicator.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care system comprising:
an oral care device comprising:
a head having a reference face; and
a plurality of sensors configured to generate sensor data, the sensor data comprising:
motion data and orientation data corresponding, respectively, to motion measurements and orientation measurements of the reference face during an oral care routine; and
image data generated from external images of the oral cavity during the oral care routine; and
at least one programmable processor communicably coupled to the plurality of sensors, the at least one programmable processor configured to:
generate transformed sensor data from the sensor data, the transformed sensor data comprising:
the orientation data transformed to be expressed in terms of quaternion units,
the motion data, and
enhanced image data, the enhanced image data comprising each external image of the oral cavity combined with a visual representation of corresponding quaternion units of the transformed orientation data, wherein the visual representation of the corresponding quaternion units visually encodes both a W variable and an x variable of the quaternion units of the transformed orientation data; and
determine, using the enhanced image data, a location and an orientation of the reference face with respect to the oral cavity.

2. The oral care system of claim 1, wherein the visual representation of the corresponding quaternion units comprises an upper arc encoding the W variable and a lower arc encoding the x variable.

3. The oral care system of claim 1, wherein the visual representation of the corresponding quaternion units comprises two vertical lines and two horizontal lines forming a mesh pattern, wherein the two vertical lines encode the W variable and the two horizontal lines encode the x variable.

4. The oral care system of claim 1, wherein the visual representation of the corresponding quaternion units comprises a QR code.

5. The oral care system of claim 1, wherein the visual representation of the corresponding quaternion units comprises a cross-hatch pattern comprising lines encoding the W and x variables.

6. The oral care system of claim 1, wherein each external image is overlaid with the visual representation of the corresponding quaternion units.

7. The oral care system of claim 1, wherein the oral care routine comprises one of a training oral care routine or a freeform brushing routine.

8. The oral care system of claim 1, the oral care device further comprising a body, the head extending from the body, wherein the plurality of sensors comprises an image sensor coupled to the body and positioned to generate the image data from the external images of the oral cavity during the oral care routine.

9. The oral care system of claim 8, wherein the at least one programmable processor comprises a first programmable processor and a second programmable processor, the first programmable processor disposed within the body, the second programmable processor wirelessly communicating with the first programmable processor.

10. The oral care system of claim 9, wherein:
the first programmable processor is configured to generate the transformed sensor data and transmit the transformed sensor data to the second programmable processor; and
the second programmable processor is configured to determine a location and an orientation of the reference face with respect to the oral cavity using the transformed sensor data.

11. The oral care system of claim 1, wherein the determination of the location and the orientation of the reference face with respect to the oral cavity is made using oral care routine data in combination with the transformed sensor data, the oral care routine data resulting from analysis of transformed sensor data generated during training oral care routines.

12. The oral care system of claim 1, wherein:
the oral care device further comprises at least one teeth cleaning element extending from the reference face; and
the oral care routine comprises a freeform brushing routine.

13. A method for promoting oral hygiene, the method comprising:
generating sensor data from an oral care device during a freeform oral care routine, the oral care device comprising a head having a reference face and a plurality of sensors configured to generate the sensor data, wherein the sensor data comprises motion data, orientation data, and image data, the motion data and the orientation data corresponding, respectively, to motion measurements and orientation measurements of the reference face during the freeform oral care routine, and the image data generated from external images of the oral cavity during the freeform oral care routine; and
generating, using at least one programmable processor, transformed sensor data from the sensor data, the transformed sensor data comprising:
the orientation data transformed to be expressed in terms of quaternion units,
the motion data, and
enhanced image data, the enhanced image data comprising each external image of the oral cavity combined with a visual representation of corresponding quaternion units of the transformed orientation data, wherein the visual representation of the corresponding quaternion units visually encodes both a W variable and an x variable of the quaternion units of the transformed orientation data;
determining, using the enhanced image data, a location and an orientation of the reference face with respect to the oral cavity.

14. The method of claim 13, wherein the visual representation of the corresponding quaternion units comprises an upper arc encoding the W variable and a lower arc encoding the x variable.

15. The method of claim 13, wherein the visual representation of the corresponding quaternion units comprises two vertical lines and two horizontal lines forming a mesh pattern, wherein the two vertical lines encode the W variable and the two horizontal lines encode the x variable.

16. The method of claim 13, wherein the visual representation of the corresponding quaternion units comprises a QR code.

17. The method of claim 13, wherein the visual representation of the corresponding quaternion units comprises a cross-hatch pattern comprising lines encoding the W and x variables.

18. The method of claim 13, wherein the freeform oral care routine comprises one of a training oral care routine or a freeform brushing routine.

19. The method of claim 13, wherein each external image is overlaid with the visual representation of the corresponding quaternion units.

20. The method of claim 13, the oral care device comprising a body, the head extending from the body, and the plurality of sensors comprising an image sensor coupled to the body and positioned to generate the image data from the external images of the oral cavity during the freeform oral care routine, wherein generating the sensor data comprises generating the sensor data from the image sensor.

* * * * *